US010618058B2

United States Patent
Anderson et al.

(10) Patent No.: US 10,618,058 B2
(45) Date of Patent: Apr. 14, 2020

(54) BENEFICIATION OF RARE EARTH ELEMENTS BEARING ANCYLITE

(71) Applicant: Colorado School of Mines, Golden, CO (US)

(72) Inventors: Corby G. Anderson, Golden, CO (US); Hao Cui, Golden, CO (US)

(*) Notice: Subject to any disclaimer, the term of this patent is extended or adjusted under 35 U.S.C. 154(b) by 464 days.

(21) Appl. No.: 15/225,690

(22) Filed: Aug. 1, 2016

(65) Prior Publication Data

US 2017/0028410 A1 Feb. 2, 2017

Related U.S. Application Data

(60) Provisional application No. 62/199,694, filed on Jul. 31, 2015.

(51) Int. Cl.

| | | |
|---|---|---|
| B03D 1/02 | (2006.01) | |
| B03D 1/01 | (2006.01) | |
| B03D 1/008 | (2006.01) | |
| C01F 17/00 | (2020.01) | |
| B03C 1/033 | (2006.01) | |
| B03C 1/032 | (2006.01) | |

(Continued)

(52) U.S. Cl.
CPC .............. B03D 1/008 (2013.01); B03C 1/032 (2013.01); B03C 1/0335 (2013.01); B03D 1/002 (2013.01); B03D 1/01 (2013.01); B03D 1/012 (2013.01); B03D 1/02 (2013.01); C01F 17/005 (2013.01); B03C 2201/18 (2013.01); B03C 2201/20 (2013.01); B03D 2201/007 (2013.01); B03D 2201/02 (2013.01); B03D 2203/04 (2013.01); B03D 2203/10 (2013.01)

(58) Field of Classification Search
CPC ... B03C 1/0335; B03C 1/032; B03C 2201/20; B03C 2201/18
USPC .......................................................... 209/166
See application file for complete search history.

(56) References Cited

U.S. PATENT DOCUMENTS

4,871,466 A * 10/1989 Wang ....................... B03D 1/01
252/61
6,341,697 B1 * 1/2002 Miller ..................... B03D 1/008
209/166

(Continued)

FOREIGN PATENT DOCUMENTS

WO    WO 2014/169322 A1 * 10/2014

OTHER PUBLICATIONS

Hart, B. R. et al. "REE Bearing Mineral Recovery: A Microflotation and Surface Chemistry Study Using Hydroxamate Collectors and Citric Acid" XXVII International Mineral Conference, Santiago, Chile (Oct. 24, 2014) (Year: 2014).*

(Continued)

Primary Examiner — Thomas M Lithgow
(74) Attorney, Agent, or Firm — Dorsey & Whitney LLP

(57) ABSTRACT

Disclosed herein are methods and systems for recovery of ancylite, a rare earth mineral comprising strontium carbonate, from rare earth ore. In many embodiments, the disclosed methods and systems provide for recovery of greater than 50% of the ancylite from an ancylite containing ore. In many embodiments, the ore is subjected to flotation in the presence of an acid, for example a hydroxamic acid, such as octanohydroxamic acid. The ore may also be subjected to magnetic separation, for example wet high intensity magnetic separation.

17 Claims, 45 Drawing Sheets
(37 of 45 Drawing Sheet(s) Filed in Color)

(51) Int. Cl.
   B03D 1/002          (2006.01)
   B03D 1/012          (2006.01)

(56)          References Cited

U.S. PATENT DOCUMENTS 6,409,022  B1 *   6/2002   Rothenberg ............ B03D 1/008
                                                              209/166
 2017/0028410  A1 *   2/2017   Anderson  .............. B03D 1/008

OTHER PUBLICATIONS

Fuerstenau et al, "Design and development of novel flotation reagents for the beneficiation of Mountain Pass rare-earth ore", Minerals & Metallurgical Processing, vol. 30, No. 1, Feb. 2013 (Year: 2013).*
Xia L., Hart B., Chelgani S.C., Douglas K., "Hydroxannate collectors for Rare Earth minerals Flotation", Conference of Metallurgist Proceedings (2014). (Year: 2014).*
Krishnamurthy N., Gupta C. K., Extractive Metallurgy of Rare Earths, Chapter 3, pp. 132-200, CRC Press, 1st Edition, 2004. (Year: 2004).*
Jordens A. et al, "Surface chemistry considerations in the flotation of bastnasite", Mineral Engineering, 66-68 (2014), pp. 119-129. (Year: 2014).*
Amankonah, J. 0. et al., "Effects of dissolvedmineral species on the electrokinetic behavior of calciteand apatite", Colloids and Surfaces; vol. 15, 1985, pp. 335-353.
British Geological Survey, "Rare earth elements: a beginner's guide from the BGS", Available online at http://www.bgs.ac.uk/research/highlights/2010/rare_earth_elements.html, 2011, 3 pages.
Broton, D. J., "Lithium based borate fusion of gypsum/high sulfate samples: A new approach", JCPDS-International Center for Diffraction Data, 1999.
Cheng, Ta-Wui et al., "Froth flotation of monazite and xenotime", Minerals Engineering; vol. 6, 1993, pp. 341-351.
Fuerstenau, M. C. et al., "Hydroxamate vs. fatty acid flotation of iron oxide", Society of Mining Engineers, AIME. Transactions; vol. 247, 1970, pp. 69-73.
Gupta, C.K. et al., "Extractive Metallurgy of Rare Earths", CRC Press, 2005, pp. 1-462.
Lee, K. et al., "Flotation of mixed copper oxide and sulfide minerals with xanthate and hydroxamate collectors", Minerals Engineering, 2008, pp. 1-7.
Long, Keith R. et al., "The Principal Rare Earth Elements Deposits of the United States—A Summary of Domestic Deposits and Global Perspective", Scientific Investigations Report 2010-5220, 2010, 104 pages.
Lynas Corporation Ltd, "Concentration Plant", Available online at http://www.slideshare.net/Lynas_Malaysia/7187-lynas-flyersv8bfa61112-cp, Apr. 2011, 2 pages.
Miller, J.D. et al., "Bench scale flotation of sedimentary phosphate rock with hydroxamic acid collectors", Bench Scale Flotation of Sedimentary Phosphate Rock, 2002, pp. 93-101.
Mineral Data Publishing, "Ancylite-(Ce)", version 1, Handbook of Mineralogy, Available online at: http://www.handbookofmineralogy.org/pdfs/ancylite-(Ce).pdf., (copyright 2001-2005). 1 pages.
Negro, A.D. et al., "The Crystal Structure of Ancylite, (RE)x(Ca,Sr)2-x(CO3)2(OH)x(2-x)H2O", American Mineralogist; vol. 60, 1975, pp. 280-284.
Ren, Jun et al., "Selective flotation of bastnaesite from monazite in rare earth concentrates using potassium alum as depressant", Interntaional Journal of Mineral Processing vol. 59, 2000, pp. 237-245.
Roche Engineering, Inc., "Bear Lodge Project Canadian NI 43-101 Pre-feasibility Study Report: On the Reserves and Development of Bull Hill Mine, Wyoming", Rare Element Resources, Oct. 9, 2014, pp. 1-516.
Somasundaran, P. et al., "Mineral-solution equilibria in sparingly soluble mineral systems", Colloids and Surfaces; vol. 15, 1985, pp. 309-333.
Somasundaran, P. et al., "The zero point of charge of calcite", Journal of Colloid and Interface Science; vol. 24, 1967, pp. 433-440.
Zhi Li, Ling et al., "China's rare earth ore deposits and beneficiation techniques", ERES2014: 1st European Rare Earth Resources Conference. Milos, Available online at http://www.eurare.eu/docs/eres2014/firstSession/XiaoshengYang.pdf, 2014, pp. 26-36.

* cited by examiner

BENEFICIATION OF RARE EARTH ELEMENTS BEARING ANCYLITE

CROSS REFERENCE TO RELATED APPLICATIONS

This application claims benefit of priority pursuant to 35 U.S.C. § 119(e) of U.S. provisional patent application No. 62/199,694 filed Jul. 31, 2015, which is incorporated herein by reference in its entirety.

STATEMENT REGARDING RESEARCH & DEVELOPMENT

This invention was made with Government support under award number DE-AC02-98CH10886 awarded by the Department of Energy. The Government has certain rights in the invention.

FIELD

Disclosed herein are methods and systems for enhancing the concentration of rare earth minerals, and their recovery from ore. The methods and systems, in some embodiments inclue the use of magnetic separation, to reduce the iron concentration, and floatation in the presence of one or more collectors, for example a hydroxamic acid.

BACKGROUND

Rare earth elements (REEs) are widely used for many commercial applications in high-technology and national defense over the past four decades. However, there are several issues of REEs supply for the United States including the dependence on imports from China and losing its leadership in many areas of REEs technologies. Because of China's export restrictions and growing internal demand for its REEs, additional rare earth capacity has been expected to be developed in the United States, Australia and Canada.

Currently, bastnaesite and monazite are two major economically exploited rare earth minerals throughout the world. A large amount of literature has been published to investigate the separation of bastnaesite and monazite from their gangue minerals such as calcite, barite, and apatite. Nevertheless, other rare earth minerals have been rarely studied. In this research, ancylite, a rare earth strontium carbonate, will be investigated for its surface characterization. The fundamental studies of pure ancylite, strontianite and calcite flotation behaviors in the presence of hydroxamic acid will be also studied. Another focus of this study will be on the recovery of ancylite from an ore sample containing ancylite from Bear Lodge rare earth deposit, located in Wyoming.

SUMMARY

Described herein are methods and systems that may be useful to increase the concentration of a strontium compound in an ore sample. In one embodiment, the ore sample is an ancylite containing ore sample. The ore sample may be combined with one or more collectors selected from carboxylic acids, fatty acids, dicarboxylic acids, hydroxamic acids, and naphthalic compounds. In some embodiments the collector is at a concentration of about 0.01 and 0.00001 mol/liter, and includes a hydroxamic acid, such as naphthyl hydroxamic acid, octanohydroxamic acid, and/or potassium ethyl xanthate. The ancylite/collector combination can then be agitated or mixed to allow floating of the ancylite/collector combination to produce a tailing fraction and a concentrated ancylite fraction. The tailing fraction may then be separated from the concentrated ancylite fraction thereby increasing the concentration of ancylite. In some embodiments, the ore sample is processed to have a mesh size less than about 100 mesh, 200 mesh, 300 mesh, 400 mesh, or 500 mesh, in some embodiments, the mesh is −325. Floatation may include passing a gas through the combination. In some embodiments, the pH of the ancylite/collector combination is adjusted to between about 6 and 11, for example by the addition of an acid and/or base, for example strontium nitrate, HCl, or KOH. Floating is performed with solids at between about 10% and 40%, for example 20% or 11.1%. In some embodiments, the ore sample is subjected to crushing and grinding prior to the combining step. The method of claim 1, wherein, prior to the combining step, separating the ore sample with a wet high intensity magnetic separator into two groups—a predominantly iron-containing ore and a predominantly ancylite-containing ore; wherein the separator has a grooved plate matrix and applies a magnetic field with a current of between 0.1 and 20 amperes/sq. meter current flux. In various embodiments, the separating step is a wet high intensity magnetic separation.

Also disclosed is a system for recovery of ancylite from a rare earth ore comprising: a conditioner unit, a floater unit, a thickener unit, a filter unit, and a drying unit. In some embodiments, the system further includes a crushing unit, a grinding unit, a magnetic separator unit, or a combination thereof.

In some embodiments, the disclosed system and methods may be used to process ore containing between 2 and 10%, or more rare earth oxides (REO), for example 4.5% REO. The ore may be reduced to particulate size, for example to less than about 100, 200, 300 or 400 mesh, for example 100 mesh. The ore particles may be the subject to separation by wet high intensity magnetic separators (WHIMS) at between about 1 and 10 amps/m$^2$ current flux, for example 8.75 amp/m$^2$. This separation may produce a concentrate containing around 3.4% REO. This separated tailing can be use to create a slurry, by mixing with various additives, such as a collector, an ionic compound, and a frother. In some embodiments, additives may include one or more of strontium nitrate, hydroxamic acid and an alcohol-based frother. The pH of the slurry may be about 6-10, for example about 9, and may or may not necessitate the addition of acids and/or bases. The slurry may contain solids at a concentration of from about 3% to 30%, for example about 20%. The slurry may be transferred to a rougher flotation unit to produce a rougher concentrate, assaying approximately 10.6% REO, which may then be transferred to a cleaner conditioning tank where hydroxamic acid, strontium nitrate and frother are added. The resulting slurry, which may have a solids concentration of between about 3% and 30%, for example 11.11% solids, is thereafter transferred to a cleaner stage with pH 9. The cleaning stage may yield a final concentrate of REO, from about 2% to about 20%, for example about 12.0% REO. In some embodiments, the overall REO recovery may be from about 40% to about 80%, for example 61.6%. A tailing from the cleaning stage may be returned to the rougher flotation unit, for reprocessing. A final tailing may be obtained with a REO concentration of approximately 2% to 20%, for example 3.3% REO.

The patent or application file contains at least one drawing executed in color. Copies of this patent or patent application publication with color drawing(s) will be provided by the Office upon request and payment of the necessary fee.

DETAILED DESCRIPTION

Rare Earth

The rare earth elements, as we all know, are a group of lanthanides and yttrium (atomic number 39), plus scandium (atomic number 21), which are chemically similar to the lanthanides. The lanthanides contain the following: lanthanide, cerium, praseodymium, neodymium, promethium, samarium, europium, gadolinium, terbium, dysprosium, holmium, erbium, thulium, ytterbium, and lutetium (atomic number 57-71). The group of rare earths could be divided into two subgroups, namely light rare earth elements (LREEs) and heavy rare earth elements (HREEs), based on the atomic weight. LREEs normally contain from lanthanide to neodymium, sometimes including samarium, while HREEs are a group of rare earth elements whose atomic number is from 63 to 71, and yttrium is considered heavy rare earth because of the chemical similarity as well [1]. Unlike the other elements in the periodic table, the size of lanthanide atoms and ions steadily decreases with the increase in atomic number, which is named by the term of lanthanide contraction. Similarity of the size of the yttrium atom and tripositive ion with the heavier lanthanide can explain that the occurrence of yttrium is associated with the heavier lanthanide [1]. Besides, lanthanide contraction also contributes to basicity that determines that rare earth cations can hydrolyze in aqueous solutions [1] and form a stable complex with certain chelating agents, which will be illustrated the detail below. Due to the similarity of ionic radii and the trivalent charge, they are commonly associated with each other.

Figure 1:
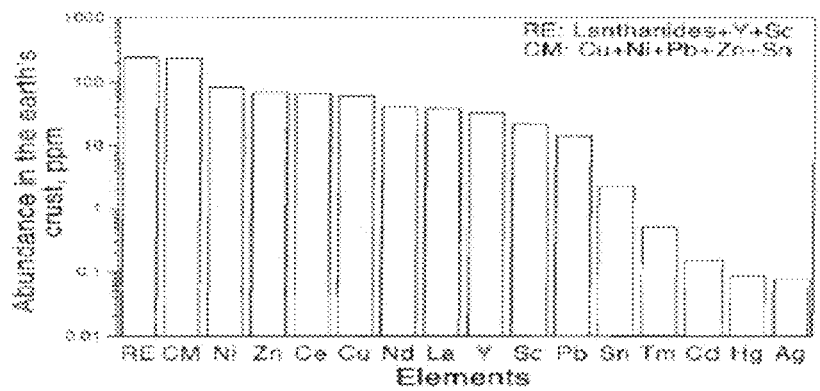
FIG. 1 is a graph showing the abundance of rare earths and certain common elements in the earth's crust.

The rare earth elements are, contrary to the name, relatively abundant in the Earth's crust. Cerium which is the most abundant rare earth element, as shown in FIG. 1, is more plentiful than copper, lead, etc. [1]. The estimated average concentration of the rare earth elements is around 150 ppm shown in Table 2.1. However, their high dispersion and uneven distribution result in few mining operations with an economically high grade of rare earth.

Rare Earth Classification

About 200 distinct species of rare earth minerals have been found throughout the world, including halides, carbonates, oxides, hydrates, phosphates and silicates. In the view of rare earth resources, owing to the crystal structure and coordination numbers of REEs, LREEs tend to be rich in carbonates and phosphates, and HREEs are expected in oxides and phosphates [2]. Table 2.2 shows the rare earth minerals that have been found in the United States, with their chemical formula and rare earth oxide (REO) content.

TABLE 2.1

Estimates of the crustal abundances of rare earth elements

| Rare earth elements | Taylor [3] ppm | Wedepohl [4] ppm | Hawkesworth and Kemp [5] ppm |
|---|---|---|---|
| lanthanum | 30 | 30 | 20 |
| Cerium | 60 | 60 | 43 |
| Praseodymium | 8.2 | 6.7 | — |
| Neodymium | 28 | 27 | 20 |
| Samarium | 6.0 | 5.3 | 3.9 |
| Europium | 1.2 | 1.3 | 1.1 |
| Gadolinium | 5.4 | 4 | 3.7 |
| Terbium | 0.9 | 0.65 | 0.6 |
| Dysprosium | 3.0 | 3.8 | 3.6 |
| Holmium | 1.2 | 0.8 | — |
| Erbium | 2.8 | 2.1 | 2.1 |
| Thulium | 0.48 | 0.3 | — |
| Ytterbium | 3.0 | 2 | 1.9 |
| Lutetium | 0.5 | 0.35 | 0.3 |
| Yttrium | 33 | 24 | 19 |
| Total | 183.68 | 168.3 | 119.2 |

Currently, bastnaesite, monazite and xenotime are three rare earth bearing minerals can be economically exploited. Bastnaesite with the content of 70% REO, mostly consisting of light rare earth elements, is the primary source of rare earth in rare earth production [1]. Monazite was the chief source of rare earths before bastnaesite became the principal source in the world [6]. Monazite, a rare earth phosphate, is mainly present in beach placers that contain other heavy minerals like ilmenite, rutile and zircon throughout the world, including Australia, China, India and USA [1]. Nevertheless, most of monazite extraction is not viable because of the cost associated with the disposal of thorium and uranium present in the monazite [7]. Other than three major rare earth minerals, a limited discussion of numerous minerals than contain rare earth has been published. For instance, ancylite, a group of strontium carbonate minerals enriched by cerium, lanthanum and minor amount of other rare earth [8], is rarely studied. Ancylite is a carbonate mineral whose chemical formula is: $(RE)_x(Sr, Ca)_{2-x}(CO_3)_2(OH)_x \cdot (2-x)H_2O$ [9]. Ancylite-(Ce) and ancylite-(La) are common types which occur in some nepheline syenites and carbonates [10]. The composition of ancylite varies from place to place. It is distributed throughout the world including in Canada, Russia, U.S.A, Brazil and Greenland. Under the sunlight, the color of ancylite will possibly be pale yellow-orange, pink, yellowish brown to brown and gray, and it will be colorless in transmitted light [10].

Inner Mongolia, and Mountain Pass in the U.S.A., there are still a large number of projects under development throughout the world.

Beneficiation of Rare Earth

Commonly, rare earth minerals are separated through gravity separation, magnetic separation and froth flotation

TABLE 2.2

Classification of rare earth minerals [11], [12]

| Mineral name | Chemical formula | Content (% wt) | | |
|---|---|---|---|---|
| | | REO | $ThO_2$ | $UO_2$ |
| Oxides | | | | |
| Anatase | $(Ti,REE)O_2$ | — | — | — |
| Euxenite | $(Y,Er,Ce,U,Pb,Ca)(Nb,Ta,Ti)_2(O,OH)_6$ | — | — | — |
| Fergusonite | $YnbO_4$ | — | — | — |
| Samarskite | $(Y,Er,Fe,Mn,Ca,U,Th,Zr)(Nb,Ta)_2(O,OH)_6$ | — | — | — |
| Carbonates | | | | |
| Ancylite | $Sr(Ce,La)(CO_3)_2OH \cdot H_2O$ | 46 to 53 | 0 to 0.4 | 0.1 |
| Bastnasite | $(Ce,La)(CO_3)F$ | 70 to 74 | 0 to 0.3 | 0.09 |
| Parisite | $Ca(Ce,La)_2(CO_3)_3F_2$ | 59 | 0 to 0.5 | 0 to 0.3 |
| Synchisite | $Ca(Ce,La)(CO_3)_2F$ | 49 to 52 | 1.6 | — |
| Phosphates | | | | |
| Britholite | $(Na,Ce,Ca)_5(OH)[(P,Si)O_4]_3$ | 56 | 1.5 | — |
| Florencite | $(La,Ce)Al_3(PO_4)_2(OH)_6$ | — | 1.4 | — |
| Monazite | $(Ce,La,Th,Nd,Y)PO_4$ | 35 to 71 | 0 to 20 | 0 to 16 |
| Xenotime | $YPO_4$ | 52 to 67 | — | 0 to 5 |
| Silicates | | | | |
| Allanite | $Ca(Ce,La,Y,Ca)Al_2(Fe^{2+},Fe^{3+})(SiO_4)(Si_2O_7)O(OH)$ | 3 to 51 | 0 to 3 | — |
| Kainosite | $Ca_2(Ce,Y)_2(SiO_4)_3CO \cdot H_2O$ | — | — | — |
| Thalenite | $Y_2[Si_2O_7]$ | — | — | — |

Rare Earth Distribution

Figure 2:
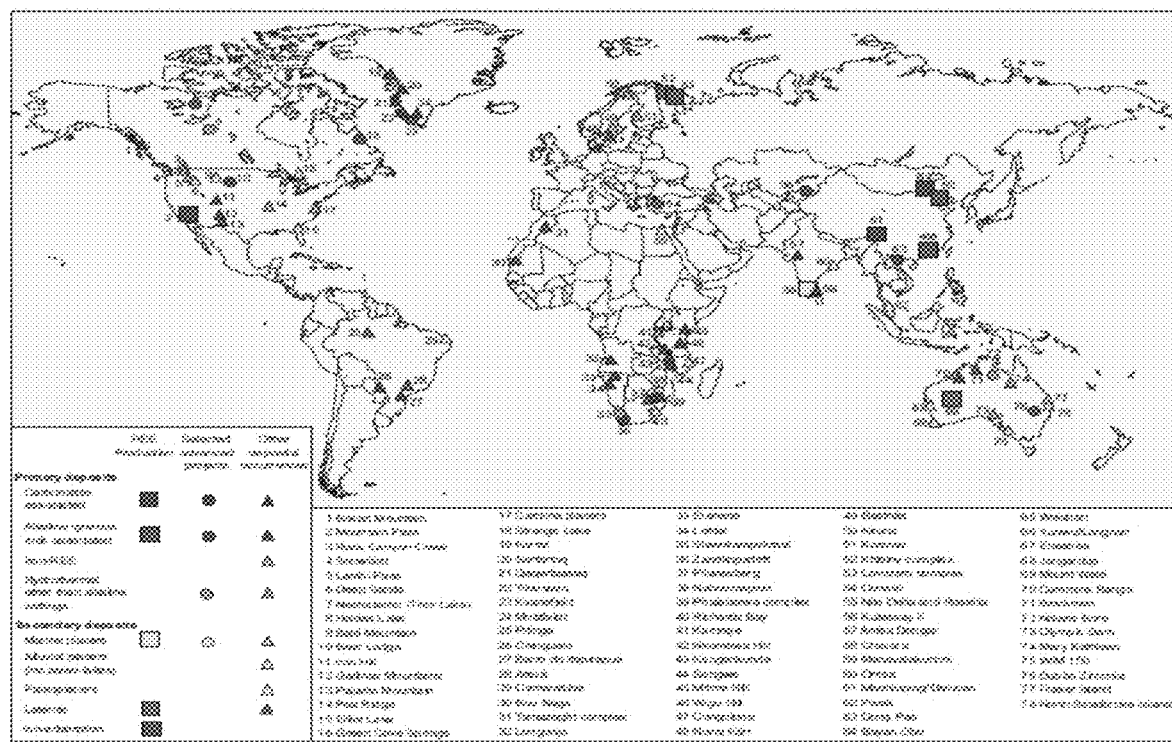
FIG. 2 is a map showing the global distribution of REEs deposits.
Figure 3:
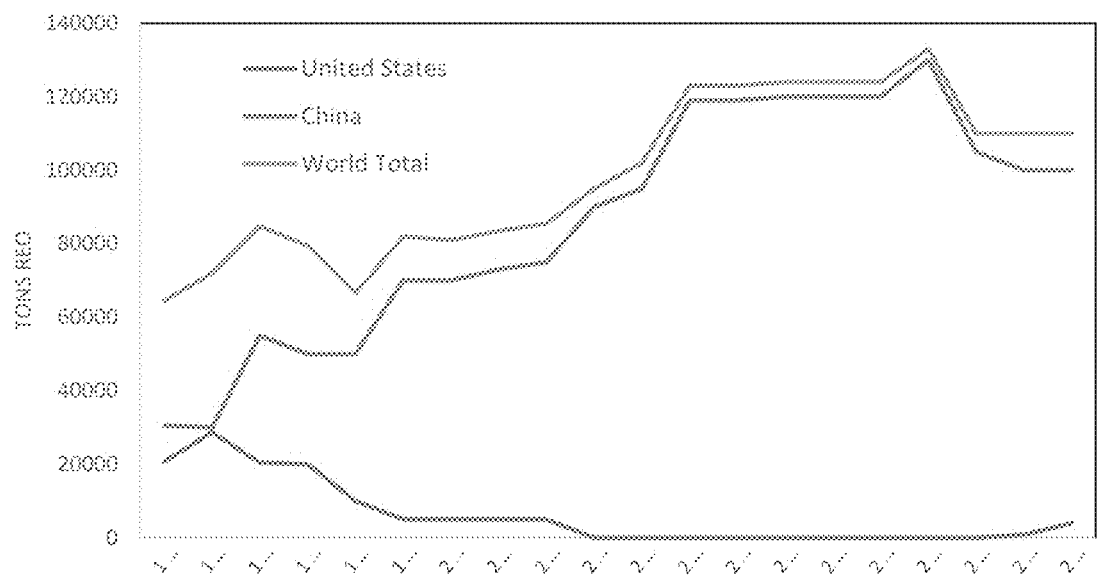
FIG. 3 is a graph showing American, Chinese and the world REO production between 1994-2013.

Rare earth is widely distributed throughout the world. At present, there are about 78 countries with rare earth deposits (FIG. 2) [13]; however, because of environmental and economic concerns, there are few countries to exploit their deposits. According to the USGS, in 2013, there were 140 million tons of rare earth reserves in the world, compared with 110 million tons in 2012, and the mine production has been constant since 2011 [10][14]. China ranks the first in mine production with 91%; the second is the United States with 3.64%, and the third is India with about 2.64% [15]. FIG. 3 shows Chinese rare earth production increased steadily until 2006 which is consistent with the global production trend, while the United States shut down the Mountain Pass Mine in California in 2003. Since 2010, because of the restriction of Chinese rare earth exports, the production decreased slightly, while the United States started producing rare earth again in 2012.

China has been in the dominant position in the rare earth supply market for over 15 years [15]. China is cracking down on illegal rare earth mines and consolidating legitimate rare earth mines. In 2012, the Ministry of Industry and Information Technology of the People's Republic of China reported that more than 600 cases of illegal prospecting and mining were investigated, and 13 mines and 76 smelting and separation enterprises were ordered to cease production [25]. However, since the restriction of the supply of REO has been issued because of the environmental and domestic concerns in China [26], more efforts have been made all over the world to develop rare earth deposits in order to make up the decrease of Chinese exports of rare earth and meet the increasing demand for rare earth end products. Aside from several existing rare earth plants, including Mayan Obo in based on their different specific gravity, magnetic quality and surface chemistry with gangue minerals.

Gravity Separation of Rare Earth

Due to the relatively high specific gravity (4-7 $g/cm^3$), rare earth oxides can be recovered from low density gangue minerals through gravity separation. Gravity methods currently include jigs, shaking tables, centrifugal gravity concentrators and others [27]. In order to extract the minerals from heavy, coarse beach sand, gravity separation is commonly used. The complexity of the minerals contributes to the combination of several extraction methods, such as magnetic separation, gravity separation and flotation, because gravity separation alone does not successfully recover rare earth from gangue minerals.

Figure 4:
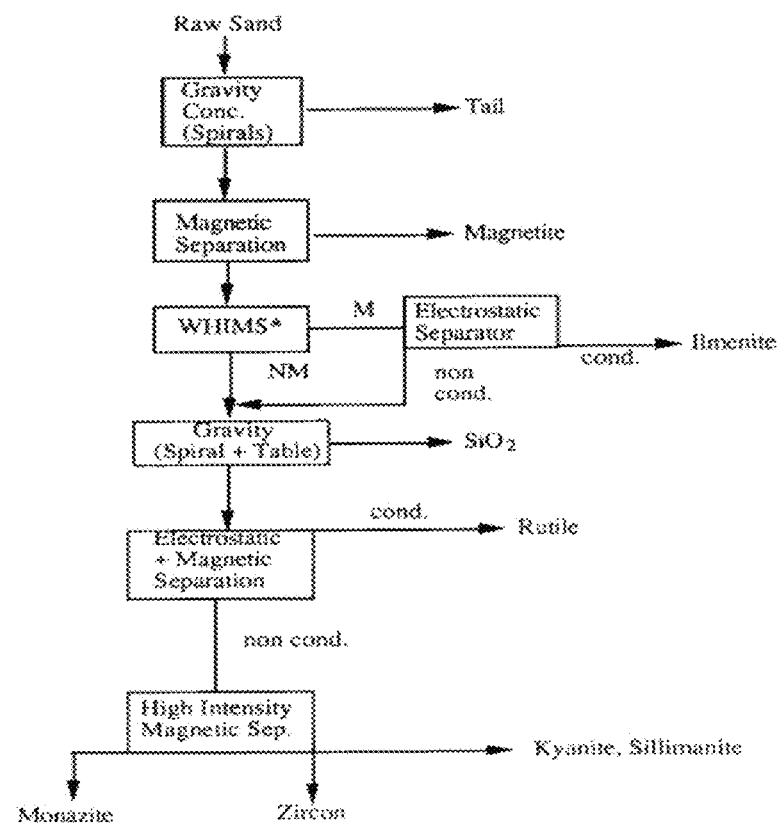
FIG. 4 is a flowchart of a coarse heavy mineral sand from Congolone, Mozambique.
Figure 5:
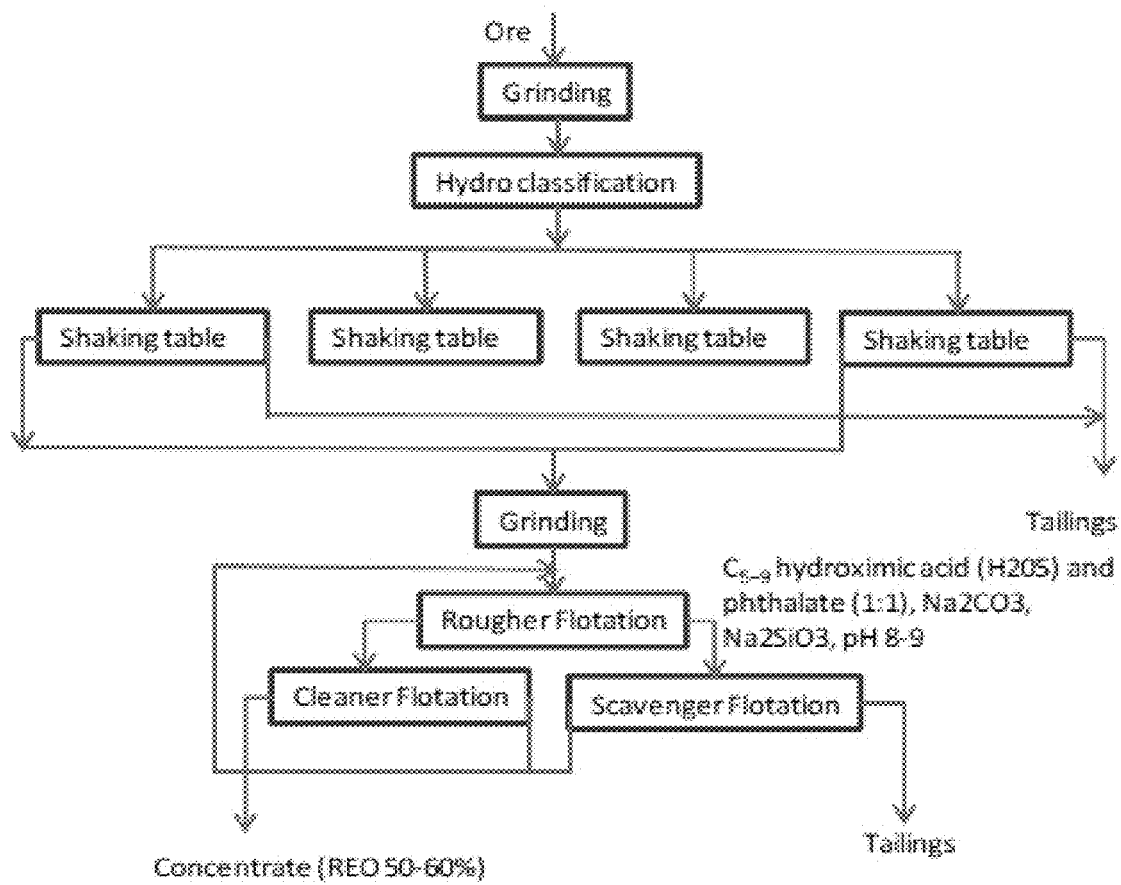
FIG. 5 is a flowchart showing the gravity separation-flotation process at Mianning REE plant.

The typical flowsheet of the heavy mineral sand from Congolone, Mozambique is shown in FIG. 4. Moreover, gravity separation can be used in beneficiation of bastnaesite as well. Õzbayoğlu et al. (2000) reported that using cyclones and multi-gravity separators (MGS), a bastnaesite concentrate with around 35.5% REO grade and 48% recovery was obtained [6]. In the Mianning rare earth plant, gravity separation was employed in conjunction with flotation. As shown in FIG. 5, after gravity separation, three different grade bastnaesite concentrates were obtained with the grades of around 30%, 50% and 60%, respectively [29].

Froth Flotation of Rare Earth

Three important rare earth plants, the Bayan Obo rare earth deposit, the Mount Weld Rare Earth deposit and the Mountain Pass deposit, employ froth flotation to recover rare earth minerals. Common collectors, such as fatty acid, dicarboxylic acids, hydroxamic acids and phthalicimide, have been used in flotation of rare earth [30],[28].

Hydroxamic acids are known in the art and include a number of organic compounds having an amide and a carbonyl group.

Figure 6:
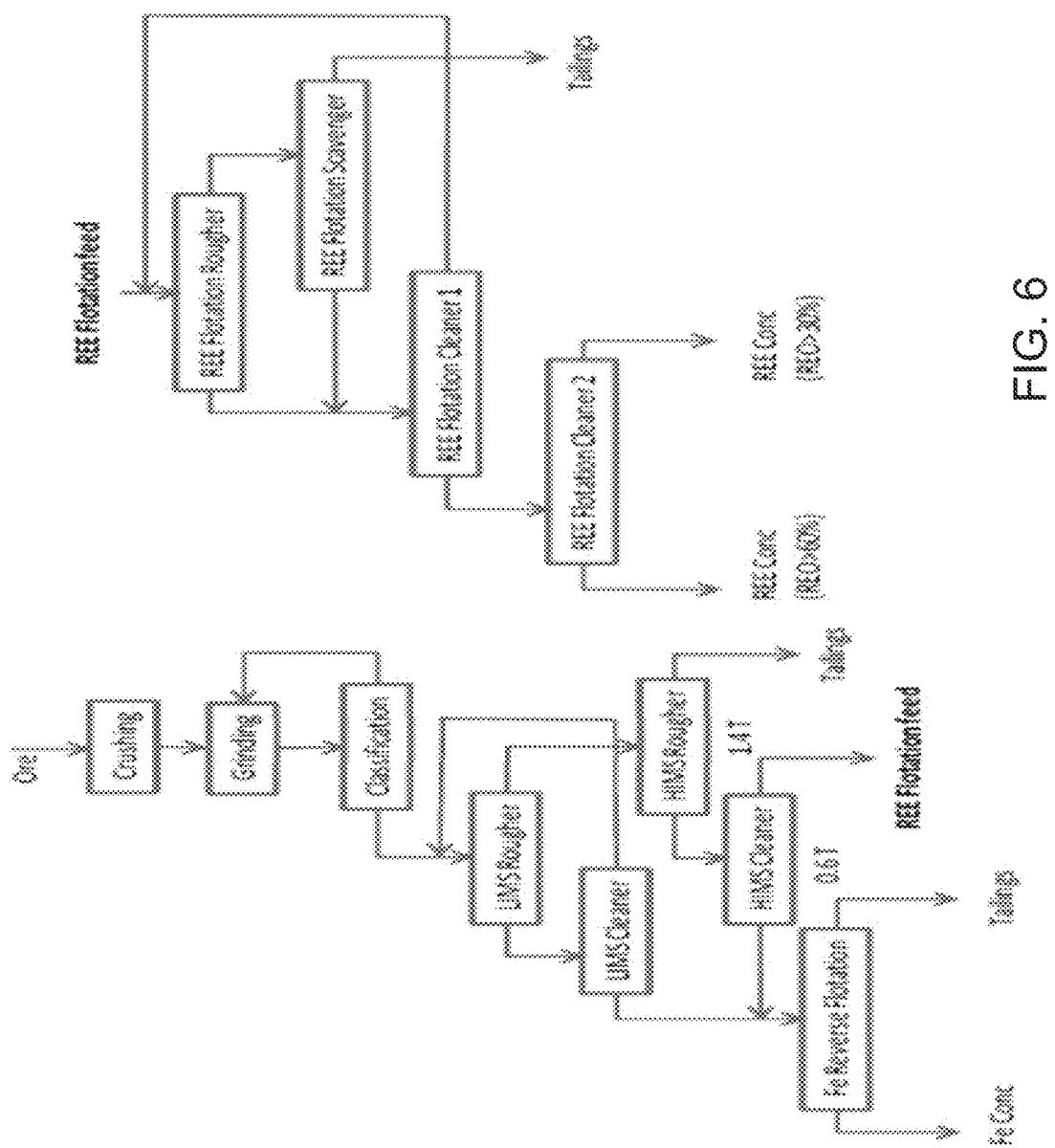
FIG. 6 is a flowchart showing the beneficiation of the Banyan Obo deposit

In the Mount Weld Central Lanthanide Deposit, the material with 38 μm of particle size was treated by three-stage flotation to recover approximately 70% of REO with 40% assay [31]. In the Mountain Pass, the feed for flotation was the product of crushing and grinding. Using oleic acid as the collector, sodium fluorosilicate and ammonium lignin sulfonate as depressants, oil C-30 as the frother, and soda ash as the adjusting reagent, the final concentrate was obtained at 70° C. to 90° C. with 60% REO assay and 65% to 70% recovery [1]. Ren et al. [32] reported that 85% of the bastnaesite was recovered in a concentrate with 69.5% REO grade that contained 97% bastnaesite in the presence of bezoic acid as the collector and potassium alum as the depressant. Morrice and Wong (1982) tested oleic acid, linoleic acid and AERO 845, which is the petroleum sulfonate product, as the collectors to recover bastnaesite from gangue minerals [33]. The flowsheet of Bayan Obo plant is described in FIG. 6. The feed with 9.78% to 12% grade REO from high intensity magnetic separation (HIMS) cleaner tailings was conditioned by naphthyl hydroxamic acid, sodium silicate and $J_{10}$. The final concentrate was obtained at a REO grade of 55% with the combined recovery of 72% to 75%. [29]

Apart from bastnaesite flotation, monazite can be also recovered by froth flotation. Abeidu (1972) [34] reported that $Na_2S$ efficiently activated the soap flotation of monazite from zircon, because after adsorption of $SH^-$ and $S^{2-}$ onto the monazite surface, the attachment of oleic acid and $SH^-$ was stronger than that of $HPO_4^{2-}$ and oleic acid. Cheng et al. (1993) reported that the chemisorption occurred in the interface of monazite and sodium oleate, and the maximum floatability of both monazite and xenotime happened at pH values greater than 7 [35].

Figure 7A:
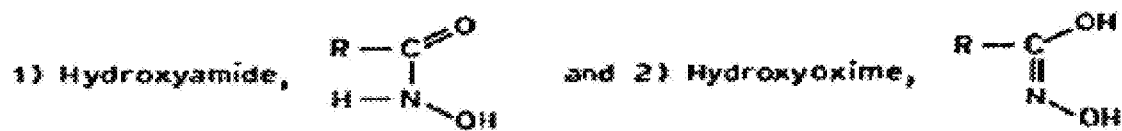
FIG. 7A depicts chemical structures showing the two tautomeric forms of hydroxamic acid.
Figure 7B:
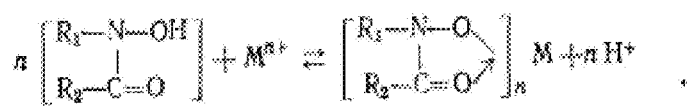
FIG. 7B is a chemical equation showing the formation of a metal complex in addition of hydroxamic acid.

There have been a number of monographs published on the study of the hydroxamic acid as the chelating collector for the flotation of sulfide minerals, oxide minerals and rare earths. Hydroxamic acids, the derivatives of both hydroxyl amines and carboxylic acids [36], are weak acids, which could be attributed to the polarization of OH and NH bonds because of the shift of the electron density. Nevertheless, it is less acidic than fatty acid, because the electronegativity of O connecting with carbonyl is stronger than that of N in the hydroxamic group [37]. They, represented by the general formula R—CO—NHOH, exist in two tautomeric forms shown in FIG. 7A. Hydroxamic acid is widely employed in flotation, because it is where chelation occurs, as shown in FIG. 7B; here, a metal ion replaces hydrogen, using the carbonyl oxygen atom to create a ring closure [39]. The $pK_a$ of the usual hydroxamic acids is close to 9, which is in accordance with pH of the optimum recovery and maximum adsorption achieved.

Figure 8:
FIG. 8 is a representation of chemisorption and surface reaction between sparingly soluble minerals and chemically bonding reagents.
Figure 8:
Figure 8:
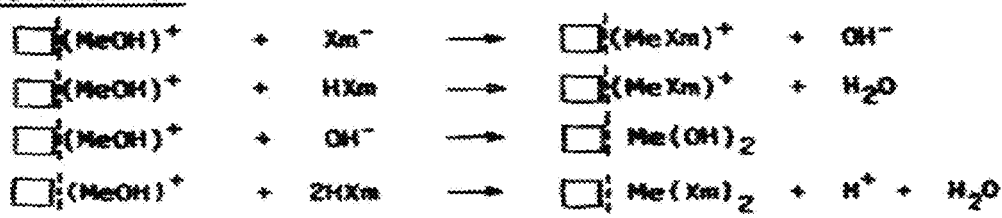

The smaller degree of ionization of hydroxamic acids results in the higher melting point of hydroxamic acids compared with that of fatty acids with the same carbon atoms and the five orders lower electric dissociation constants in contrast to those of fatty acids [37]. The results of several investigations showed that the stability constant and solubility of the chelating agents were two pronounced factors for selectivity and collection power [40],[41]. In table 2.3, it is very clear that the stability constants of ferrous, non-ferrous and rare earth elements are much higher than those of the alkali and alkali-earth ions, which is expected. The reason that hydroxamic acids can complex with various metals is that hydroxamic acid not only plays a partly covalent character and tends to form biases covalent chemical adsorption with some transition metals, but also processes an intermediate base from the viewpoint of classification of Lewis acids and Lewis bases for collectors [37]. It is also identified by Pradip and Fuerstenau [38] that the strongest complexes are formed with rare earth elements, while the weakest complexes are those formed with alkaline earth metal cations. As mentioned earlier, however, the stability that favors the adsorption density and kinetics is not the only factor that can affect selectivity, solubility sometimes plays a significant role in increasing the adsorption kinetics, because adsorption occurrence needs a certain solubility of mineral in order that the hydrolysis of the lattice cation, chemisorption, and surface reaction, as well as precipitation in the interface of minerals and collectors take place. Assis S. M. et al. (1996) reported that the selectivity of minerals flotation with hydroxamates relied on a balance between the mineral solubility and stability constant of complex hydroxamate/lattice cation, and the kinetics of hydroxamates adsorption were extremely low. [41] Chander and Fuerstenau (1975) [43] illustrated that there were three possible ways, chemisorption, surface reaction and bulk precipitation, to describe how the reagent-metal can be formed. Chemisorption is limited to a monolayer owing to the interaction of the reagent with the interface without movement of metal atoms from their lattice sites, and the difference between surface reaction and bulk precipitation is that surface reaction involves the interaction of reagents in the interface of the minerals with the metal ion moved from the lattice sites, whereas bulk precipitation occurs in the solution involving reagents with metal ions. Pradip and Fuerstenau [38] reported a series of equations to illustrate these chemisorption and surface reaction mechanisms (FIG. 8). In FIG. 8, the metal ion to the left of the dotted line means that it is in its lattice position, while the metal ion to the right of the dotted line indicates that it is moved from the lattice position.

TABLE 2.3

Stability constant of hydroxamic acid salt at 20° C. and I = 0.1 ($NaNO_3$)

| ion | Log $K_1$ | Log $K_2$ | Log $K_3$ |
| --- | --- | --- | --- |
| $H^+$ | 9.35 | | |
| $Ca^{2+}$ | 2.4 | | |
| $Mn^{2+}$ | 4.0 | 2.9 | |
| $Fe^{2+}$ | 4.8 | 3.7 | |
| $Co^{2+}$ | 5.1 | 3.8 | |
| $Ni^{2+}$ | 5.3 | 4.0 | |
| $Zn^{2+}$ | 5.4 | 4.2 | |
| $Pb^{2+}$ | 6.7 | 4.0 | |
| $Cu^{2+}$ | 7.9 | | |
| $La^{3+}$ | 5.16 | 4.17 | 2.55 |
| $Ce^{3+}$ | 5.45 | 4.34 | 3.0 |
| $Sm^{3+}$ | 5.96 | 4.77 | 3.68 |
| $Gd^{3+}$ | 6.10 | 4.76 | 3.07 |
| $Dy^{3+}$ | 6.52 | 5.39 | 4.04 |
| $Yb^{3+}$ | 6.61 | 5.59 | 4.29 |
| $Al^{3+}$ | 7.95 | 7.34 | 6.18 |
| $Fe^{3+}$ | 11.42 | 9.68 | 7.23 |

Hydroxamic acid has been extensively used in a wide range of minerals flotation studies, including hematite, $MnO_2$, rhodonite, chrysocolla, pyrochlore, cassiterite, fluorite, barite, calcite, monazite and bastnaesite. Lee et al. [44] studied the flotation of mixed copper oxide and sulfide minerals in the presence of xanthate and hydroxamate collectors. The success was obtained to simultaneously recover copper sulfides and oxides. The hydroxamate is also employed in the phosphate industry as well. Miller (2002)

reported that the phosphate recovery of 95% in a single-stage flotation was achieved with a concentrate grade of 31% $P_2O_5$ in the presence of hydroxamate [45]. The study was made by Pradip and Fuerstenau [38][46] to investigate the adsorption of hydroxamic acid on bastnaesite and semi-soluble minerals as functions of concentration and pH, as well as temperature. They identified that hydroxamic acids were favorably specific to rare earth elements instead of alkaline earth elements, and the formation of complex between rare earth and hydroxamic acid was endothermic by calculating the free energy. Fuerstenau et al. (1970) compared flotation of iron oxide in the presence of hydroxamate and fatty acid, and found that the usage of hydroxamate was much lower than that of fatty acids, even though the adsorption of fatty acids and hydroxamates were chemisorption. [47] Liang et al. [48] made a comparison of properties of carboxyl and hydroxyl oxime groups based on the effect of chelation and the energy of conjugated Pi bonding for active group of specific collectors. The results showed that the hydroxyl oxime group ranked the top in energy of conjugated Pi bonding, followed by carboxyl group and carbonyl, which suggested the highest stability of the rare earth complex could be achieved by the hydroxyl oxime group and carboxyl that constituted the hydroxamic acid. Ren et al. (1997) showed that MOHA, modified hydroxamic acid, was a selective and efficient collector for bastnaesite flotation with chemisorption accompanied with the non-homogeneous and physical adsorption [49]. Xu et al. [50] found 1-hydroxyl-2-naphthaldoximic acid as a new collector to float bastnaesite and monazite from silicate minerals in the presence of water glass as the depressant efficiently. Pavez et al. (1996) suggested that the adsorption mechanism of hydroxamic acid on monazite and bastnaesite was chemisorption at pH=9 and pH=9.3, respectively, while physical adsorption of sodium oleate on monazite and bastnaesite occurred throughout the pH and chemisorption of sodium oleate on bastanesite occurred at pH=3. [51] Moreover, C. A. Pereira et al. [52] reported that the recovery of xenotime in microflotation tests could be reaching 93.9% and 96.5%, respectively, in the presence of hydroxamic acid as the collector, and sodium silicate and starch as the depressants.

As the main gangue mineral associated with rare earth minerals, calcite has been extensively studied for several decades, including its PZC (point of zero charge), adsorption in hydroxamic acid and fatty acid, the performance in the presence of various depressants, and flotation behavior as a function of temperature. Different isoelectric points of calcite were reported in the literature. There is a considerable variance, ranging from 5 to 10.5 ([53], [[54], [55] and [56]). Mountain Pass employed sodium fluorosilicate and ammonium lignin sulphonate as the reagents to depress calcite and barite. Hernainz et al. [57] reported that quebracho and sodium silicate were more effective on depression of calcite than of celectite, in the presence of sodium oleate. As reported, sodium silicate was also employed in Bayan Obo rare earth deposit to depress calcite with the collector of H205. Compared with plenty of monographs on calcite, there is a limited literature on strontianite, probably because strontianite in industry is commonly regarded as the end-product. Martinez and Uribe (1995) reported that, from the view of thermodynamics, the isoelectric point (defines as the pH of equilibrium of salt-type mineral slurry) of strontianite aqueous suspension took place at pH 8 and the IEP (defines as the zeta potential at the plane of shear is zero) occurred at pH 7.4. [58]

Beneficiation of Bear Lodge Ore, Wyoming

Figure 9:
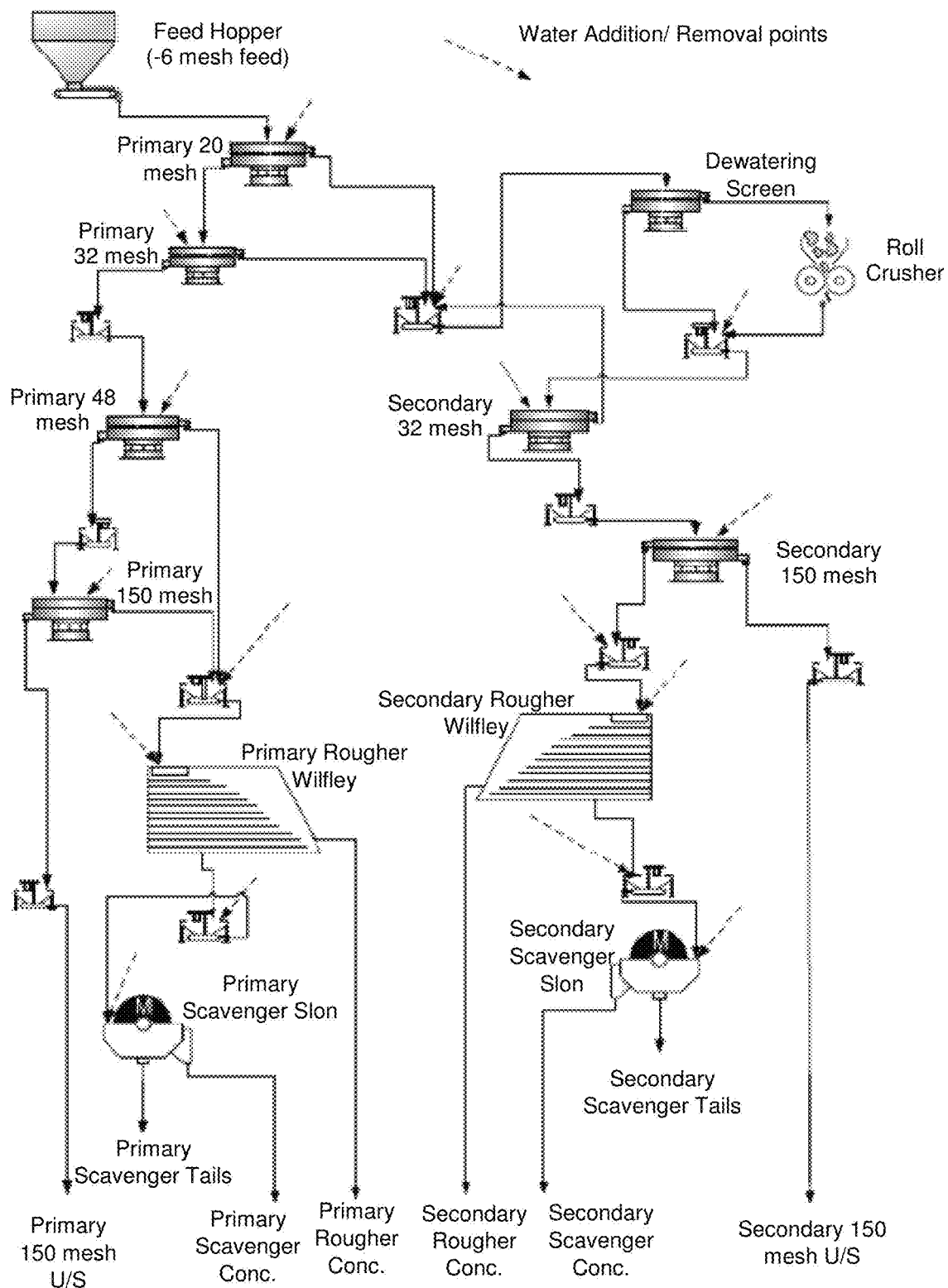
FIG. 9 is a composite 1 flowsheet.
Figure 10:
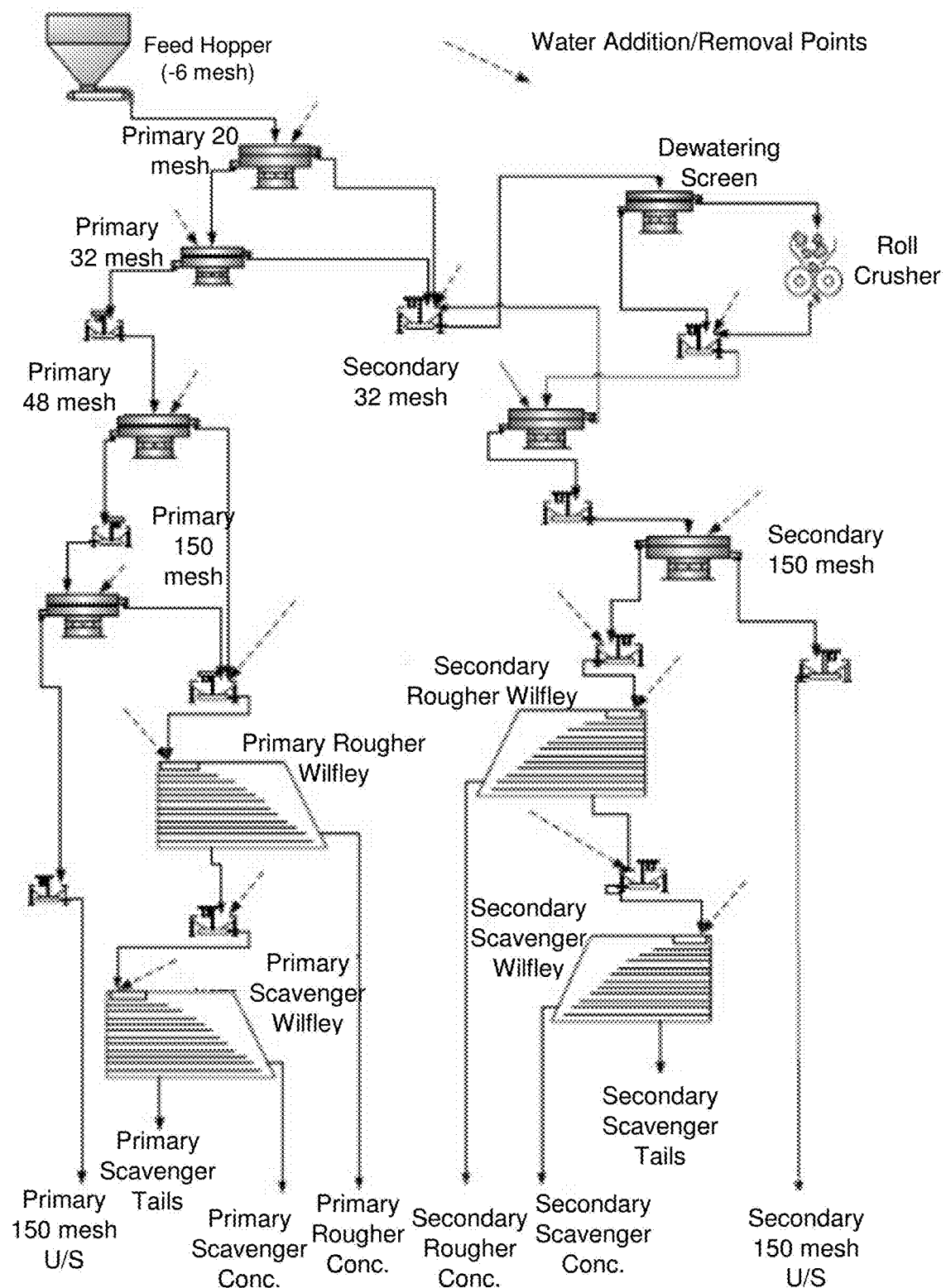
FIG. 10 is a composite 2 flowsheet.
Figure 11:
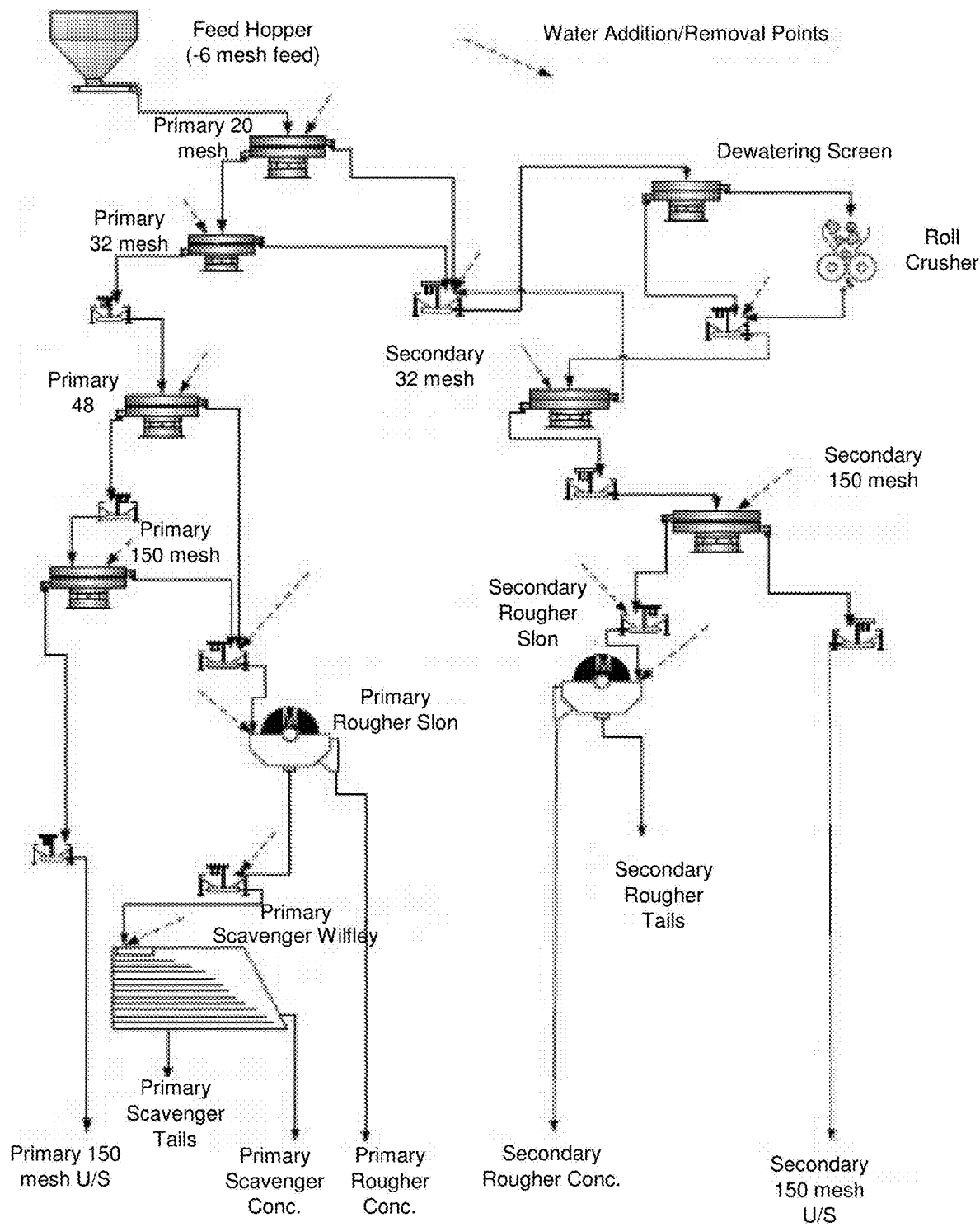
FIG. 11 is a composite 3 flowsheet.
Figure 12:
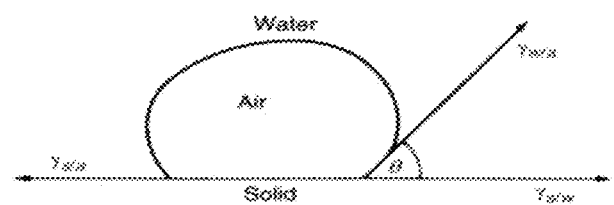
FIG. 12 is a diagram showing the contact angle between a bubble and a particle in an aqueous medium.

The Bear lodge project, located in northeast Wyoming, is held by Rare Element Resources, Inc. Based on the Measured & Indicated (M&I) resource in March 2013 [59], the total combined resource for both Greater Bull Hill deposit and Whitetail Ridge deposit is 31.8 million tons assaying 2.58% REO at a 1.5% cutoff grade. Currently, the proposed operations at the Bear Lodge Project [59] consists of the following: (1) a small open pit mine at both the Bull Hill and Whitetail deposits; (2) a physical upgrading plant (PUG), including crushing, washing, screening and magnetic separation, for pre-concentration of the rare earth-bearing fines and reduction of the associated physical mass; (3) a hydro-metallurgical plant for further concentration of the rare earth elements. A couple of both PUG batch tests and pilot tests were completed by SGS, Lakefield. Four composites with different feed assays of REO were used to run PUG pilot tests. Depending on the various mineralogical characterizations of deposits, three different flowsheets, shown in FIG. 9, FIG. 10 and FIG. 11, were employed. In FIG. 12, primary screens, a primary rougher gravity separator and a primary magnetic scavenger were employed, the circuit also contained secondary screens, a secondary rougher gravity separator and a secondary magnetic separator. Compared with composite 1 flowsheet, a secondary gravity separator was used as a scavenger in the composite 2 flowsheet. The composite 3 flowsheet contained primary and secondary screening followed by primary and secondary magnetic separation. The tailing from the primary magnetic separation went through a scavenger gravity separation unit to get the primary scavenger concentrate. The pilot-scale results is shown in Table 2.4.

A few flotation studies were also investigated by SGS in 2006. Based on the report [60], different reagent schemes were examined, which are to evaluate amine-modified fatty acid, hot pulp flotation using the reagent scheme practiced at the Molycorp operating plant and the reagent scheme developed the Grass Creek project (USA), as well as the reagent scheme employed at the Mount Weld plant. A high REO recovery was achieved, however, the REO grade was poor, which suggested that none of reagent scheme can selectively separate ancylite from strontianite.

TABLE 2.4

PUG Composites - pilot Scale Results [59]

| Composite | Feed TREO Grade, % | Concentrate TREO | |
|---|---|---|---|
| | | Grade, % | Recovery, % |
| 1 | 7.22 | 8.51 | 94.8 |
| 2 | 5.65 | 6.64 | 86.4 |
| 3 | 2.40 | 3.31 | 90.4 |
| 4 | 17.1 | 18.2 | 94.0 |

Interfacial Chemistry of Flotation

Flotation is a physic-chemical separation process on the basis of the differences in the wettability of particles [61]. The floatation basically involves three phases: solid, liquid and air phases. Since the first patent of floatation in 1906, many efforts have been made to comprehensively understand the theory of floatation, and its applications have been widely studied for complex minerals, such as lead-zinc, copper-zinc and rare earth minerals [62]. The theory of flotation that takes place is that the mineral particle can attach to the bubble, and can be lifted up to the water surface, which can be attributed to the hydrophobicity. However, some minerals are naturally hydrophobic, most minerals are hydrophilic, thus certain reagents should be used to render hydrophilic surface of minerals to hydrophobic. There are three important factors for surface chemistry of floatation in the laboratory scale: contact angle, adsorption density and zeta potential.

Contact Angle

Whether or not the hydrophobicity occurs depends on the degree of contact angle (FIG. 12) between the mineral surface and the bubble surface. Contact angle, θ, related to interfacial tension, γ, is commonly expressed by the Young equation (Eq. 3.1) between the gas (G), solid (S) and liquid (L).

$$\gamma SG = \gamma SL + \gamma LG \cos\theta \quad (Eq. 3.1)$$

The free energy change on bubble-particle contact can be referred to as Dupre's equation: (Eq. 3.2)

$$\Delta G = \gamma SG - (\gamma SL + \gamma LG) \quad (Eq. 3.2)$$

Combining Eq. 3.1 and Eq. 3.2, $$\Delta G = \gamma LG(\cos\theta - 1) \quad (Eq. 3.3)$$

According to Eq. 3.3, the free energy can be expressed in term of contact angle. The negative free energy is achieved as long as the contact angle is more than zero. Thus the free energy becomes more negative as the contact angle increases, which means that the bigger contact angle is, the more hydrophobic mineral-bubble interface is.

Adsorption

Figure 13:
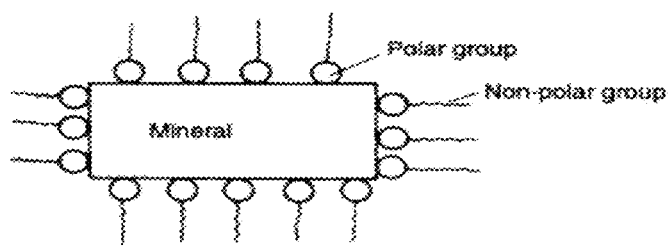
FIG. 13 is a diagram showing collector adsorption on a mineral surface.

It is well-known that hydrophobicity is rendered to the mineral by means of collectors selectively adsorbing on the mineral, which means that collectors, shown in FIG. 13, absorb on the particles with their non-polar ends orientated towards the bulk solution, thereby imparting hydrophobicity to the particle, because of chemical, physical, and electrical forces between the polar portions and surface sites [63]. An adsorption characteristic will be very helpful to deeply understand how collectors and modifiers affect adsorption of minerals and make the selective attachment between bubble and minerals steady enough. Increasing the strength the interface between bubbles in order to make bubbles more elastic is the other function of surfactants [61]. Adsorption is commonly distinguished into chemisorption and physical adsorption in terms of the interactive force between mineral surface and collectors. Physical adsorption is defined as adsorption caused by weak forces such as van der waals forces and hydrogen bonding [61]. Whereas, chemisorption happens if specific chemical interactions in the interface between minerals and collectors take place, which lead to the formation of the compound [62]. Thus, adsorption density with different pH along with certain applications of spectrometer, such as FTIR and UV-visible spectrometer, can identify the mechanism of adsorption of reagents on particles in order to optimize the flotation parameter, including reagent scheme and conditioning time.

Electrical Double Layer

Figure 14:
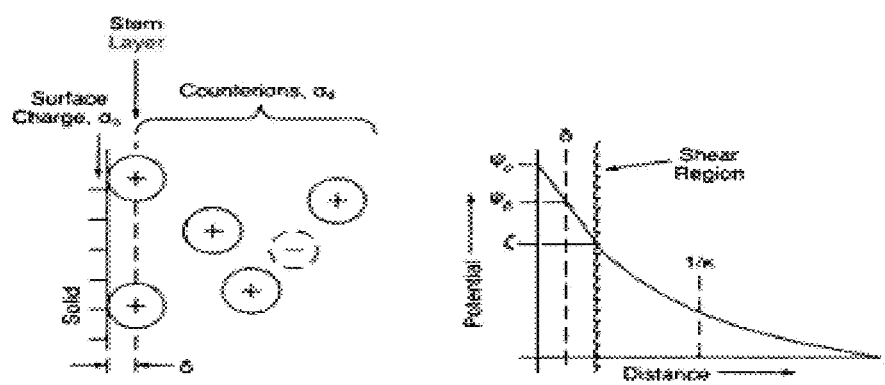
FIG. 14 is a simple schematic of the electrical double layer.
Figure 15:
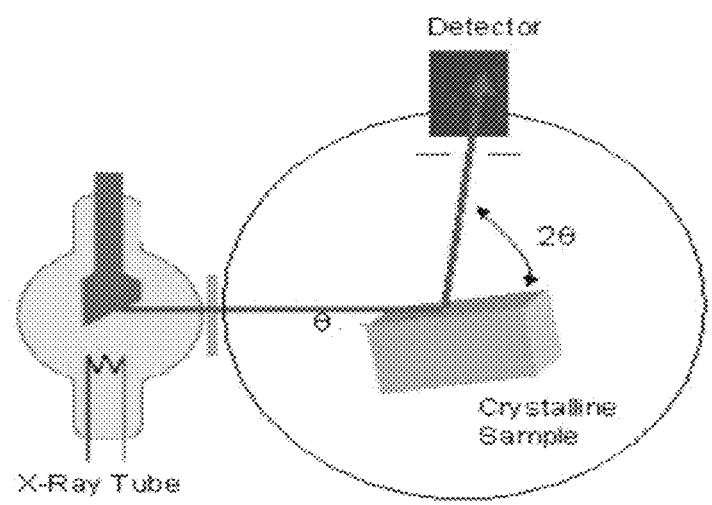
FIG. 15 is a diagram showing the scheme of X-ray diffraction.

In the study of the surface chemistry, an electrical double layer (FIG. 14) governs whether adsorption mechanism is chemisorption or physical adsorption. In system where the surfactant is physically adsorbed, flotation occurs depending on the mineral surface being charged oppositely, whereas a high surface charge could inhibit the chemisorption of collectors on minerals. An electrical double layer is the charge in solution together with the charge on the solid surface [62]. Since the solution should be neutral, the surface charge acquires equivalent amounts of opposite ions from the solution, called counter ions, to compensate. Owing to the electrostatic attraction, the counter ions are absorbed around the solid surface. The potential of stern plane determines the maximum adsorption, although it is impossible to measure the potential of stern plane directly, however, it is possible to measure the potential of shear plane that is called ζ potential [61]. ζ potential is defined as the potential at the shear plane where the liquid phase will move past the solid when forced using electrokinetic methods [61]. The isoelectric point (IEP) is the characteristic point for ζ potential measurement, since IEP can predict the sign of the charge on a mineral surface in different pH range [7].

Material Characterization

Material characterization is the fundamental parameter used for completely understanding the materials including their chemical composition, size distribution, association and sulfur content, as well as carbon content. Materials employed in this thesis are rare earth carbonate (carbonatite) provided by Bear Lodge Ore, Wyoming, calcite obtained through Ward's Natural Science Establishment, New York, ancylite and strontianite which are obtained from Ebay. Mineral liberation analysis (MLA) of carbonatite are conducted by the Center for Advanced Mineral and Metallurgical Processing (CAMP), Montana Tech of the University of Montana. Quantitative evaluation of mineralogy by scanning electron microscope (QEMSCAN), X-ray diffraction (XRD), inductively coupled plasma optical emission spectroscopy (ICP-OES) and X-ray fluorescence (XRF) are conducted by Colorado School of Mines. Characterization information may qualitatively and quantitatively guide the methodology to efficiently separate ancylite from gangue minerals.

Theories of Analytical Techniques

An illustration of theories for the analytical techniques will be helpful to better and more clearly understand and identify the mineralogical information of minerals presented in this thesis.

Mineral Liberation Analysis (MLA)

The MLA is an automated mineral analysis system combined by a large specimen chamber automated Scanning Electron Microscope (SEM), multiple Energy Dispersive X-ray detectors with automated quantitative mineralogy software [65]. It rapidly identifies and quantifies mineral characteristics, such as size distribution, mineral association and abundance, presented as flat polished surfaces, coated with a thin conductive film, usually carbon. In the late 1990s, the JKMRC Mineral Liberation Analyzer was firstly presented and commercialized with a unique method of combining back-scattered electron (BSE) image analysis and X-ray mineral identification. [66][67] Identification can be achieved by imaging mineral grains, where the BSE brightness of the minerals are varied; however, particle X-ray mapping can analyze elemental information by collecting X-ray data at each grid point when minerals have similarly bright BSE images.

The stable BSE signals from a modern SEM can meet the prerequisite of a high-resolution and a low noise image for image identification. Spatial resolution of BSE with 0.1 to 0.2 micron is much higher when compared with that of an X-ray of 2 to 5 microns [66]. Besides, there is a difference of almost two orders of magnitude for BSE analysis speed over X-ray analysis [66]. The advantages contribute to reliable detail generated of fine grains and mineral intergrowth. The main image analysis functions are known as de-agglomeration and segmentation. De-agglomeration function is involved to detect agglomerates and separate them to avoid biased results generated owing to particles not separating individually [66]. Segmentation is employed to identify mineral phases and define their boundaries properly, after individual particles are defined by de-agglomeration. The MLA segmentation outlines the regions of homogeneous grey level in a particle level [66]. The average BSE grey value of each region is corresponding to a mineral of certain average atomic number (AAN) that is related to the number of backscatter electrons emitted by the mineral [67].

The seven basic measurement modes are listed [66]:
1. Standard BSE liberation analysis (BSE).
2. Extended BSE liberation analysis (XBSE).
3. Sparse liberation analysis (SPL).
4. Particle X-ray mapping (PXMAP).
5. Selected particle X-ray mapping (SXMAP).
6. X-ray modal analysis (XMOD).
7. Rare phase search (RPS).

Quantitative Evaluation of Minerals by Scanning Electron Microscope (QEMSCAN)

QEMSCAN is a fully automated micro-analysis system performed with a Carl Zeiss EVO 50 Scanning Electron Microscope (SEM) combined with four Bruker X275HR silicon drift X-ray detectors, and the iMeasure-iDiscover® software is employed to process all analytical information. The QEMCAN provides quantitative mineralogical and textual data, as well as false-color mineral maps, including highly accurate mineral maps, elemental X-ray mapping, particle size, mineral association, etc.

An image of a sample based on chemical composition is created by back-scattered electrons (BSE) and energy dispersive (EDS) X-ray spectra. Accurate mineral identification is obtained by X-ray spectra over BSE brightness. The EDS spectrum is analyzed by windowing, background subtraction, overlap correction, thresholding, and the calculation of peak ratios [68]. A database complements the identification of minerals that cannot be identified from EDS alone.

A number of different analysis modes are available. Bulk mineralogical analysis (BMA) is used on drill core, rock and particulate particles by linear scans to identify the number and length of intercepts with mineral species and the number or type of transitions between phases for determination of mineral associations, mineral size, mineral surface area and model abundance [68]. Particle mineralogical analysis (PMA) is used for the detailed characterization of fine particles up to 1 mm in size. BSE images are obtained to determine particle diameter, perimeter and whether it is touching each other. Data from PMA is primarily used for liberation analysis, although model association is usually less accurate than bulk mineralogical analysis [68]. Specific mineral particle analysis, often in conjunction with BMA, are divided into specific mineral search (SMS) and trace mineral search (TMS). Specific mineral search performs the same way as PMA except that images are only selected for those particles that contain specific BSE brightness. This is generally used for minerals present at about 0.5 vol % or less [68]. While, TMS is generally used when trace amounts of the mineral of interest are present.

X-Ray Diffraction Analysis

X-ray diffraction are mainly used in the identification of crystalline and determination of crystalline structure, since each crystalline has its unique characteristic X-ray powder pattern.

X-rays are produced by bombarding a metal target with a beam of electrons emitted from a cathode by heating a filament. After filtering, monochromatic X-rays are collimated and directed onto the sample. The intensity of the reflected radiation is recorded using a goniometer while the sample and detector are rotated. The relationship between the X-ray wavelength ($\lambda$), the inter-plane distance (d) and the diffracted angle ($2\theta$) satisfies the Bragg's Law:

$$\lambda = 2d \sin \theta \qquad (Eq.4.1)$$

Inductively Coupled Plasma Optical Emission Spectroscopy (ICP-OES)

ICP-OES is a destructive analytical technique used for the detection of trace metals consisting of two parts: the inductively coupled plasma and the optic spectrometer. Precision attainable with liquid samples or dissolved solids is 0.2% to 0.5%, and 1% to 10% precision could be obtained for direct solid analysis through electrothermal or laser vaporization [69]. Approximately 40 or more elements can be measured simultaneously in less than one minute using ICP-OES. The range of from sub-part-per-billion (sub-ppb) to 0.1 part-per-million is the detection limit, which is one of the advantages of ICP-OES. It is well-known that samples have to be introduced into the plasma chamber in the form that can be effectively vaporized and atomized [69].

The sample preparation was performed as Broton proposed in 1999 [70]. A 0.1 grams sample was placed directly on top of a 0.5 grams flux, consisting of 60 wt % lithium metaborate and 40 wt % lithium tetraborate, to minimize the effect of the walls and bottom of a graphite crucible; a 0.5 grams flux was placed on the top of the sample to protect the sample from air with 2 to 3 drops of 20 mg/L lithium borate solution. Then the crucible was placed at 1000° C. in a muffle furnace for an hour. The final solution was obtained by diluting 200 μL sample that was made by dissolving molten melt in 25 vol % nitric acid with 10 mL 2 vol % nitric acid.

X-Ray Fluorescence Spectroscopy (XRF)

X-ray fluorescence is an analytical technique that is used as a fast characterization tool in many analytical labs throughout the world. It is based on the interaction of x-rays with a material to determine its elemental composition. High energy x-rays or gamma rays transfer enough energy to core level electron, which will be ejected from the inner orbitals of the atom. The removal of the electron will contribute to the unstable structure of the atom. Thus, in order to make the structure stable, the electron in high energy level will drop to the vacant core hole. In falling, the atom can rid itself of excess energy by either ejecting an electron from a higher energy level, referred as an Auger electron, or emitting an x-ray photon, which is called x-ray fluorescence [71]. In terms of different methodologies of detection for the photon, energy dispersive x-ray fluorescence (EDXRF) and wavelength dispersive x-ray fluorescence (WDXRF) are commonly used. The detection range for WDXRF is from beryllium to uranium, and WDXRF has the wide dynamic ranges from 100% down to ppm, and in some cases sub-ppm levels [71]. WDXRF is available for both solid and liquid. Insofar as the fundamental principle is concerned, Bragg diffraction of single crystal or multilayer are utilized to disperse fluorescence x-rays, and Bragg's equation is written as Eq. 4.2:

$$n\lambda = 2d \sin \theta \qquad (Eq.4.2)$$

Here, n is the reflection order, $\lambda$ is the wavelength of incident X-rays, d is the lattice spacing of the crystal and $\theta$ is the incident angle.

Characterization of Rare Earth Carbonatite

The characterization of the rare earth minerals from Wyoming was performed to comprehensively understand their chemical composition, association, grain liberation and sulfur/carbon content. The following sections will illustrate them, respectively.

Chemical Composition

The elemental analysis was conducted by MLA and ICP-OES. Based on Table 4.1, calcium is the most abundant metallic element. Cerium has the highest content among rare earth elements as shown in both Table 4.1. Table 4.2 shows that cerium, lanthanum and neodymium are the dominant rare earth elements. According to LECO sulfur/carbon analysis for the 200×400 mesh fraction sample, the sulfur of 2.12% is half as much as that by MLA analysis (4.0%), while the carbon content (9.3%) from combustion analysis is more than MLA carbon value at 8.5%.

TABLE 4.1

Bulk elemental analysis (wt %)

| Element | MLA |
|---|---|
| Oxygen | 39.8 |
| Calcium | 24.8 |
| Carbon | 8.33 |
| Iron | 6.69 |
| Sulfur | 5.36 |
| Strontium | 5.32 |
| Silicon | 2.62 |
| Cerium | 1.38 |
| Lanthanum | 1.36 |
| Potassium | 1.05 |
| Aluminum | 0.75 |
| Lead | 0.62 |
| Barium | 0.44 |
| Titanium | 0.38 |
| Magnesium | 0.30 |
| Zinc | 0.26 |
| Phosphorus | 0.26 |
| Hydrogen | 0.08 |
| Fluorine | 0.06 |
| Sodium | 0.04 |
| Manganese | 0.03 |
| Uranium | 0.01 |
| Copper | 0.01 |
| Tantalum | P |
| Niobium | P |
| Chromium | P |
| Neodymium | — |

P - element calculated at less than 0.01%

TABLE 4.2

Content of rare earth by ICP-OES

| Element | Wt % |
|---|---|
| Cerium | 34.73 |
| Lanthanum | 18.59 |
| Neodymium | 15.92 |
| Praseodymium | 10.02 |
| Samarium | 6.53 |
| Uranium | 2.81 |
| Gadolinium | 2.24 |
| Yttrium | 1.90 |
| Terbium | 1.72 |
| Erbium | 1.66 |
| Dysprosium | 1.14 |
| Thulium | 0.75 |
| Europium | 0.71 |
| Holmium | 0.60 |
| Ytterbium | 0.32 |
| Scandium | 0.19 |
| Lutetium | 0.17 |

Mineral identification was carried out by MLA, QEMSCAN, and XRD. Ancylite is the dominant rare earth mineral, however, the content of ancylite is varied from 7.64% by MLA to 8.32% by QEMSCAN. Bastnaesite and monazite are also found, all occurring below 0.5%. According to MLA data, the ancylite content increases as sieve size fraction decreases. Calcite is the primary gangue mineral, which is in accordance with the elemental analysis result that calcium has the highest content among the metal elements. Strontianite is the second most abundant gangue mineral from QEMSCAN, followed by pyrite. However, MLA shows that pyrite is the second most abundant mineral at 7.64%. Except for calcite, strontianite and pyrite, other minor gangue minerals, such as potassium feldspar, biotite and pyrrhotite, are identified as well. In the MLA test, since cerium, theoretically, has the same content as lanthanum in the formula of rare earth minerals, the cerium distribution can be used as a representative to study rare earth distribution in rare earth minerals. The results show that ancylite contains around 97% of the cerium. About 1% cerium is found in each of bastnaesite and monazite, respectively. The XRD results, performed in the size fraction of 200×400 mesh, illustrate that calcite has a higher content associated with lower contents of ancylite, strontianite and pyrite in comparison with the MLA results, even though calcite is still the primary mineral.

TABLE 4.3

Model mineral content (wt %)

| Minerals | Formula | MLA | QEMSCAN |
|---|---|---|---|
| Calcite | $CaCO_3$ | 59.7 | 52.03 |
| Pyrite | $FeS_2$ | 7.64 | 3.86 |
| Ancylite | $Sr(Ce,La)(CO_3)_2(OH) \cdot H_2O$ | 7.31 | 8.32 |
| Strontianite | $SrCO_3$ | 5.77 | 4.01 |
| K_Feldspar | $KAlSi_3O_8$ | 4.77 | 1.05 |
| Biotite | $K(Mg,Fe)_3(AlSi_3O_{10})(OH)_2$ | 4.21 | 1.92 |
| Pyrrhotite | $FeS$ | 2.37 | 0.18 |
| Siderite | $FeCO_3$ | 1.72 | — |
| Apatite | $Ca_5(PO_4)_3F$ | 1.35 | 0.63 |
| Wollastonite | $CaSiO_3$ | 0.89 | — |
| Barite | $BaSO_4$ | 0.75 | 0.69 |
| Galena | $PbS$ | 0.71 | 0.55 |
| Rutile | $TiO_2$ | 0.63 | 0.09 |
| Celestine | $SrSO_4$ | 0.46 | 0.16 |
| Sphalerite | $ZnS$ | 0.39 | 0.97 |
| Dolomite | $CaMg(CO_3)_2$ | 0.21 | 0.14 |
| Monazite | $(La,Ce)PO_4$ | 0.06 | 0.25 |
| Bastnaesite | $(Ce,La)(CO_3)F$ | 0.02 | 0.31 |
| Quartz | $SiO_2$ | 0.01 | 0.5 |
| Allanite | $(Ca,Ce)_2(Al,Fe)_3(SiO_4)(Si_2O_7)O(OH)$ | 0.02 | — |

Ancylite Grain Size and Liberation

It is well known that mineral grain size distribution is the key to predict and optimize the performance of mineral processes. The more liberated the mineral is, the better performance of separation will be obtained. Thus, there is a parameter, referred to as $P_{80}$, to make an assumption for a proper size of the mineral.

Figure 16:
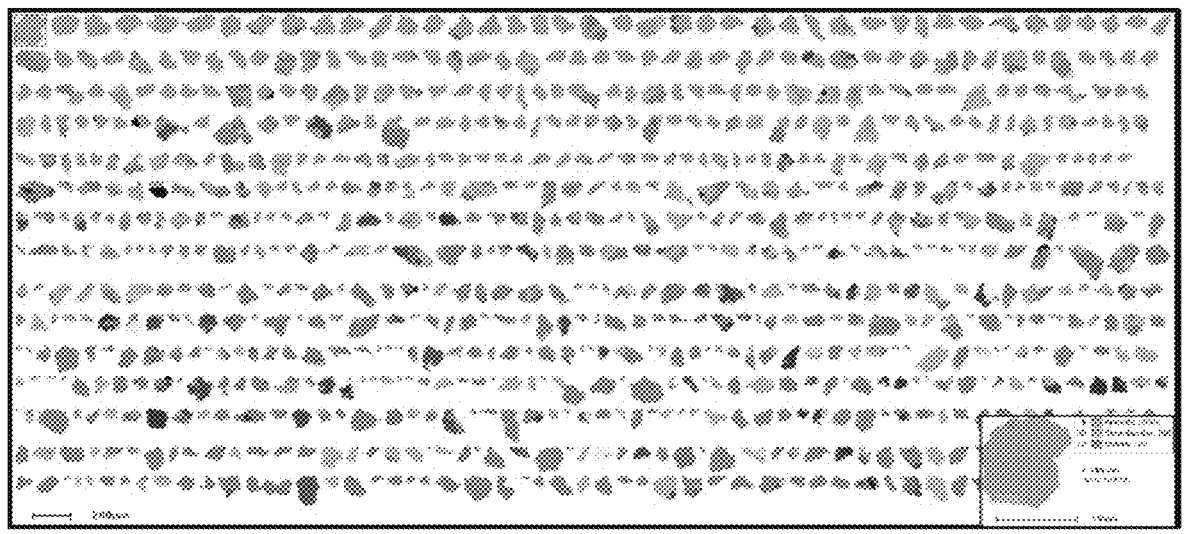
FIG. 16 is an image showing selected ancylite-containing particles (100×200 mesh).
Figure 17:
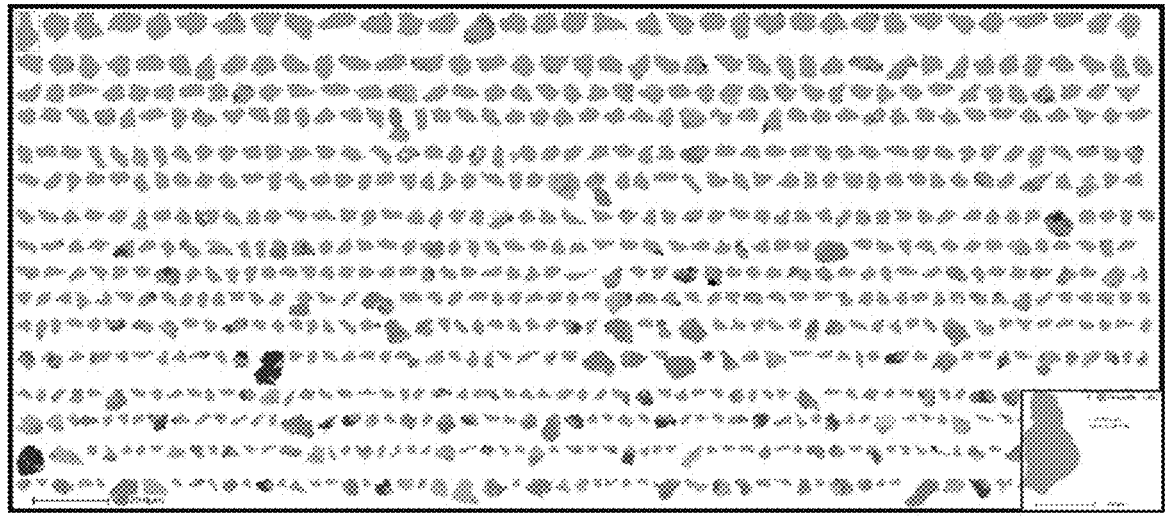
FIG. 17 is an image showing selected ancylite-containing particles (200×400 mesh).
Figure 18:
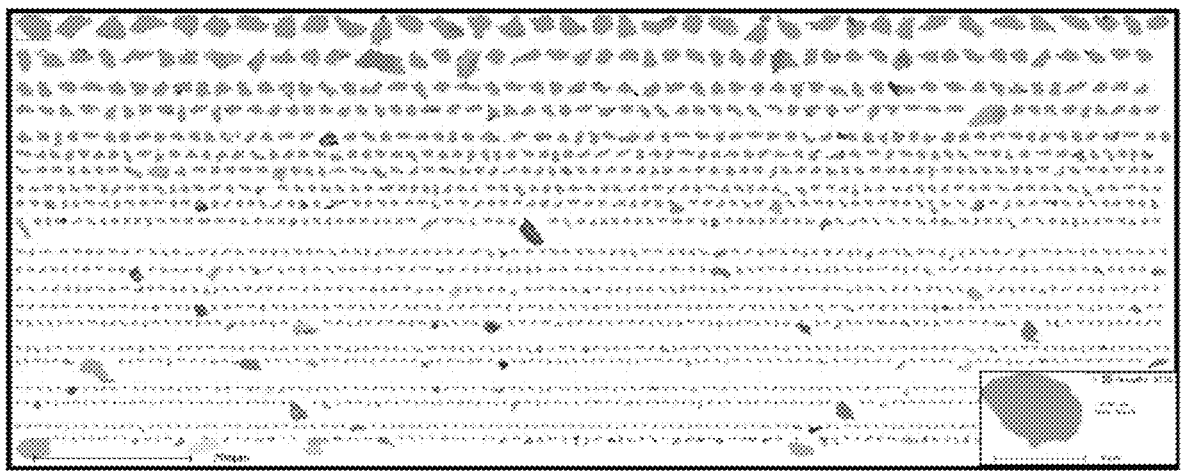
FIG. 18 is an image showing selected ancylite-containing particles (400 mesh).

The carbonatite and ancylite size distributions are displayed by sieve fraction as shown in FIG. 16, FIG. 17 and FIG. 18. The overall carbonatite and ancylite grain size distributions, $P_{80}$, were 100 and 50 μm, respectively. It indicates that the carbonatite may be pulverized to 50 μm in order to make the ancylite relatively liberated to increase the possibility in the improvement of separation efficiency. The images of selected ancylite-containing particles from three sieve fractions can also confirm that ancylite is better liberated in the finer fraction.

TABLE 4.4

Quantitative XRD analysis and MLA (200 × 400 mesh)

| Mineral | XRD (%) | MLA (%) |
|---|---|---|
| Calcite, magnesian | 80.5 | 67.0 |
| Sanidine, ferrian | 7.2 | 4.0 |
| Ancylite-(Ce) | 3.3 | 6.2 |
| Pyrrhotite | 2.7 | 2.0 |
| Strontianite | 2.6 | 4.0 |
| Pyrite, syn | 2.2 | 6.2 |
| Biotite 1M | 1.6 | 4.1 |

Mineral Associations

As shown in Table 4.4, the primary gangue minerals associated with ancylite are calcite and strontianite, followed by wollastonite and pyrite. Bastnaesite has the strongest association with ancylite and calcite. Monazite is not only strongly associated with ancylite, but with pyrite. SEM images (FIG. 19) clearly show ancylite is directly associated with strontianite, and strontianite is associated with both ancylite and calcite, whilst calcite is generally associated with strontianite. In FIG. 20, it appears that pyrite, as the dominant mineral in this particle, is associated with calcite, ancylite and pyrrhotite, as well as siderite.

TABLE 4.4

Mineral associations

| Mineral | Allanite | Ancylite | Bastnaesite | Monazite | NbUTiO | strontianite | wollastonite |
|---|---|---|---|---|---|---|---|
| Aegirine | 0.00 | 0.02 | 0.00 | 0.00 | 3.35 | 0.03 | 0.03 |
| Ancylite | 7.35 | 0.00 | 21.71 | 10.31 | 4.24 | 6.40 | 6.33 |
| Barite | 1.48 | 0.26 | 0.00 | 0.17 | 2.37 | 0.39 | 0.16 |
| Biotite | 2.69 | 0.17 | 0.00 | 0.41 | 2.53 | 0.13 | 0.16 |
| Calcite | 11.63 | 7.50 | 5.70 | 13.10 | 11.94 | 6.48 | 22.00 |
| Celestine | 0.00 | 0.31 | 2.94 | 0.77 | 0.00 | 0.33 | 0.18 |
| Chlorite | 2.29 | 0.46 | 0.20 | 0.86 | 0.08 | 0.19 | 0.06 |
| K_Feldspar | 1.75 | 0.24 | 0.00 | 0.80 | 3.76 | 0.23 | 0.33 |
| Pyrite | 0.00 | 1.09 | 0.48 | 11.82 | 0.59 | 0.43 | 0.25 |
| Rutile | 1.10 | 0.05 | 0.30 | 0.04 | 3.32 | 0.06 | 0.08 |
| Siderite | 0.00 | 0.94 | 2.42 | 4.39 | 2.34 | 0.60 | 0.26 |
| Strontianite | 0.00 | 5.04 | 2.77 | 2.99 | 0.92 | 0.00 | 5.51 |
| Wollastonite | 0.00 | 1.99 | 4.96 | 1.68 | 1.26 | 2.06 | 0.00 |
| Free energy | 70.96 | 80.93 | 57.80 | 52.02 | 62.23 | 82.11 | 63.50 |

Characterization of Materials for Flotation Fundamentals

For these experiments, calcite, strontianite and ancylite were obtained from Ward's Science Establishment, Rochester, New York and Ebay, respectively. Strontianite and ancylite were hand-sorted under UV-light. They were dry-ground in a pulverizer and the fraction of minus 325 mesh was obtained by sieving, corresponding to $P_{80}$ value of 325 mesh for Bear Lodge carbonatite, as mentioned in above. They were analyzed chemically and spectroscopically to determine the approximate compositions and the impurities present.

Characterization of Calcite

Figure 21:
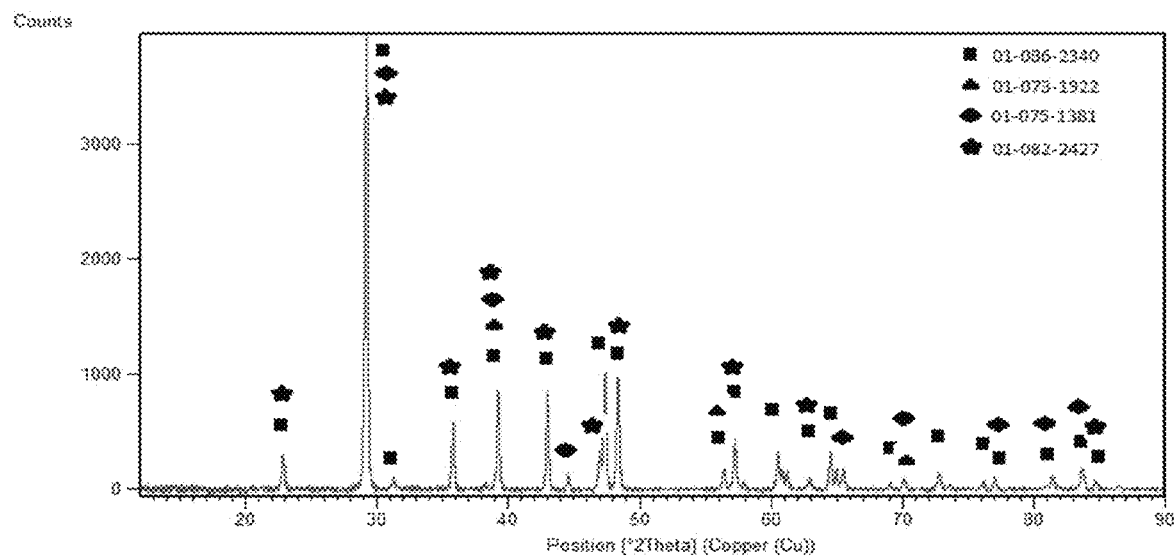
FIG. 21 is a graph showing the XRD pattern of calcite.

Semi-quantitative X-ray fluorescence spectroscopic analysis shows that calcium is the primary element with 97% content, followed by fluorine with 1.5% (Table 4.5). XRD shows that the sample is calcite (FIG. 21).

TABLE 4.5

Elemental analysis of calcite

| Element | Content (%) |
|---|---|
| Ca | 97.17 |
| F | 1.50 |

TABLE 4.5-continued

Elemental analysis of calcite

| Element | Content (%) |
|---|---|
| Mg | 0.28 |
| Si | 0.28 |
| Sr | 0.23 |
| Fe | 0.13 |
| Al | 0.13 |
| Mn | 0.07 |
| Pb | 0.07 |
| Zn | 0.02 |
| Others | 0.12 |

Characterization of Strontianite

Figure 22:
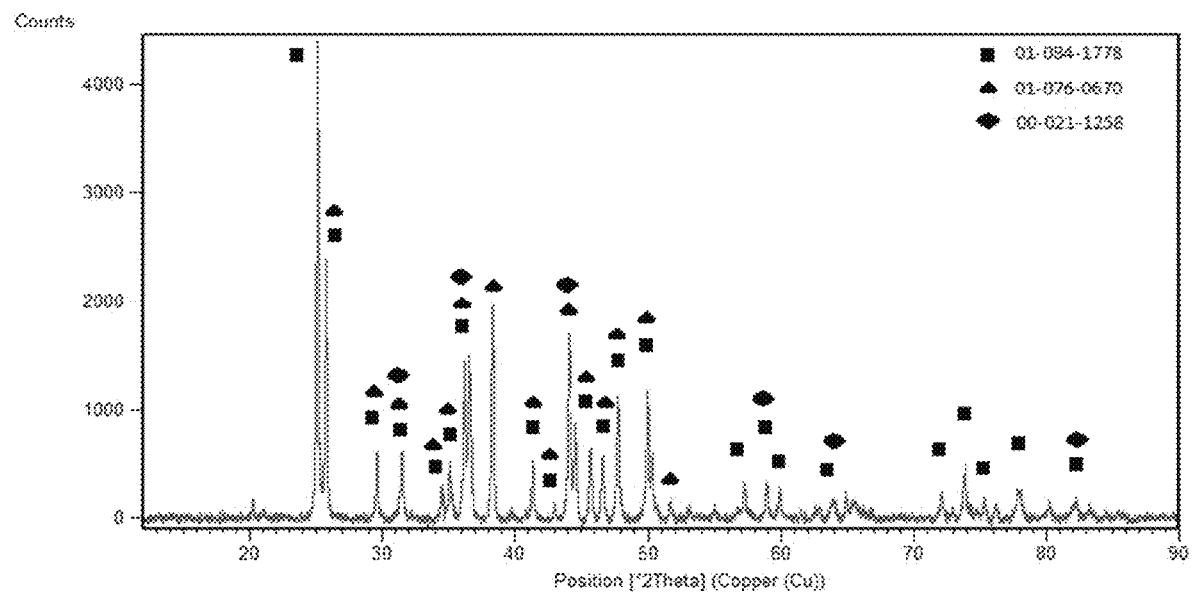
FIG. 22 is a graph showing the XRD pattern of strontianite.

The elemental composition of strontianite was measured by XRF. Strontium is found to be at 95.32%, followed by calcium (3.09%), fluorine (0.49%) and magnesium (0.182%), as well as some trace elements. The XRD result, shown in FIG. 22, illustrates that strontianite is the dominant mineral, with minor amount of serendibite and ringwoodite.

Characterization of Ancylite

Figure 23:
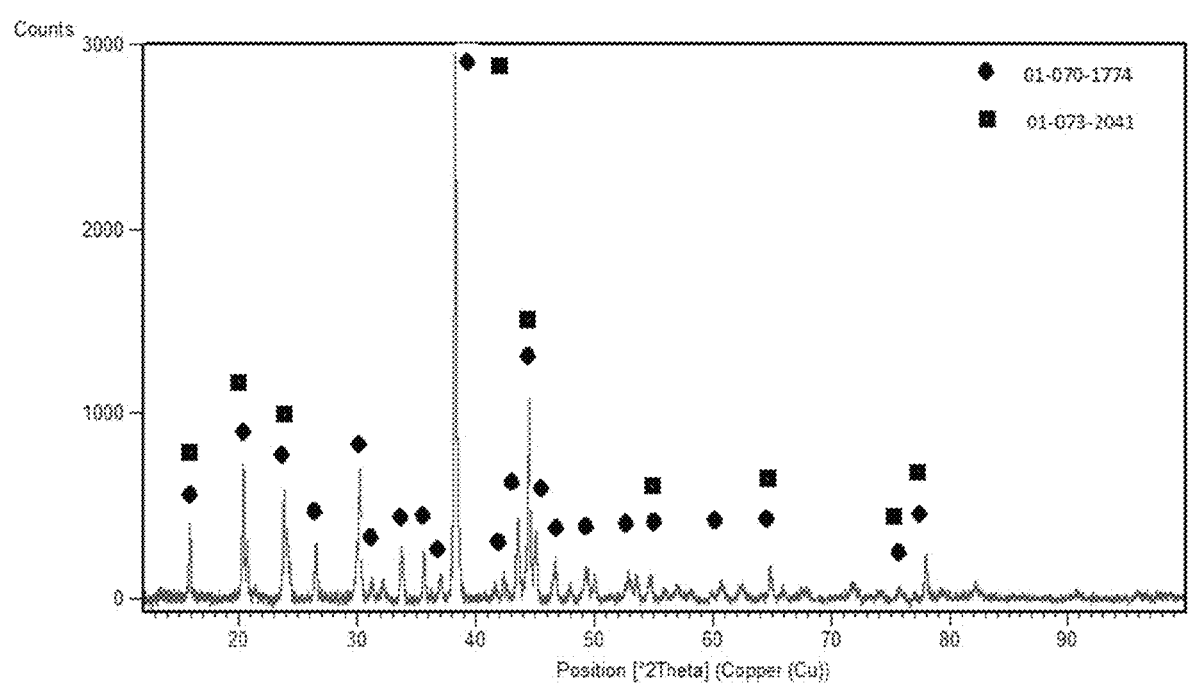
FIG. 23 is a graph showing the XRD pattern of ancylite.

Pure ancylite employed in this study was purchased from EBay. The purity was identified by XRF and XRD. The elemental composition is shown in Table 4.6, and the XRD result is illustrated in FIG. 23.

TABLE 4.6

Elemental analysis of ancylite

| Element | Content (%) |
|---|---|
| Ce | 39.33 |
| La | 24.91 |
| Sr | 15.25 |
| Nd | 8.22 |
| Ca | 3.39 |
| Si | 2.93 |
| Al | 2.34 |
| Na | 1.58 |
| Fe | 0.684 |
| Others | 1.366 |

According to the XRD results, it appears that some elements shown in XRF are not identified by XRD. The inconsistences of XRD and XRF in terms of three minerals may be attributed to the fact that the elements are trace so that the peak is so weak that XRD cannot detect. It is also noted that peaks pattern overlap may contribute to missing identification or phase ignorance.

Experimental Procedures

Experimental procedures are presented here to fully illustrate how experiments are conducted and guide others who may investigate this subject in the future.

Figure 24:
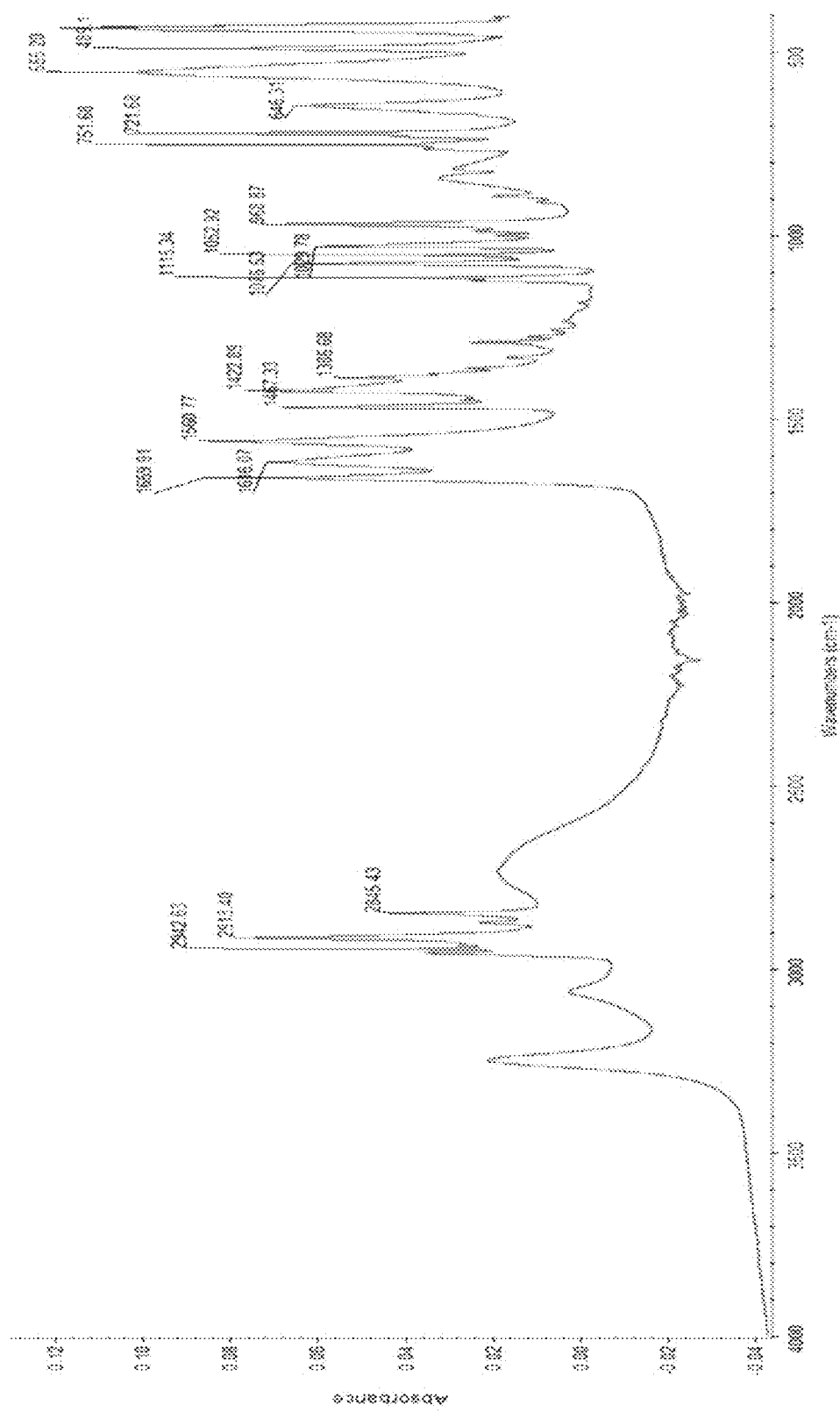
FIG. 24 is a graph showing the IR spectra of octanohydroxamic acids.

The minerals, including calcite, strontianite, ancylite and the sample from Bear Lodge Ore (carbonatite), were ground to minus 325 mesh for zeta potential, adsorption, and microflotation. Batch scale flotation and wet high intensity magnetic separation were performed by minus 100 mesh carbonatite. The BET nitrogen specific surface areas of the minus 325 mesh fractions for ancylite, strontianite, calcite and carbonatite were found to be 3.8025, 3.3602, 5.0928 and 1.6211 $m^2/g$, respectively. All the reagents used in the study were analytical grade chemical reagents. Octanohydroxamic acid was purchased from Tokyo Chemical Industry Co., Ltd. It was identified by Fourier Transform Infrared Spectroscopy (FIG. 24) that the characteristic bond (C=O) took place at 1660 $cm^{-1}$. Moreover, three bands for N—H and O—H stretchings happened in the range from 3300-2800 $cm^{-1}$, and two strong amide II bands were observed near 1550 $cm^{-1}$ and 970 $cm^{-1}$.

Sampling

The representative sampling helpful for the entire research to insure that the results produced are reasonable and representative.

Figure 25:
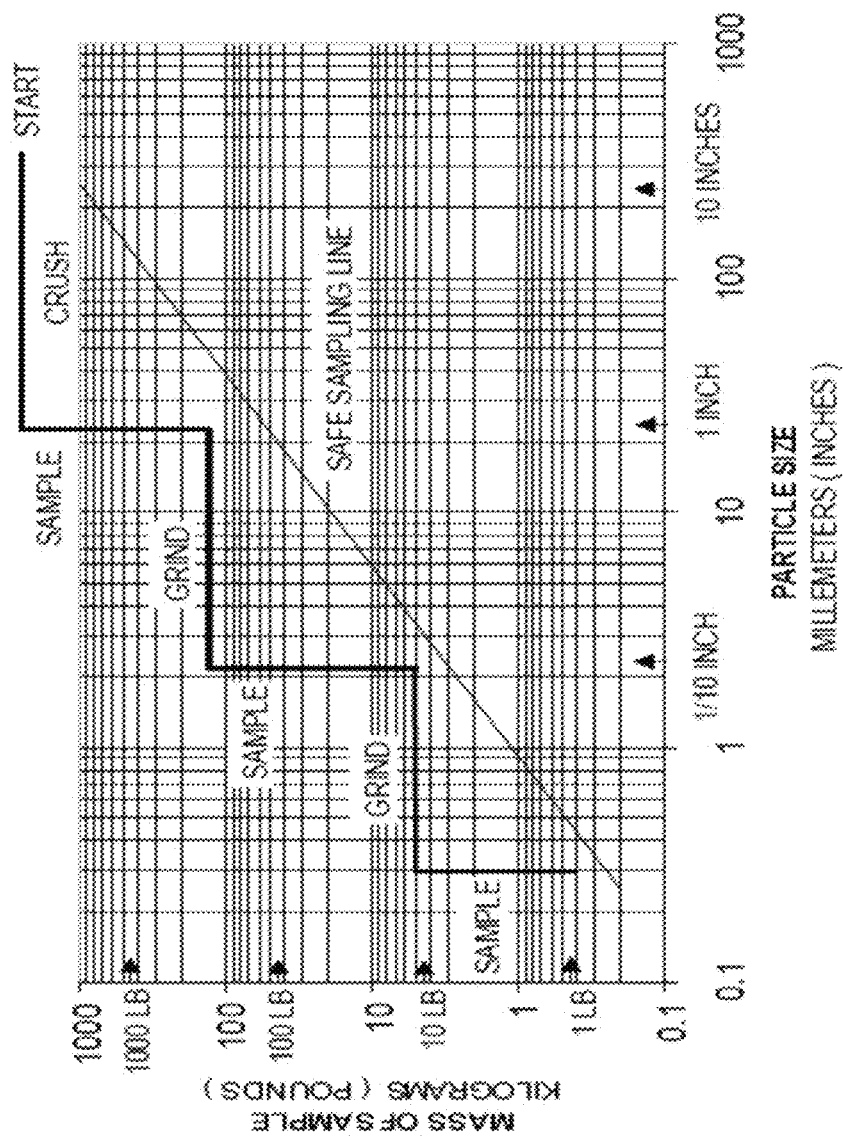
FIG. 25 is a graph showing the relationship between sample mass and particle size.

In this research, the ore, provided by Bear Lodge, Wyoming, was about 90 pounds with size fraction of around 1.5 inch. On the basis of the relationship between sample mass and particle size (FIG. 25), the entire ore was crushed to certain size by a jaw crusher and a roll crusher, as well as sieves. The end products were separated to small portions by a Jones riffle splitter. Around 2 pound minus 100 mesh ore was obtained, followed by another grinding and sieving to minus 325 mesh as the representative sample to be employed in the following fundamental experiments.

Zeta Potential Experiments

Figure 26:
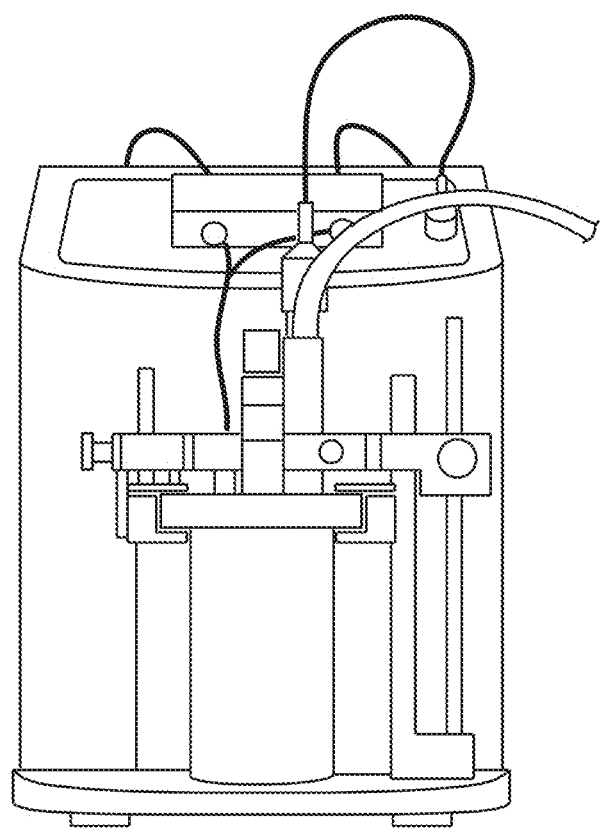
FIG. 26 is a picture of a Stabino®.

Zeta potential experiments were carried out using a Stabino® (FIG. 26) distributed by Microtrac Europe GmbH. The principle of the Stabino® measurement is that the particles are immobilized by attaching to the cell wall when a suspension is brought into the cell, and an induced stream fluid along the wall is able to move the mobile excess charges along the wall, thus, an oscillating stream current or stream potential, one of the methodologies for measurement of zeta potential, is created by an oscillating fluid in Stabino® [72].

Figure 27:
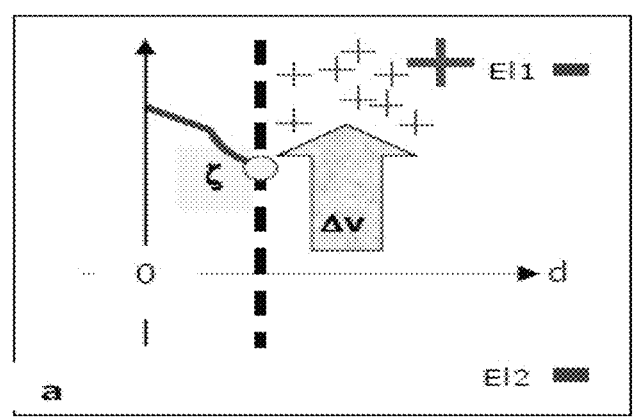
FIG. 27 is a diagram showing the mechanism of Stabino® measurement.

As shown in FIG. 27, excess ions are sheared away from the coated wall creating a stream potential at the electrodes EI 1 and Ei 2 by inducing a fluid stream along the charged wall. The potential can be calibrated as zeta potential.

The suspension was made at 0.5 g/L solid/liquid radio in 50 mL polyethylene bottles with 24 hours conditioning. Various reagents with different concentration were employed to identify the determining-ion depending on a certain mineral composition. The pH adjustment was obtained by 0.1N HCl and KOH solution.

Adsorption Experiments

Figure 28:
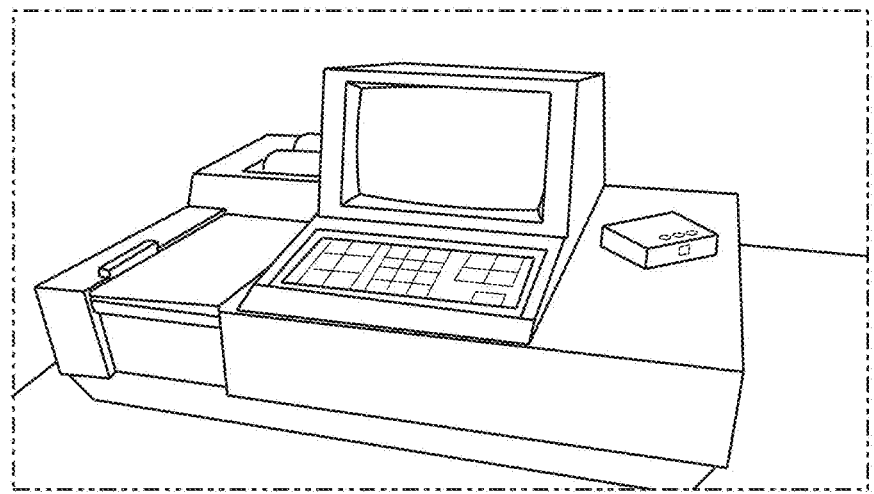
FIG. 28 is a picture of a Shimadzu UV160U spectrometer.

The adsorption of octanohydroxamic acid as functions of concentration, time and pH was performed by the determining difference in the concentration of the collectors in solution before and after the addition of mineral powders. The experiments at room temperature were carried out in 15 mL polyethylene bottles at a solid:liquid ratio of 8 g/L for pure calcite, strontianite and ancylite, as well as carbonatite. Conditioning time was determined from adsorption kinetics experiments. The suspension was agitated using a shaker at 650 rpm. After equilibration, the slurry was centrifuged in a VWR clinical 100 centrifuge for 20 minutes at 6500 rpm in order to separate solid from liquid. The concentration of hydroxamic acid was measured by a Shimadzu UV160U spectrometer (FIG. 28) with the well-known ferric hydroxamate method, mentioned in Pradip's thesis [73]. The theory is that the purple-colored ferric hydroxamate complex has the unique peak at 510 nm measured by UV-visible spectrometer. The ferric hydroxamate was made by mixing hydroxamic acid with ferric perchlorate at a volume radio 1:2. At 50° C., adsorption experiments were performed in 7 mL tubes that are made by special materials, and conditioning was carried out in a Benchmark multi-therm shaker at 900 rpm at 50° C. The separation of solid from liquid and measurement of the concentration of hydroxamic acid were performed with the same way as those at room temperature. The slurry pH was recorded before and after adsorption. KOH and HCl solutions were used as the pH adjustment reagents. The adsorption density of minerals is expressed by Eq. 5.1.

$$\delta = \Delta C * V / (A * S) \quad (Eq. 5.1)$$

Where $\Delta C$ is the change of concentration of surfactant, V is the original volume of solution, A is the specific area of the mineral, and S is the amount of solid.

The specific area was measured by BELSORP-mini II purchased from BEL Japan Inc. BELSORP-mini II is a compact, volumetric adsorption measurement instrument used for specific area measurement. The measurement principles are volumetric gas adsorption and advanced free space measurement, which can contribute to high precision and high reproducible data [74]. BET theory is usually used as the calculation of the specific surface area. The theory is that the adsorptive absorbs on the strong energy sites on the surface first, and then the adsorptive absorbs on the next energy level sites as the pressure is increased. The advanced free space measurement, developed by BEL Japan, Inc., is a measurement of adsorption amount, which can continuously measure the change of free space without maintaining the coolant level [75].

Microflotation

Figure 29:
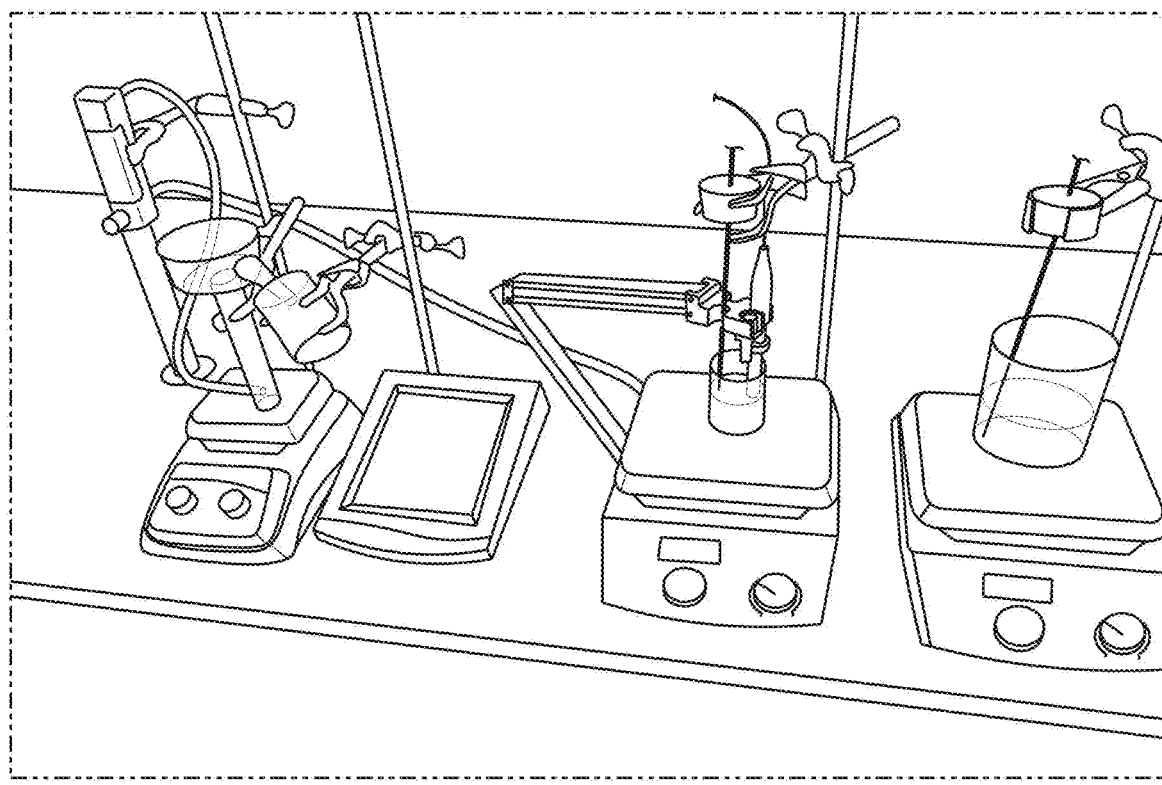
FIG. 29 is a picture showing a Partridge-Smith Cell set-up.
Figure 30:
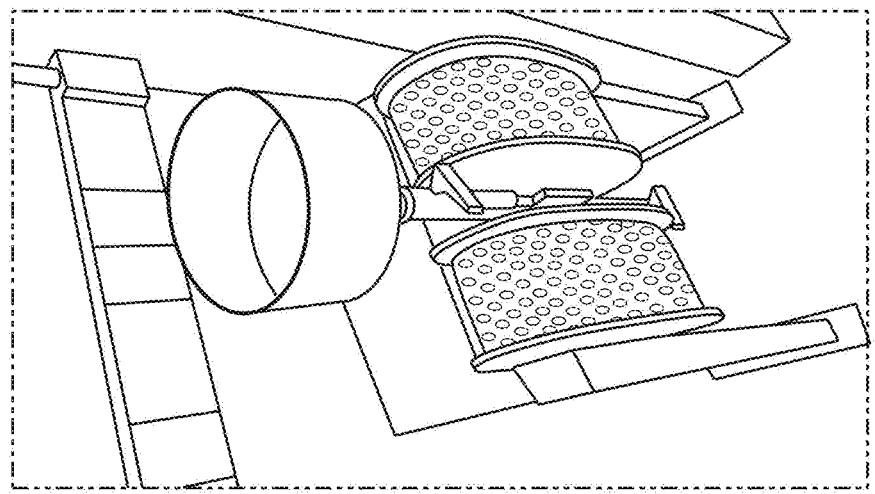
FIG. 30 is a picture of a WHIMS.
Figure 31:
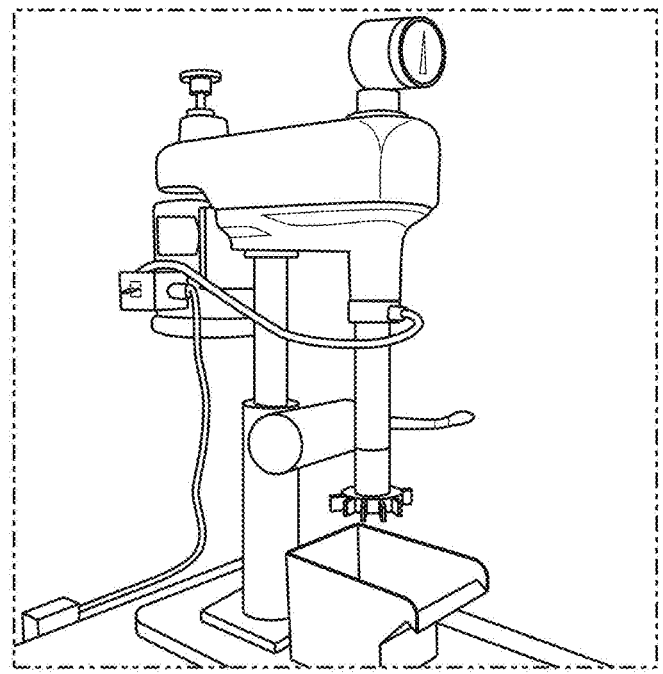
FIG. 31 is a picture of a Denver flotation machine.

Floatability studies were performed with a Partridge-Smith Cell, shown in FIG. 29. Octanohydroxamic acid and potassium ethyl xanthate were used as a collector. For the pure minerals flotation tests, 0.4 g of minus 325 mesh pure mineral samples were pulped to 52 mL with the collector and conditioned with the chosen reagents at a desired pH for 15 minutes using a magnetic stirrer at 600 rpm. Then the sample was transferred to the Partridge-Smith cell and agitated by another magnetic stirrer at 800 rpm. Two minutes flotation was achieved by passing air gas at the rate of 39.7 cc/minute. The concentration range of octanohydroxamic acid was from $5 \times 10^{-4}$ M to $2 \times 10^{-3}$ M, and the pH range was from 5.5 to 11.5. After flotation, the concentrate and the tailing fractions were separately filtered, dried and weighed. The recoveries for pure minerals were expressed on a weight basis. In terms of carbonatite flotation test, 0.5 grams carbonatite with minus 100 mesh and minus 325 mesh were employed in the presence of different collectors, depressants and activators, as well as frothers. Verious frothers are known to those of skill in the art, some preferable frothers are alcohol based frothers, such as AEROFROTH 70. All the experimental procedures were the same as that for pure minerals, except that the recovery of carbonatite was conducted by a combination of weight and element concentration that was measured by XRF.

Spectra were recorded using Nicolet is™50 FT-IR spectrometer obtained from Thermo Fisher Scientific Inc. Typical measurement was carried out at a resolution of 4 cm$^{-1}$. After 15 minutes adsorption in the presence of 10$^{-3}$ M hydroxamic acid, solids were washed three times with DI water (18 MΩ·cm) and allowed to air-dried at room temperature overnight. The pure minerals both before and after adsorption were measured by FTIR-ATR. Atmospheric water was always subtracted.

Wet High Intensity Magnetic Separation

The Eriez lab model wet intensity magnetic separator was employed to remove iron oxide, primarily for hematite and magnetite. The separator consists of two electromagnetic coils with a stainless steel canister containing a flux-converging element located between magnetic poles. Even though there are several parameters, such as magnetic field, feed rate, pulp density and flow rate of the rinse water, that can affect the performance of magnetic separation, two parameters, magnetic field and matrices, were tested in this study. Two matrices were used, which are grooved plates and steel balls. Tests were run by pouring a 100 grams sample with 20 wt % pulp density into the separator with the magnetic energized. In some embodiment, the pulp density is greater than about 5% and less than about 30%, for example greater than about 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, or 29%, and less than about 31%, 30%, 29%, 28%, 27%, 26%, 25%, 24%, 23%, 22%, 21%, 20%, 19%, 18%, 17%, 16%, 15%, 14%, 13%, 12%, 11%, 10%, 9%, 8%, 7%, or 6%. In some embodiments, 0.4, 0.8, 1.2 and 1.6 amperes per square meter current flux was applied to aid in separation. In various embodiments the amperes per square meter applied may be 0.1 to 20 amperes, or greater than about 0.1, 0.5, 0.6, 0.7, 0.8, 0.9, 1.0, 1.1, 1.2, 1.3, 1.4, 1.5, 1.6, 1.7, 1.8, 1.9, 2.0, 2.1, 2.2, 2.3, 2.4, 2.5, 2.6, 2.7, 2.8, 2.9, 3, 4, 5, 6, 7, 8, 9, 10, 11, 12, 13, 14, 15, 16, 17, 18, or 19 amperes and less than about 21, 20, 19, 18, 17, 16, 15, 14, 13, 12, 11, 10, 9, 8, 7, 6, 5, 4, 3, 2.9, 2.8, 2.7, 2.6, 2.5, 2.4, 2.3, 2.2, 2.1, 2.0, 1.9, 1.8, 1.7, 1.6, 1.5, 1.4, 1.3, 1.2, 1.1, 1, 0.9, 0.8, 0.7, 0.6, 0.5, or 0.2 amperes. The recovery of carbonatite was conducted by a combination of weight and element concentration that was measured by XRF.

In many embodiments, the magnetic separation is sufficient to recover from about 35% to about 75% of the iron while reducing the rare earth oxide recovery from about 5% to about 40%. In a preferred embodiment, the magnetic separation recovered about 55% of the iron with about 15% loss of REO.

Bench Scale Floatation

A series of batch tests were undertaken in the 1 L Denver flotation cell. In the astages, a 250 g tailing from WHIMS was fed to the Denver cell with 20% pulp density. Distilled water was used throughout the tests. The air flow rate was around 380 ccm. The temperature during experimentation was about 21±1° C. In the experiments which were involved with pH adjustments and collector concentration change, each sample was conditioned in 1 L certain concentration octanohydroxamic acid for 15 minutes at the desired pH. In the experiments that included the addition of modifiers, the modifier addition time was tested in the experiments. Two minutes conditioning was made for frother. AF 70 (Cytec AEROFROTH 70) was used as the frother in subsequent tests. Likewise, in the cleaner stage, the conditioning procedures were same as the rougher stage, except that the pulp density in the cleaner was 11.11%. Any different condition is noted.

Experimental Data and Discussion

The flotation fundamentals of ancylite, strontianite and calcite are presented here, including zeta potential, adsorption and microflotation. The flotation fundamental and bench flotation of carbonatite are included as well.

Flotation Fundamental of Pure Minerals

The fundamentals of surface chemistry can give a better prediction and understanding of ancylite flotation. The measurement of the zeta potential of the minerals in various conditions and adsorption mechanism of mineral/collector interface were studied. Microflotation experiments were also employed to establish the chemical conditions for flotation separation of minerals.

Zeta Potential Measurement

Being of considerable importance on the wetting characteristics and collector adsorption, investigations of electrokinetic behavior for ancylite and calcite as well as strontianite are undoubtedly attractive to help deeply understand the flotation mechanism and optimize the flotation performance. It is well-known that the surface charge of the semi-soluble minerals is not only dependent on the pH of the suspension system, but sensitive to solution composition owing to hydrolysis and metathetic exchange. Lattice ions in the mineral structure can alter the surface properties. As Miller mentioned in 2004 [76], the common theories of surface charging mechanisms are summarized as follows: dissociation of surface acid groups, lattice substitution and preferential hydration of surface lattice ions, as well as lattice hydration theory.

Figure 32:
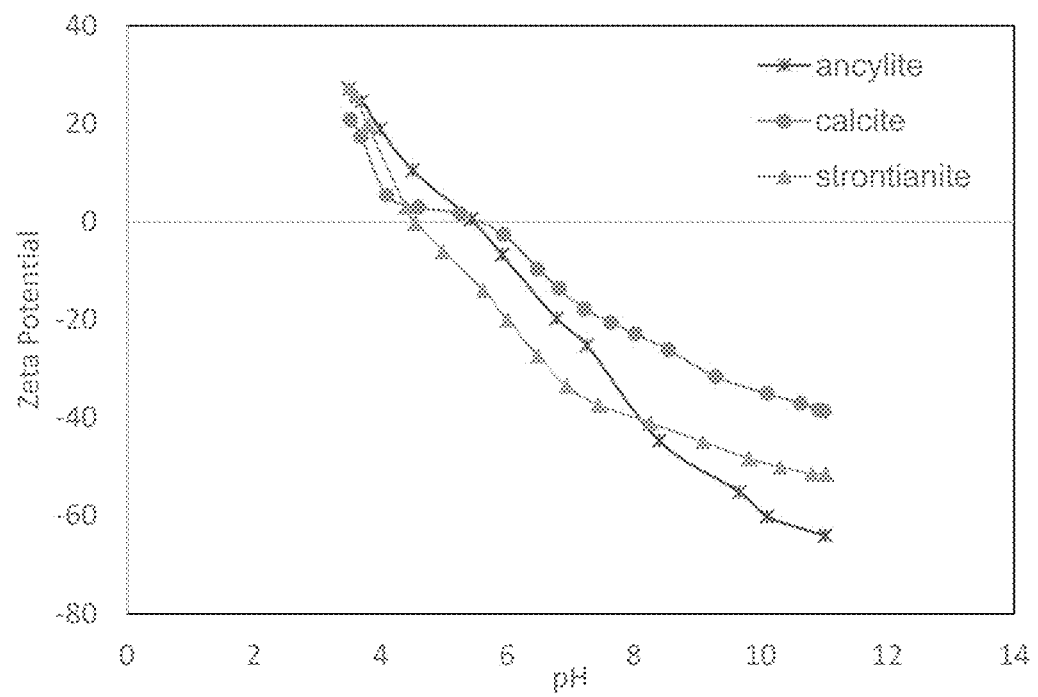
FIG. 32 is a graph showing the zeta potential of calcite, ancylite and strontianite in distilled water.
Figure 33:
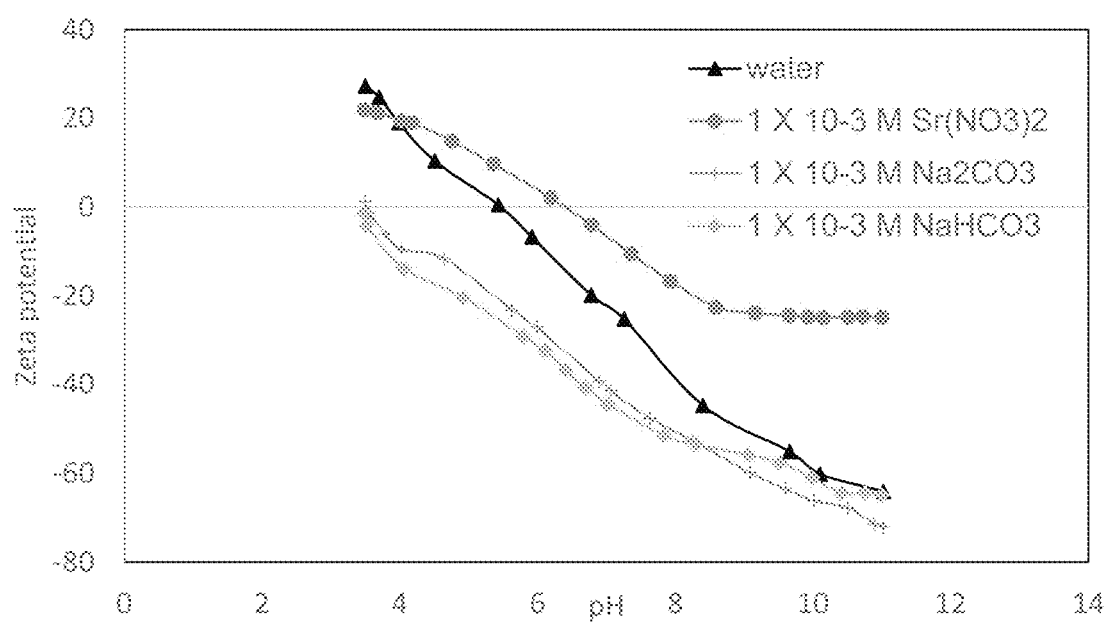
FIG. 33 is a graph showing the zeta potential of ancylite in different electrolytes.
Figure 34:
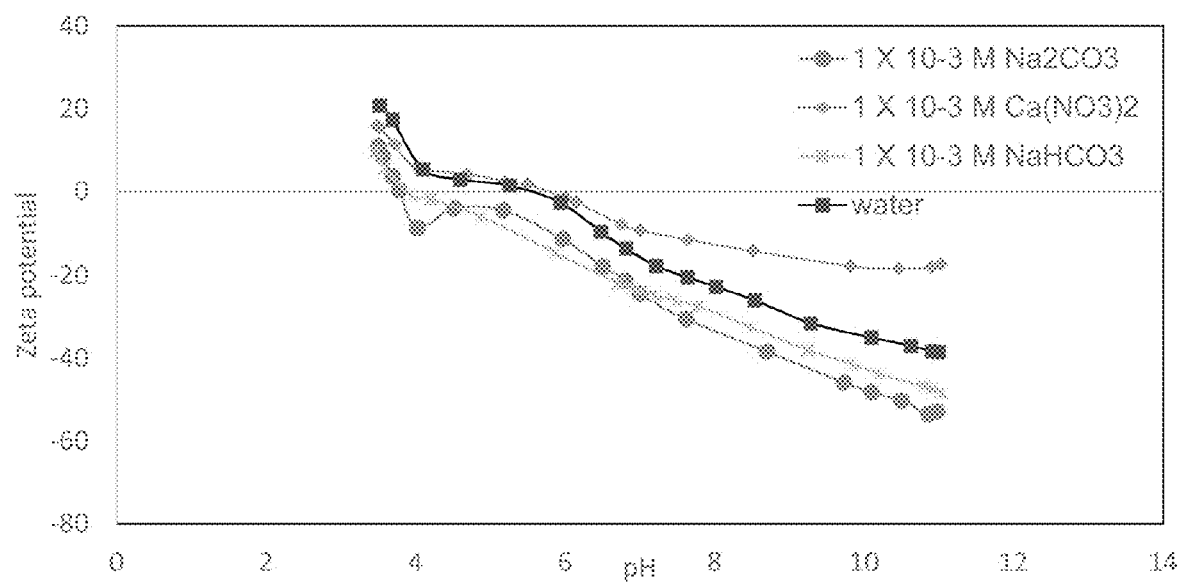
FIG. 34 is a graph showing the zeta potential of calcite in different electrolytes.
Figure 35:
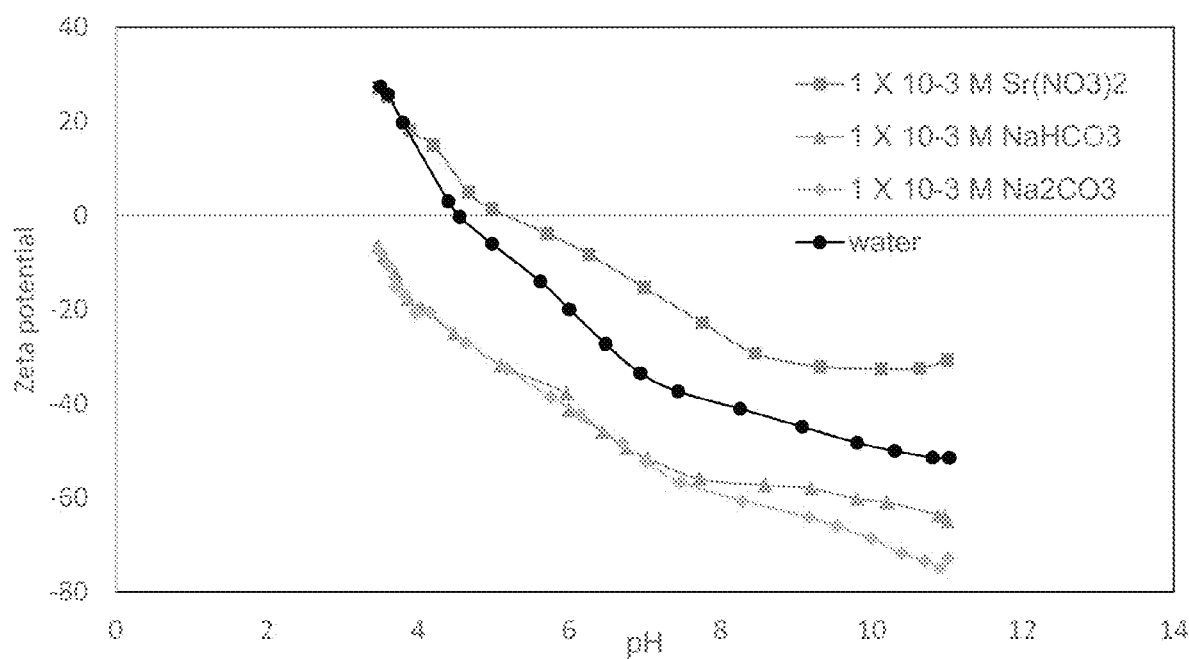
FIG. 35 is a graph showing the zeta potential of strontianite in different electrolytes.

The experimental results shown in FIG. 32 were obtained by initially equilibrating ancylite, strontianite and calcite in distilled water. The isoelectric points (I.E.P) of ancylite, strontianite and calcite are around 5.46, 4.50 and 5.50, respectively. As expected, the electrokinetic behavior of ancylite in aqueous solution reveals that pH plays a significant role. At pH below 5.46, the zeta potential of ancylite particles becomes positive, while zeta potential is more negative as pH increases. The effects of $CO_3^{2-}$, $HCO_3^-$ and $Sr^{2+}$ on the electrokinetic behavior of ancylite were also investigated and it is found that, $Sr^{2+}$, $CO_3^{2-}$ and $HCO_3^-$ are the potential determining ions. The addition of $Sr^{2+}$ contributes to an increase of zeta potential compared with ancylite in water. That could be explained by a fact that strontium, one of the lattice ions in the ancylite crystal, could undergo hydrolysis to form a strontium hydroxyl complex. Since little is known on the solubility product of ancylite, it is difficult to thermodynamically calculate the solid-aqueous solution equilibria for the ancylite-$H_2O$ system. Whereas, investigations on calcite-$H_2O$ and strontianite-$H_2O$ solution equilibriums were conducted and presented in several literature citations. In an aqueous suspension of strontianite and calcite particles, both cations and anions from the minerals lattice will dissolve and interact with the ions of the water based on the following reactions at room temperature.

$$SrCO_{3(S)} = Sr^{2+} + CO_3^{2-} \quad pK=9.1534 \tag{6.1}$$

$$CO_{2(g)} + 2OH^- = CO_3^{2-} + H_2O \quad pK=-9.8724 \tag{6.2}$$

$$CO_3^{2-} + H_2O = HCO_3^- + OH^- \quad pK=3.6700 \tag{6.3}$$

$$CO_3^{2-} + 2H_2O = H_2CO_{3(aq)} + 2OH^- \quad pK=11.3024 \tag{6.4}$$

$$Sr^{2+} + OH^- = Sr(OH)^+ \quad pK=-0.820 \tag{6.5}$$

$$Sr^{2+} + 2OH^- = Sr(OH)_{2(S)} \quad pK=0.4327 \tag{6.6}$$

$$CaCO_{3(S)} = CaCO_{3(aq)} \quad pK=5.1488 \tag{6.7}$$

$$CaCO_{3(aq)} = Ca^{2+} + CO_3^{2-} \quad pK=3.1979 \tag{6.8}$$

$$Ca^{2+} + HCO_3^- = CaHCO_3^+ \quad pK=-0.8655 \tag{6.9}$$

$$Ca^{2+} + OH^- = Ca(OH)^+ \quad pK=-1.3019 \tag{6.10}$$

The inconsistency of I.E.P for calcite and strontianite could be attributed to several factors, such as different sources, incorporation of different cations into the mineral crystal, and various methodologies of electrokinetic measurements. The varied I.E.P or point of zero charge (PZC) in the previous studies are shown in Table 6.1. It is also found that the determining ions for calcite are $Ca^{2+}$, $CO_3^{2-}$ and $HCO_3^-$, while $Sr2+$, $CO_3^{2-}$, and $HCO_3^-$ are the determining ions of strontianite.

Figure 36:
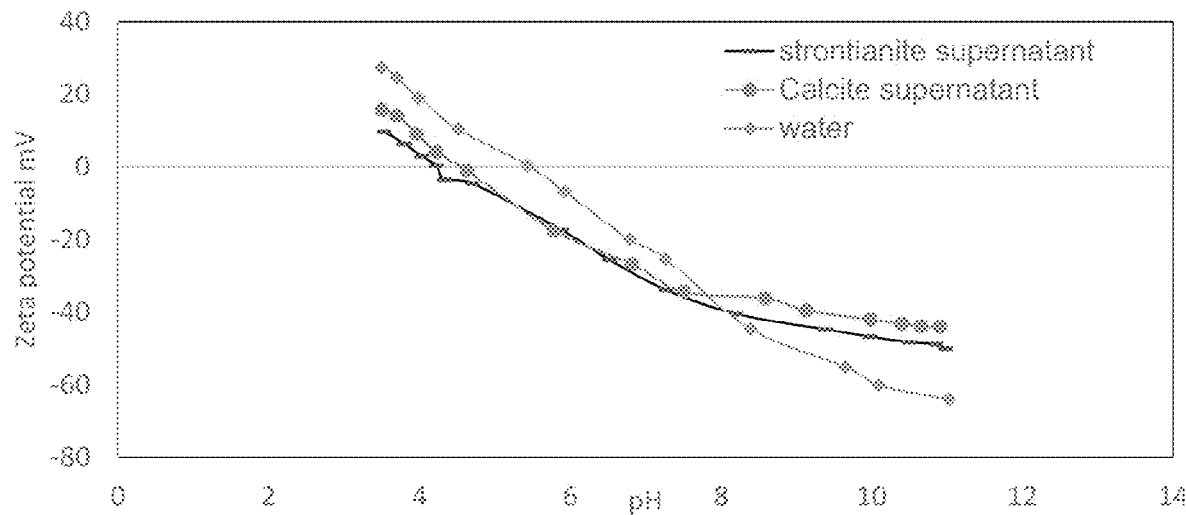
FIG. 36 is a graph showing the effects of calcite and strontianite supernatants on the zeta potential of ancylite.
Figure 37:
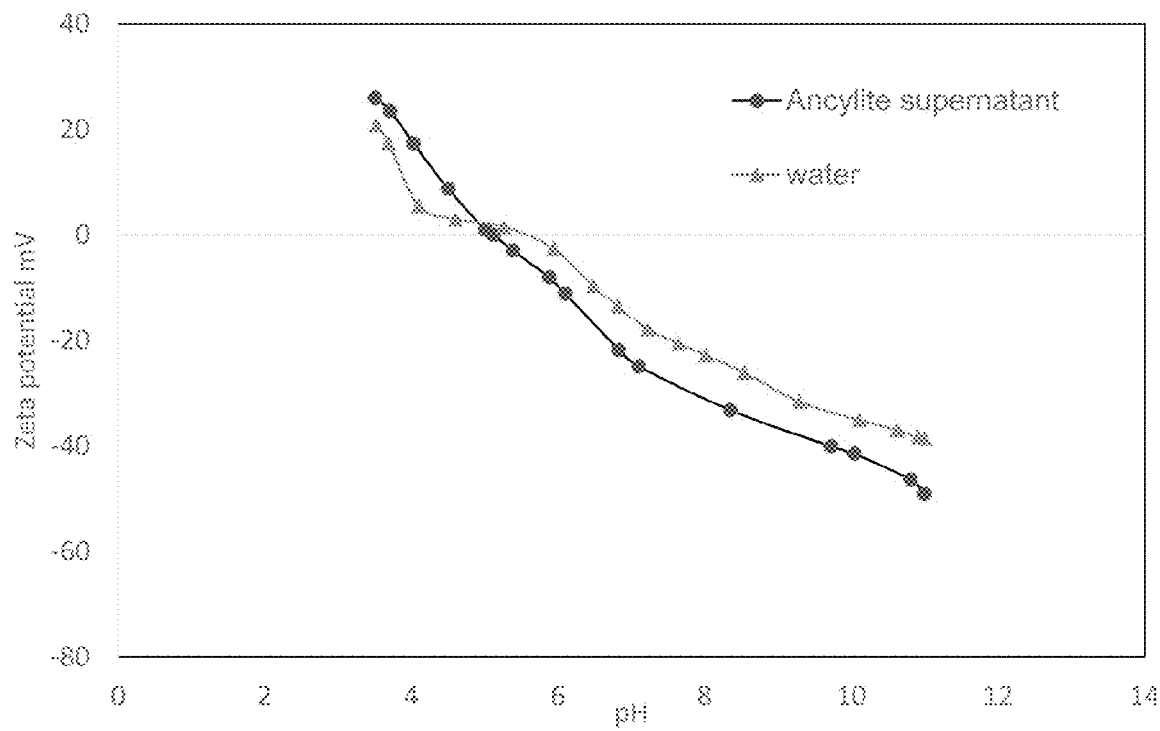
FIG. 37 is a graph showing the effect of ancylite supernatant on the zeta potential of calcite.
Figure 38:
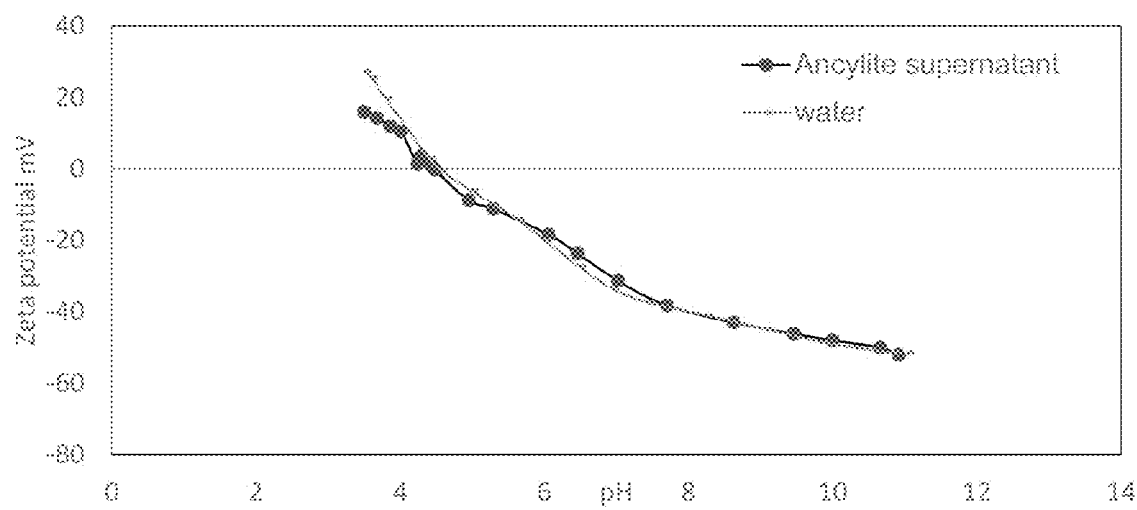
FIG. 38 is a graph showing the effect of ancylite supernatant on the zeta potential of strontianite.

A series of investigations were conducted in mineral supernatants as well as in water in order to confirm the effect of dissolved species of the ancylite-strontianite and ancylite-calcite system. The supernatant was prepared by shaking the mineral in distilled water for 24 hours followed by centrifugation. The supernatant obtained was used for 24 hours conditioning of the desired mineral prior to zeta potential measurements. It is presented in FIG. 36 that the ancylite surface is more negatively charged in both strontianite and calcite supernatant than in water and that isoelectric point of ancylite in strontianite supernatant has shifted from around 5.46 in water to 4.26. Similarly, the zeta potential of calcite and strontianite in ancylite supernatant was measured as well, and FIG. 38 shows that the zeta potential of strontianite in the ancylite supernatant behaves the same trend as that in water, except the IEP in ancylite supernatant is slightly lower than that in water. However, the IEP of calcite is slightly affected by ancylite supernatant. This scenario is in agreement with previous studies by Amankonah et al. [80] and Somasundaran et al. [81]. In mixed mineral systems, the interfacial behavior of minerals is quite different from that of individual mineral due to the dissolved species present in the supernatants. The following microflotation of the mixed minerals also shows different results using the same condition as that for individual mineral.

TABLE 6.1

Summary of PZC for calcite and strontianite

| Mineral | PZC | Measurement | Reference |
|---------|-----|-------------|-----------|
| Calcite | 9.5 | Streaming potential | [77] |
|  | 8.2 | Streaming potential | [56] |
|  | 11 | Electrophoretic mobility | [78] |
|  | 10.5 (I.E.P) | Streaming potential | [55] |
|  | 10 | Electrophoretic mobility | [73] |
|  | 5.5 | Streaming potential | [79] |
|  | 8.2 | Electrophoretic mobility | [58] |
| Strontianite | 8.0 | Electrophoretic mobility | [58] |

Figure 39:
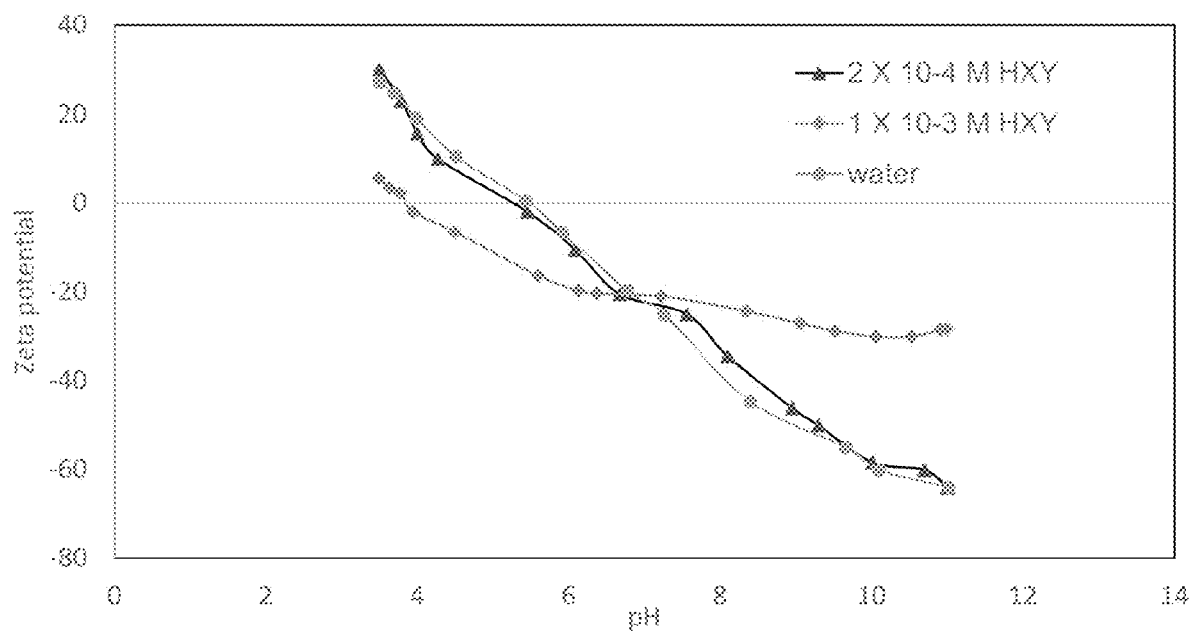
FIG. 39 is a graph showing the zeta potential of ancylite in the presence of $1\times10^{-3}$ M and $2\times10^{-4}$ M hydroxamic acid.
Figure 40:
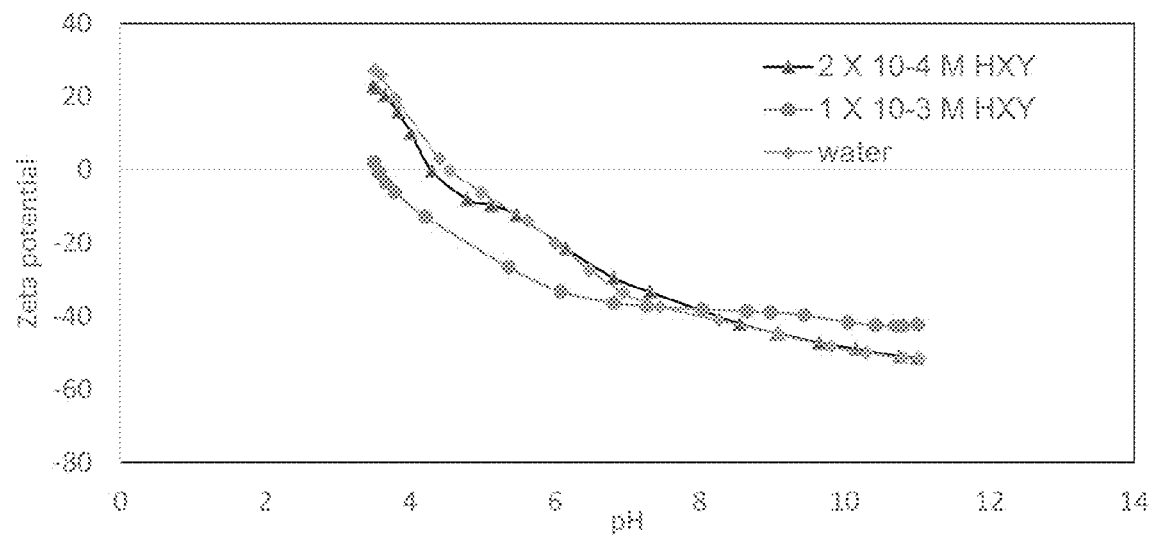
FIG. 40 is a graph showing the zeta potential of strontianite in the presence of $1\times10^{-3}$ M and $2\times10^{-4}$ M hydroxamic acid.
Figure 41:
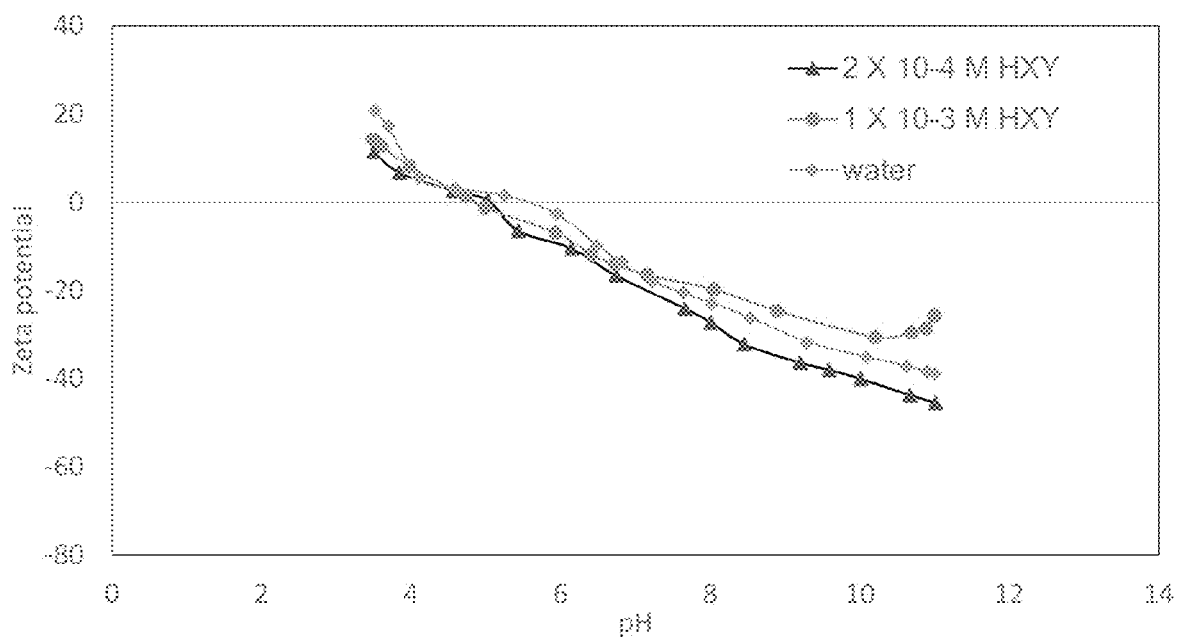
FIG. 41 is a graph showing the zeta potential of calcite in the presence of $1\times10^{-3}$ M and $2\times10^{-4}$ M hydroxamic acid.

The electrokinetic behaviors of ancylite, strontianite and calcite in the presence of hydroxamic acid were investigated to delineate the adsorption mechanism of hydroxamic acid on the surface of minerals. FIG. 39 shows that as the concentration of hydroxamic acid increases, IEP of ancylite decreases, and the zeta potential range in the entire pH becomes narrow compared with that in distilled water. The effect of hydroxamic acid addition for strontianite is as same as ancylite. However, the addition of hydroxamic acid has a slight effect on calcite, compared with strontianite and ancylite, which could be explained by the fact that hydroxamic acid is more preferably adsorbed on the surfaces of strontianite and ancylite. The change of zeta potential in the entire pH range, especially above IEP, could be attributed to a conclusion that the adsorption mechanism of hydroxamic acid on these three minerals is chemisorption, which is also confirmed by following adsorption studies and FTIR results.

Adsorption Studies

As mentioned earlier, the measurement of the zeta potential can make clear that adsorption mechanism of hydroxamic acid on pure ancylite, calcite and strontianite are chemisorption. Adsorption studies were also conducted to investigate the underlying mechanism of hydroxamate interaction in these mineral systems. High temperature adsorption studies were carried out as well.

Figure 42:
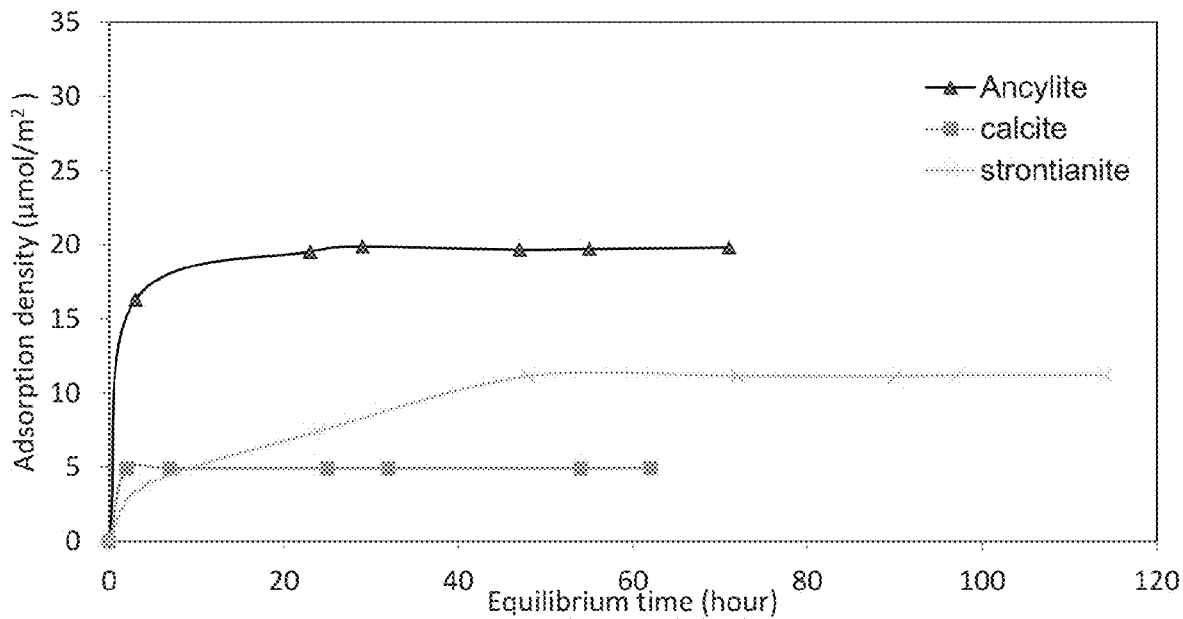
FIG. 42 is a graph showing the adsorption density of calcite, strontianite and ancylite as a function of time.

FIG. 42 shows the results of uptake of octanohydroxamic acid on ancylite, calcite and strontianite as a function of time with the initial concentration of $10^{-3}$ M at room temperature. Clearly, calcite reaches the equilibrium in about 2 hours with the lowest adsorption. Strontianite takes as long as 48 hours to reach equilibrium, while ancylite takes 29 hours to reach equilibrium to get the highest adsorption among three minerals. The reason that calcite can reach equilibrium so fast with low adsorption is probably that calcite is more soluble in comparison with strontianite and ancylite.

The uptake of octanohydroxamic acid by ancylite at pH values 9±0.3 is presented in FIG. 42. The adsorption isotherm curve is characterized by three well-defined regions: (a) at low collector concentrations the adsorption displays a marked dependence on the hydroxamic acid concentration; (b) the adsorption remains relatively constant; and (c) the adsorption increases with increasing concentration of hydroxamic acid. The adsorption density of hydroxamic acid on ancylite is about 20 μmol/m². Assuming a surface area of the hydroxamic acid head group of 20.5 Å [38], according to calculation, it is found that the ancylite to hydroxamate ratio is approximately 1:2.5, which could be in concordance with theoretical expectation in terms of the composition of ancylite. In some embodiments, the ratio of ancylite to hydroxamate is between 1:1.5 and 1:4.0, for example 1.0:1.8-2.8. Because the lattice of ancylite contains both rare earth ions and strontium ions, which contributes to a fact that the cationic ion to hydroxamate radio should be theoretically in the range of 1:3 to 1:2. At high concentration, however, there seems to be another plateau where the amount of hydroxamic acid absorbed is far more than needed for the formation of a close-packed vertically oriented monolayer. It could be expected based on a consideration that a multilayer adsorption occurs, which is probably due to physical adsorption by hydrogen bonding after the surface chelation (Eq. 6.11 and Eq. 6.12), mentioned by Raghavan and Fuerstenau [36]. The adsorption of hydroxamic acid on rare earth minerals, such as bastnaesite, has been ascribed ([38], [51], and [49]) to the formation of a rare earth-hydroxamate complex on the mineral surface, and a similar mechanism might be applicable in the present system.

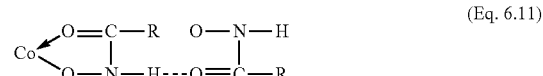

(Eq. 6.11)

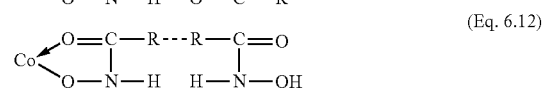

(Eq. 6.12)

Figure 43:
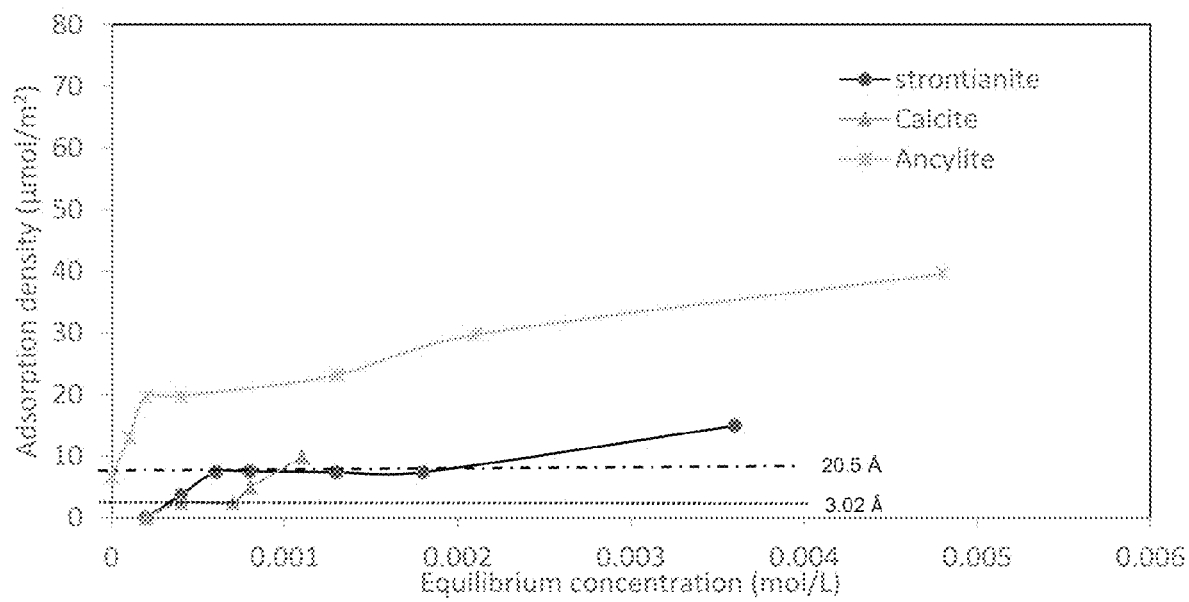
FIG. 43 is a graph showing the adsorption density of calcite, strontianite and ancylite as a function of concentration.

The adsorption isotherm of calcite and strontianite at pH 9±0.3 (FIG. 43) displays a typical S-type shape as well;

however, the adsorption densities are significantly lower than that for ancylite. The adsorption density plateau of calcite obtained is far less than that needed for the formation of a close-packed monolayer where all the molecules are horizontally oriented, attaining an adsorption density of 3.02 µmol/m$^2$. The adsorption density of strontianite increases sharply at lower hydroxamic acid concentration, but is constant at about 7 µmol/m$^2$ in the concentration range from $6 \times 10^{-4}$ M to $1.8 \times 10^{-3}$ M. Then a linear increase in the uptake of hydroxamic acid on the strontianite is obtained at higher concentration. The reason that the plateaus for uptake of hydroxamic acid on calcite and strontianite are much lower than that for ancylite is that $Sr^{2+}$ and $Ca^{2+}$ are divalent ions, in comparison, the rare earth ions are trivalent ions, which suggests that the formation of the metal-hydroxamate complex for rare earth ions consumes many times more hydroxamate than that for divalent ions.

Figure 44:
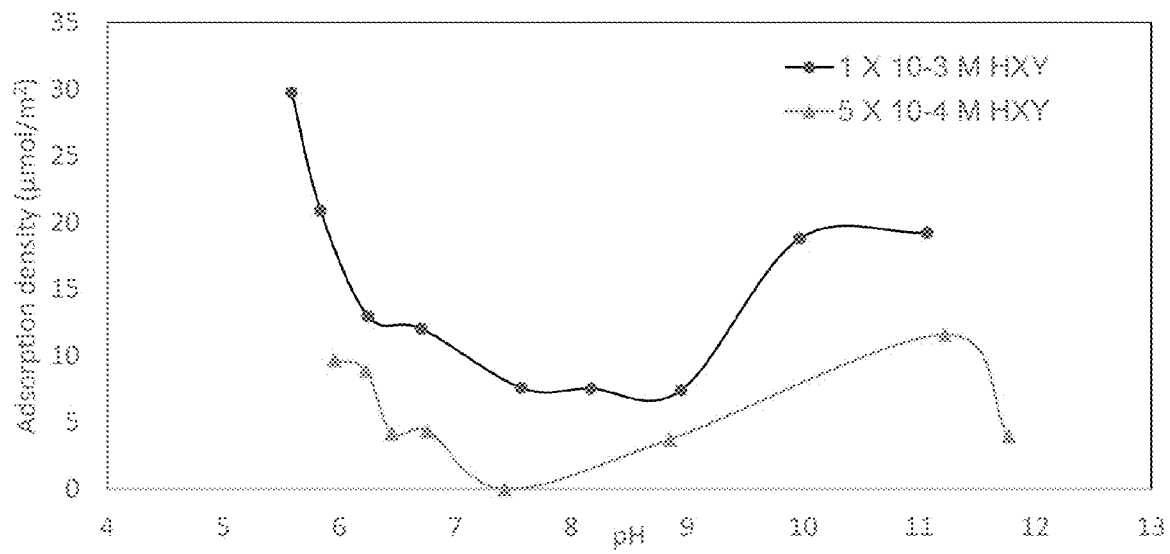
FIG. 44 is a graph showing the adsorption density of strontianite as a function of pH.
Figure 45:
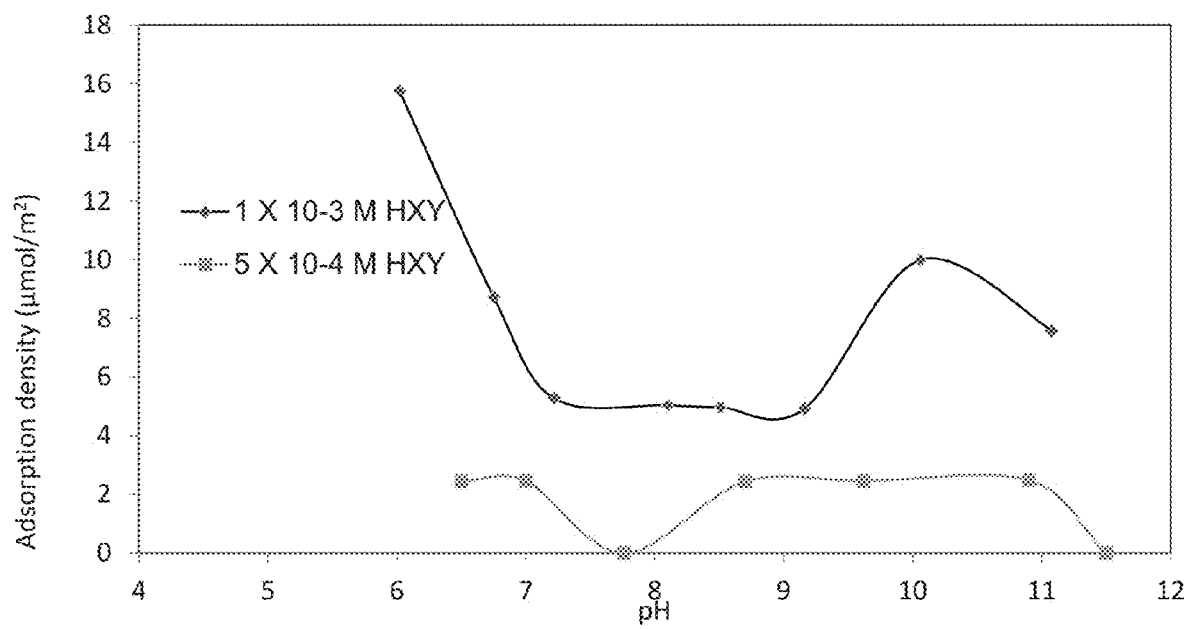
FIG. 45 is a graph showing the adsorption density of calcite as a function of pH.
Figure 46:
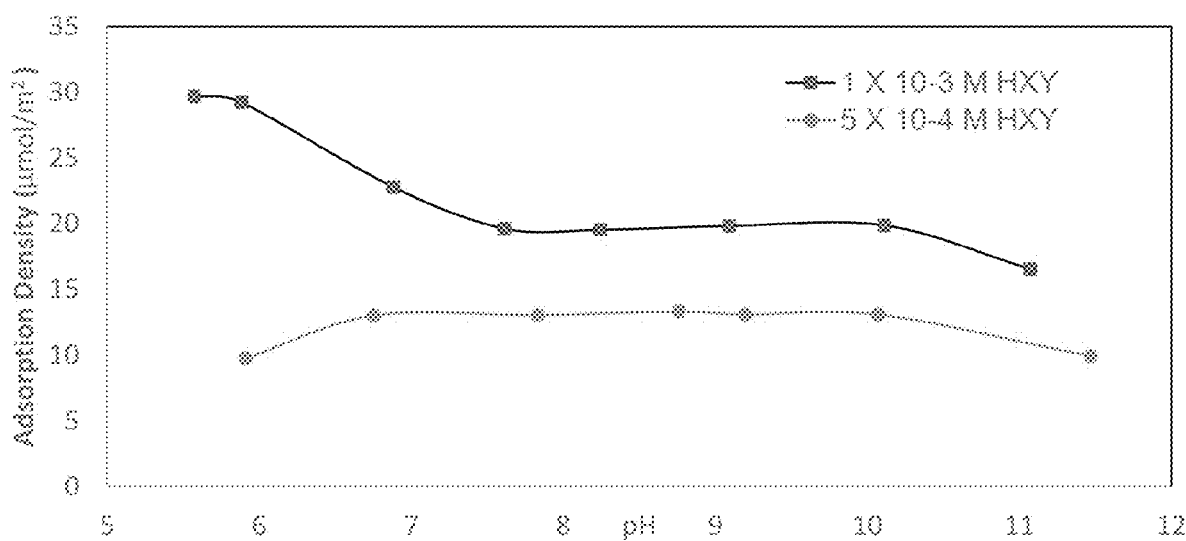
FIG. 46 is a graph showing the adsorption density of ancylite as a function of pH.

The adsorption of hydroxamic acid on three minerals at various pH values are presented in FIG. 44, FIG. 45 and FIG. 46. The experiments were conducted at collector concentration of about $1 \times 10^{-3}$ M and about $5 \times 10^{-4}$ M. Among these three figures, there is a common characterization that at pH below about 7, adsorption density increases abruptly as pH decreases, in the presence of $1 \times 10^{-3}$ M hydroxamic acid. It might be attributed to the presence of $CO_2$. Several investigators reported that the presence of such species as $CaHCO_3^+$ and $CaOH^+$ could increase the flotation recovery of calcite, which is attributed to an increase of electrostatic attraction by carbonation inducing a positive charge on the calcite interface through the adsorption of $CaHCO_3^+$ and $CaOH^+$ [82][73]. FIG. 44 indicates that adsorption of strontianite has a slight decrease in the range of pH 6.5 to pH 9 at $10^{-3}$ M hydroxamic acid, followed by a sharp increase above pH 9. A minimum adsorption density is obtained where the pH is around 7.4 at the collector concentration of $5 \times 10^{-4}$ M. There is a drop happening above pH 11, which is probably due to a formation of strontium carbonate precipitated on the surface of strontianite to prevent the adsorption of hydroxamic acid.

Calcite behaves similarly to strontianite, except that there is a relatively constant adsorption density from pH 7 to 9 in the presence of $10^{-3}$ M hydroxamic acid and pH 7.8. However, the drop in adsorption density at around pH 7.5 in the presence of $5 \times 10^{-4}$ M hydroxamic acid could not be easily explained. Perhaps some other strontium and calcium species are formed and are responsible for hydroxamic acid uptake.

Figure 47:
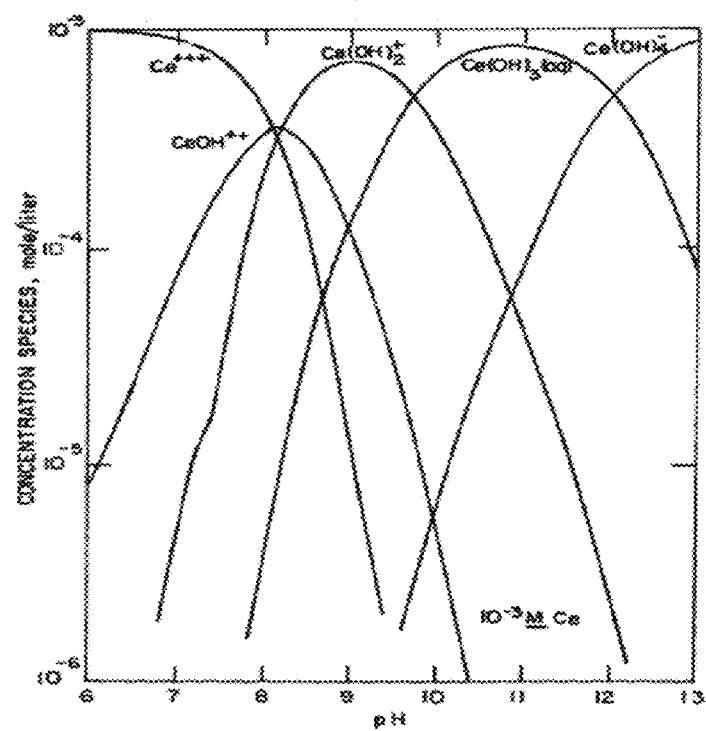
FIG. 47 is a graph showing the aqueous solution equilibrium for cerium at $10^{-3}$ M total concentration.

The adsorption of hydroxamic acid on ancylite as a function of pH is presented in FIG. 46. It is apparent that adsorption of the collector on ancylite is relatively independent with pH variation in the range of pH 7 to 10 compared with those for calcite and strontianite. At $10^{-3}$ M concentration, the predominate ion species that might be responsible for the plateau are $MOH^{2+}$, $M^{3+}$, $M(OH)_2^+$ and $M(OH)_3$(aq) (FIG. 47), in which M represents rare earth metal. Pradip et al. [38] also observed this plateau in their bastnaesite flotation study. In an alkaline environment, especially above pH 10, there is a drop of adsorption density, which could be attributed to formation of $M(OH)_3$ and $M(OH)_4^-$ that precipitated on the surface of mineral particles.

Figure 48:
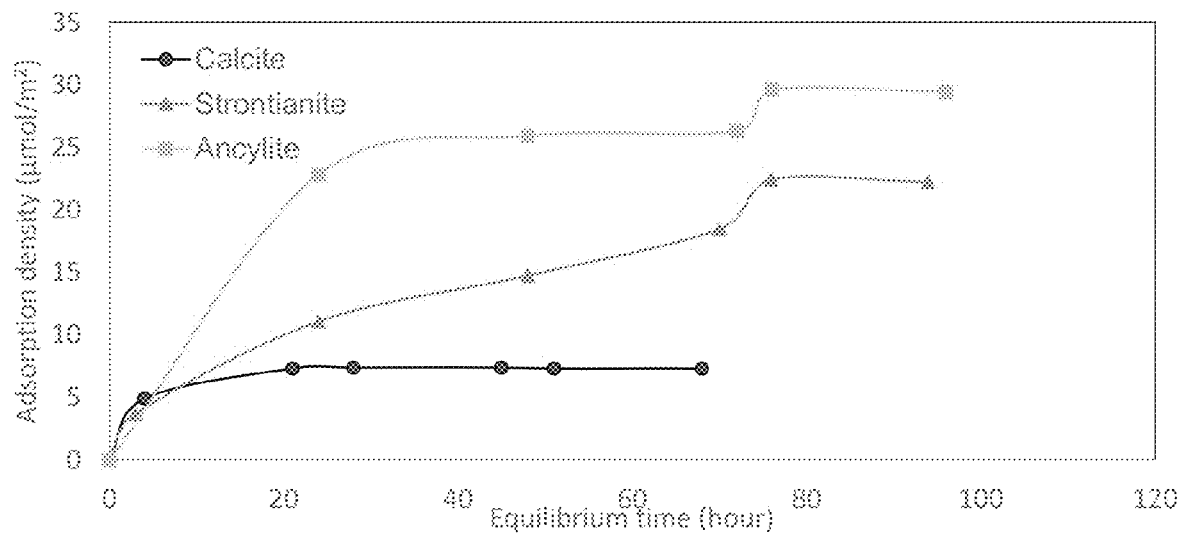
FIG. 48 is a graph showing the adsorption density of calcite, strontianite and ancylite as a function of time at 50° C.
Figure 49:
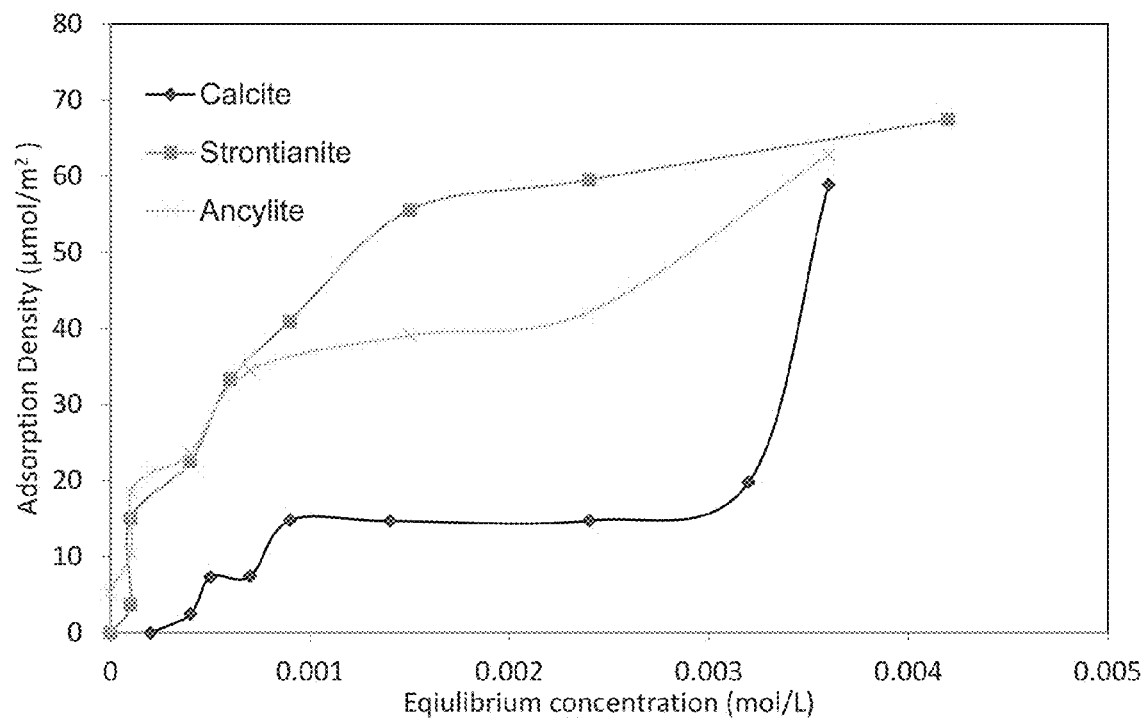
FIG. 49 is a graph showing the adsorption density of calcite, strontianite and ancylite as a function of concentration at 50° C.

Since the uptake of hydroxamic acid on minerals indicates the interaction between hydroxamic acid and minerals, some adsorption experiments at 50° C. were also carried out to investigate the effect of temperature, and a series of thermodynamic calculations were also made to theoretically illustrate the mechanism of adsorption of hydroxamic acid on minerals. From the results given in FIG. 48, it could be seen that the time to attain equilibrium at high temperature is much longer than that at room temperature and the amount of hydroxamic acid adsorbed increases with temperature increases. It might be attributed to the higher solubility of these minerals at elevated temperature and the endothermic reactions for the adsorption of hydroxamate on these minerals. FIG. 49 indicates that the high temperature plays a more important role in adsorption for strontianite than ancylite. And interestingly, there are two plateau to be observed in the adsorption isotherm plots for calcite, ancylite and strontianite. Adsorption isotherm of calcite has the two plateaus which take place at 7.31 and 14.76 µmol/m$^2$, respectively. Ancylite has the same trend as calcite has, and the two plateaus happen at 22.5 and 39.05 µmol/m$^2$, respectively, which could be attributed to a lower plateau corresponding to the horizontal monolayer of hydroxamic ion. The second plateau occurs when hydroxamic ion vertically adsorbs on the mineral surface area.

Figure 50:
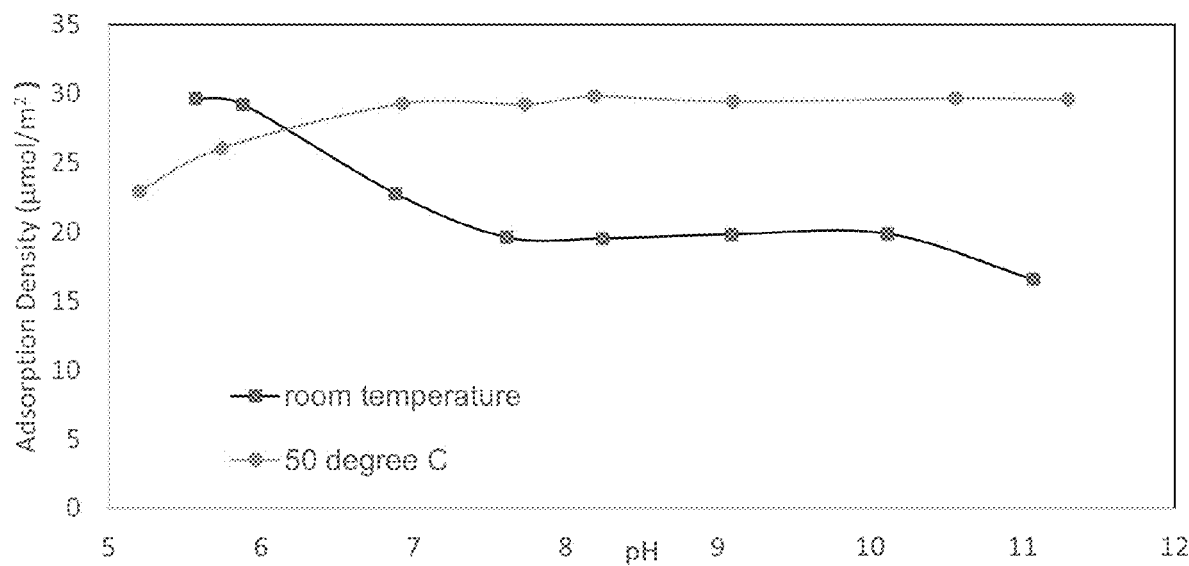
FIG. 50 is a graph showing the adsorption density of ancylite at room temperature and 50° C. in the presence of $5\times10^{-4}$ M octanohydroxamic acid.
Figure 51:
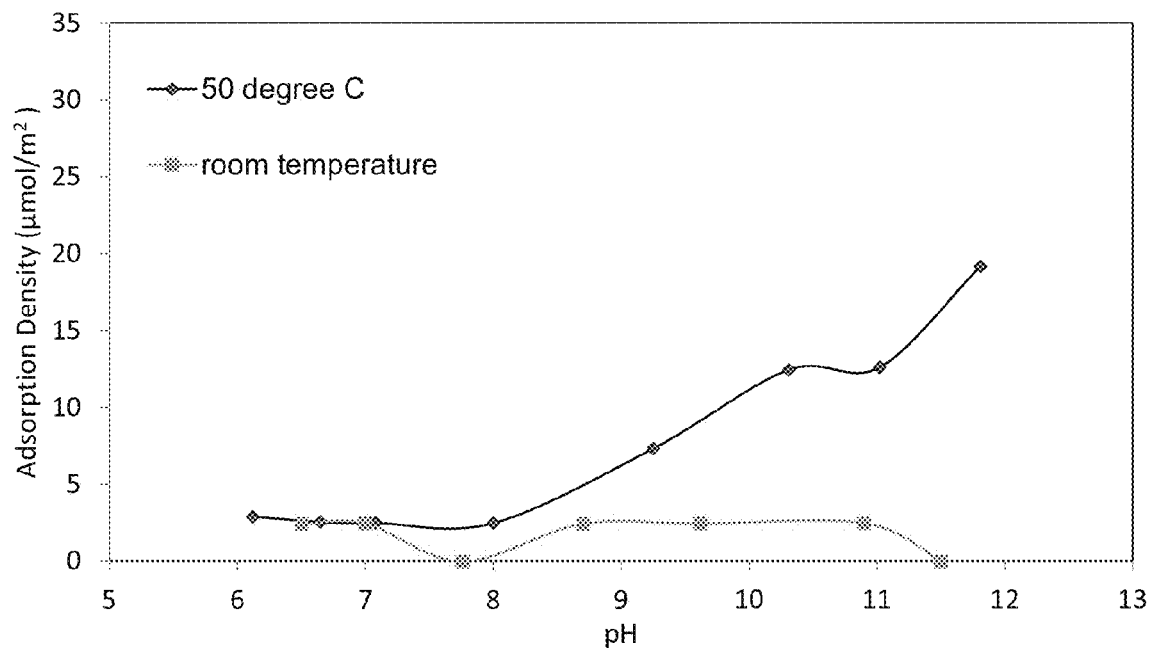
FIG. 51 is a graph showing the adsorption density of calcite at room temperature and 50° C. in the presence of $5\times10^{-4}$ M octanohydroxamic acid.
Figure 52:
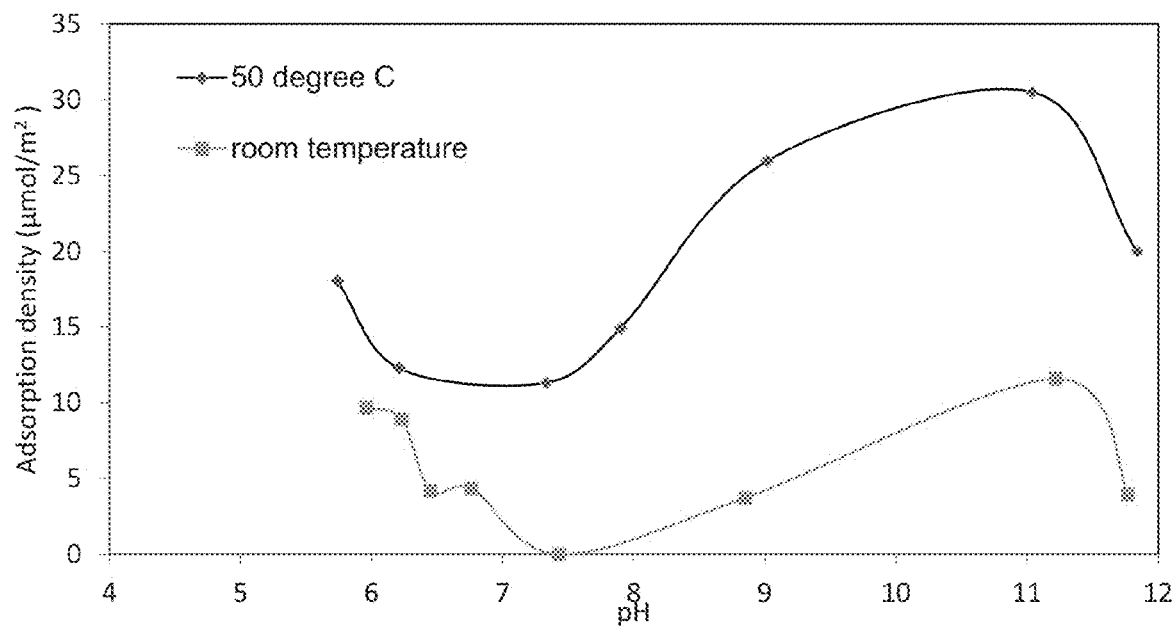
FIG. 52 is a graph showing the adsorption density of strontianite at room temperature and 50° C. in the presence of $5\times10^{-4}$ M octanohydroxamic acid.

The comparison is shown in FIG. 50 to illustrate the different trends for the adsorption of hydroxamic acid on ancylite at room temperature and 50° C. At 50° C., it is apparent that as pH increases, adsorption density of ancylite increases until pH is 7, and then remains constant, in contrast with the trend at room temperature. Adsorption of calcite at elevated temperature (FIG. 51) is higher than that at room temperature when pH is above 7, whereas the adsorption at higher temperature behaves the similar trend as the room temperature. It is probably due to the unstable species, such as $CaHCO_3^+$ and $CaOH^+$, at elevated temperature, which contributes to no activation by $CO_2$ for flotation. Clearly, FIG. 51 indicates that the adsorption behavior of strontianite at room temperature has relatively the same trend as that at 50° C., except that there is a higher adsorption density compared with that at room temperature.

The free energies of adsorption for hydroxamic acid on ancylite, calcite and strontianite were calculated using the Stern-Grahame equation shown in Eq. 6.13.

$$T\delta = 2rC\exp(-\Delta G°\ ads/RT) \quad \text{(Eq. 6.13)}$$

where $T_\delta$ is the adsorption density in the stern plane, and r is the effective radius of the adsorbed ion, C is the equilibrium concentration, $\Delta G°_{ads}$ is the standard adsorption free energy.

The free energies of adsorption for hydroxamic acid are found to be −6.15, −4.93, and −5.58 Kcal/mole for ancylite, calcite and strontianite, respectively. The values for free energies are in agreement with the experimental results showing that hydroxamic acid has the strongest affinity with ancylite, followed by strontianite, whereas calcite hydroxamate complex has the weakest affinity.

Based on the adsorption density results in two different temperatures, the enthalpies ($\Delta H°_{ads}$) and entropies ($\Delta S°_{ads}$) for the adsorption of three minerals were estimated by Eq. 6.15 and Eq. 6.16.

For any adsorption process, the standard free energy change is given by $$\Delta G°_{ads} = \Delta H°_{ads} - T\Delta S°_{ads} \quad \text{(Eq. 6.14)}$$

Assuming enthalpy and entropy are independent of temperature in this study,

Thus $$\Delta H°_{ads} = [(\Delta G°_1/T_1) - (\Delta G°_2/T_2)]/(1/T_1 - 1/T_2) \quad \text{(Eq. 6.15)}$$

$$\Delta S°_{ads} = (\Delta G°_1 - \Delta G°_2)/(T_2 - T_1) \quad \text{(Eq. 6.16)}$$

Where $\Delta G°_1$ and $\Delta G°_2$ are the standard free energies of mineral adsorptions at two different temperatures $T_1$ and $T_2$, respectively.

Figure 53:
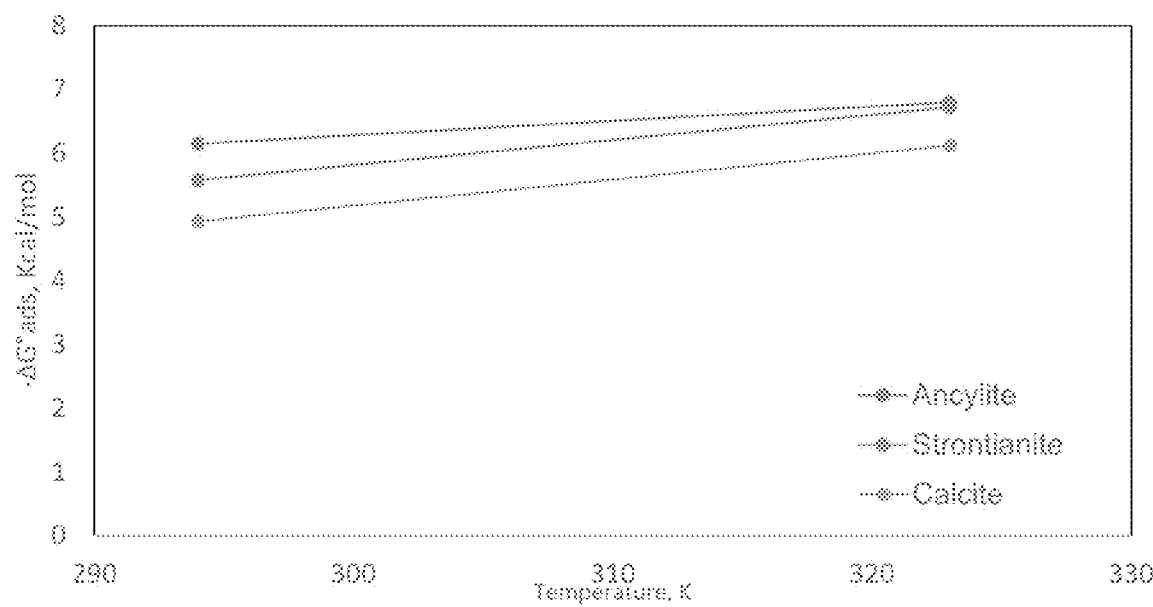
FIG. 53 is a graph showing the adsorption standard free energies for calcite, ancylite and strontianite at two temperatures.

The adsorption standard free energies of three minerals with different temperatures are plotted in FIG. 53. And the thermodynamic parameters are shown in Table 6.2. The enthalpy of ancylite is the lowest among the three minerals, which could explain why the adosprtion density of ancylite has the smallest increase in comparison with the other minerals. Furthermore, a conclusion could be made that the adsorptions of hydroxamic acid on the surface of these minerals are endothermic.

FIG. 53 The adsorption standard free energies for calcite, ancylite and strontianite at two temperature.

TABLE 6.2

Thermodynamic parameters for adsorption of hydroxamic acid on minerals

| Minerals | Enthalpy (Kcal/mole) | Entropy (Cal/mole K) |
|---|---|---|
| Ancylite | 0.44 | 22.41 |
| Strontianite | 5.98 | 39.30 |
| Calcite | 7.13 | 40.00 |

Microflotation for Pure Minerals

Figure 54:
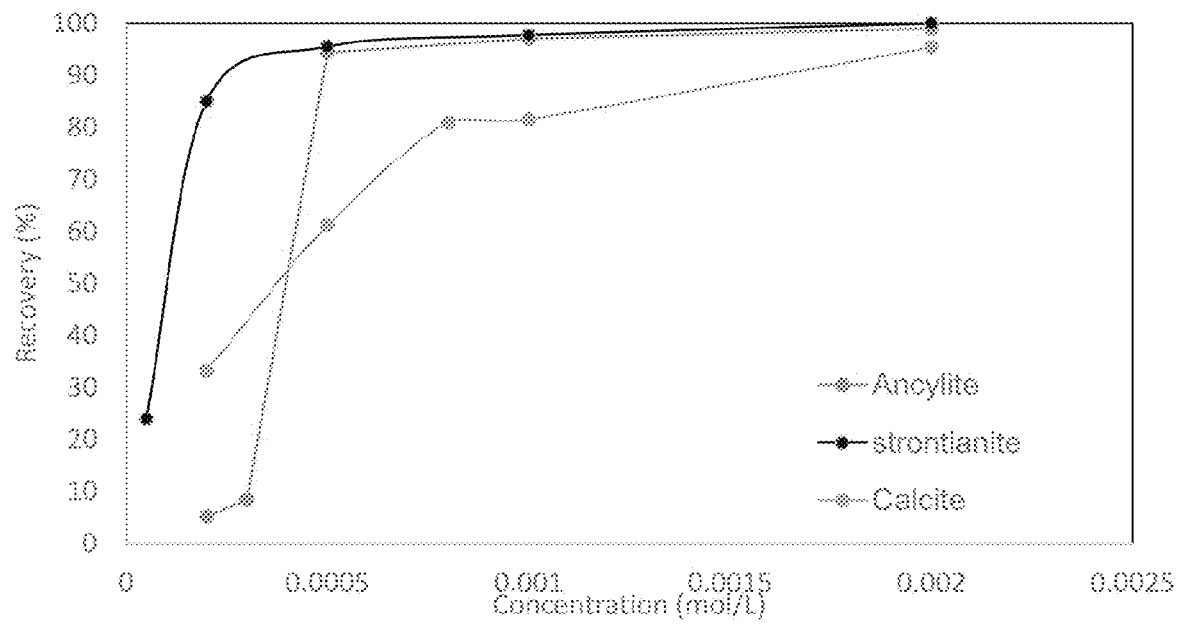
FIG. 54 is a graph showing the recovery versus collector concentration at pH 9.5.

As is clear from the result given in FIG. 54, the recovery of pure ancylite is extremely sensitive to various concentrations of hydroxamic acid. Particularly, at a low concentration from $3 \times 10^{-4}$ to $5 \times 10^{-4}$ M, there is a sharp increase in recovery of 8% to 94%. Nevertheless, the recovery of strontianite is around 85% at pH 9.5 in the presence of $2 \times 10^{-4}$ M hydroxamic acid, compared with the ancylite recovery of 5.2%. However, the maximum recovery of calcite is obtained at around $2 \times 10^{-3}$ M, which is in agreement with adsorption studies that calcite has the lowest adsorption density among the three minerals studied.

Figure 55:
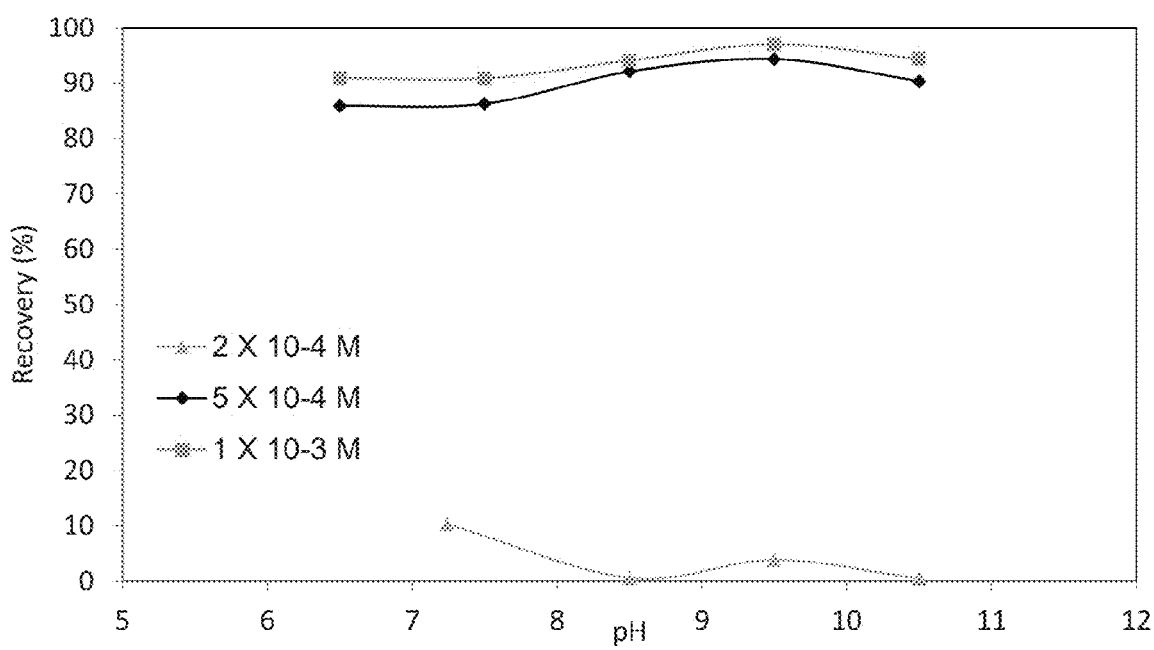
FIG. 55 is a graph showing the ancylite recovery versus pH at $2\times10^{-4}$ M, $5\times10^{-4}$ M and $1\times10^{-3}$ M octanohydroxamic acid.
Figure 56:
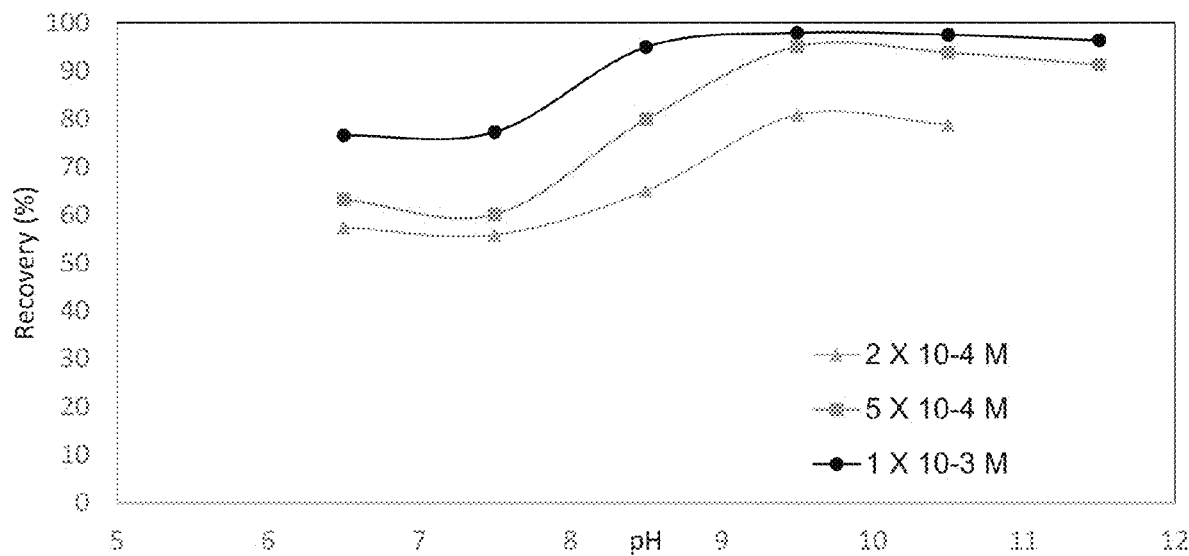
FIG. 56 is a graph showing the strontianite recovery versus pH at $2\times10^{-4}$ M, $5\times10^{-4}$ M and $1\times10^{-3}$ M octanohydroxamic acid.
Figure 57:
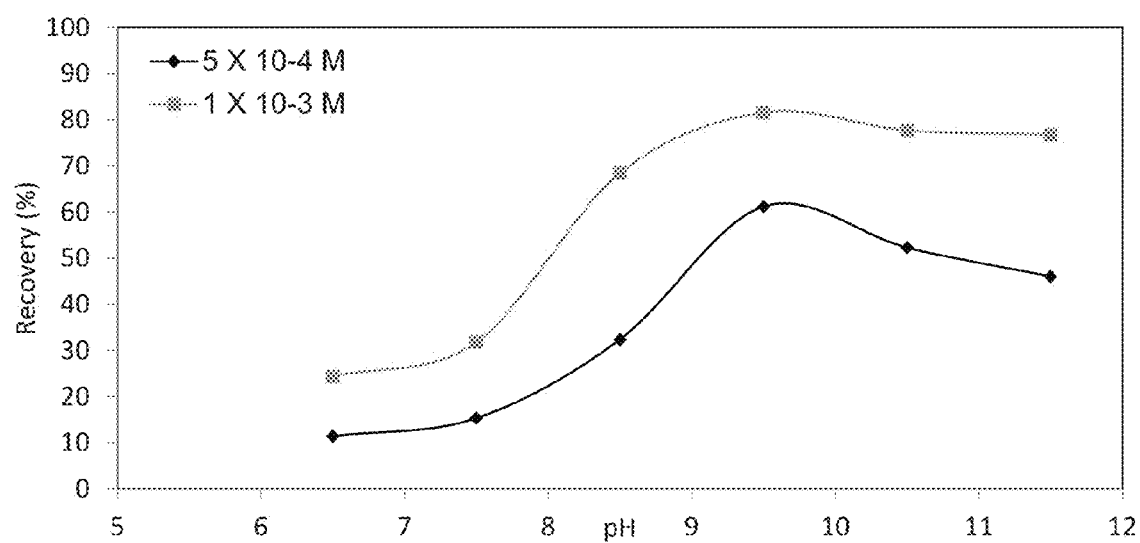
FIG. 57 is a graph showing the calcite recovery versus pH at $5\times10^{-4}$ M and $1\times10^{-3}$ M octanohydroxamic acid.
Figure 58:
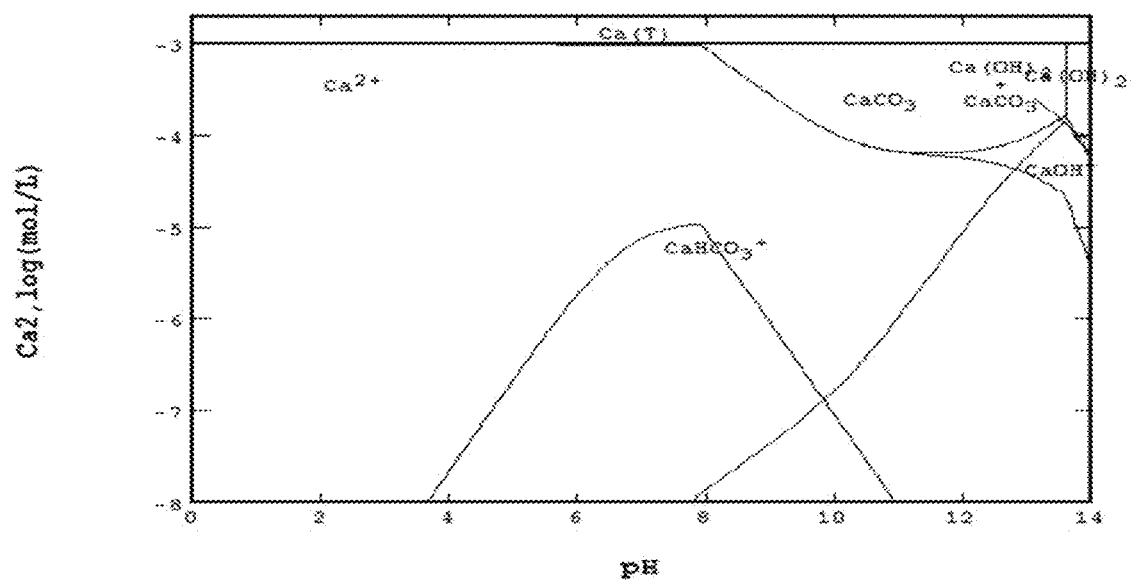
FIG. 58 is a graph showing the aqueous solution equilibrium for calcium at $10^{-3}$M total concentration in carbonate aqueous.
Figure 59:
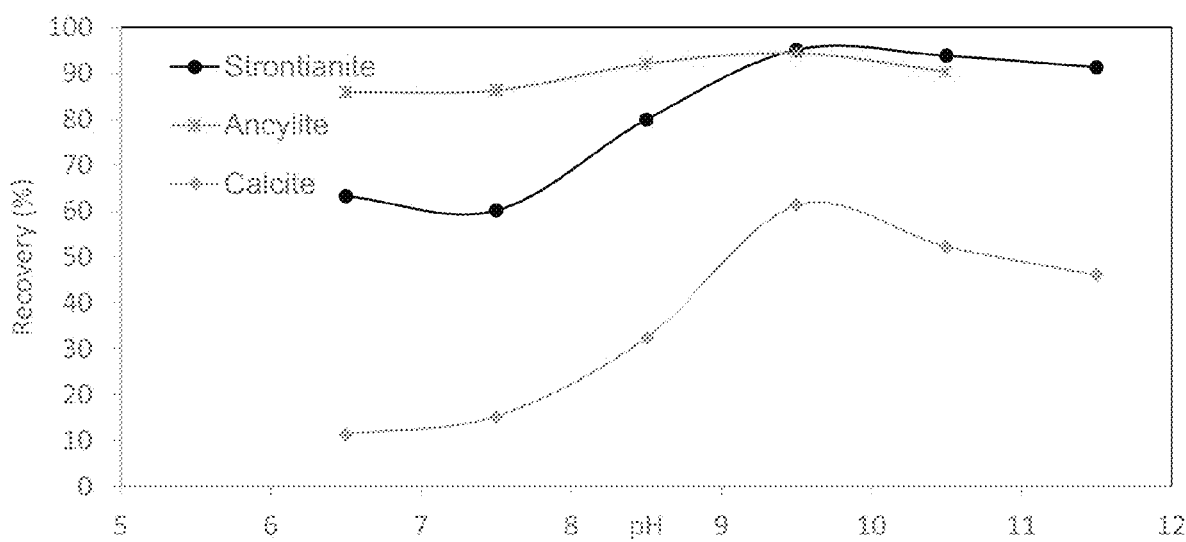
FIG. 59 is a graph showing the recovery of calcite, ancylite and strontianite at $5\times10^{-4}$ M octanohydroxamic acid as the function of pH.
Figure 60:
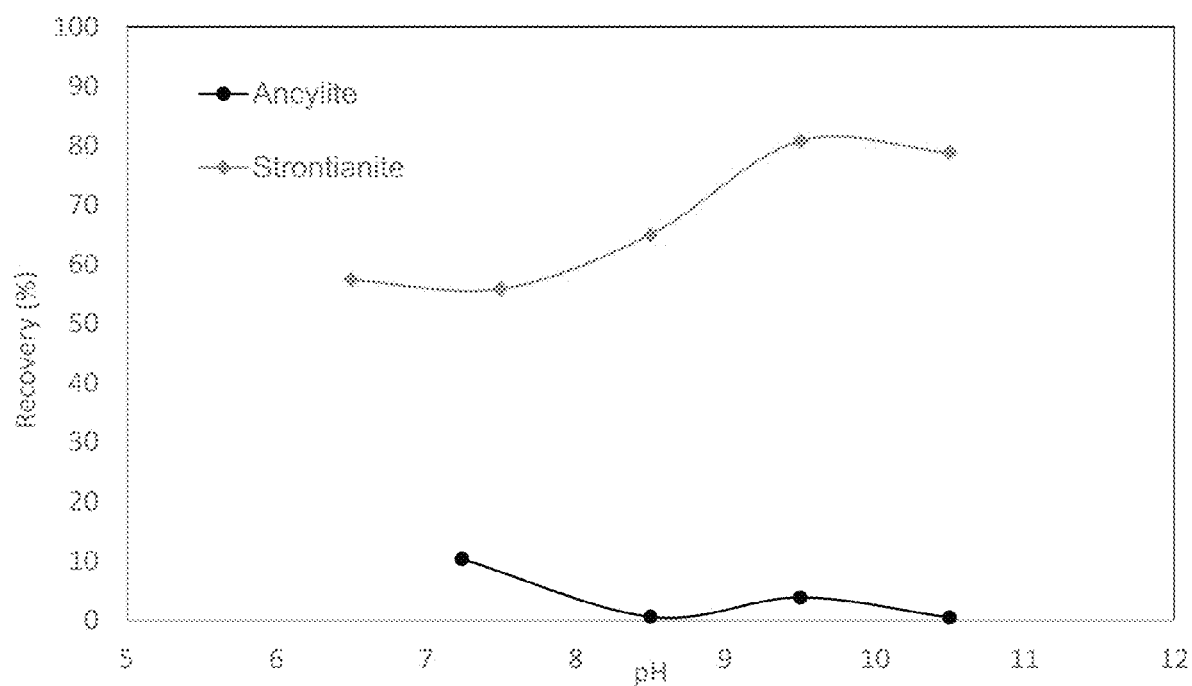
FIG. 60 is a graph showing the recovery of strontianite and ancylite at $2\times10^{-4}$ M octanohydroxamic acid as the function of pH.

FIG. 55 shows that at higher collector concentration, above $5 \times 10^{-4}$ M, recoveries of ancylite are relatively independent with pH variation and have the same trend as the collector concentration increases. In comparison with trends at high concentration, there is a difference occurring at low collector concentration when pH increases. A drop is found from pH 7 to pH 8.5, which also could be found in previous adsorption density studies. It is attributed to the fact that carbon dioxide plays a more significant role in activation of flotation at lower collector concentration than that at higher concentration. The resemblance of recovery vs. pH trends for strontianite in the presence of varied concentration is found in FIG. 56. The relatively low recovery of strontianite is obtained, even though the recovery is still above 60%. While calcite recovery is extremely dependent with pH at all range concentrations (FIG. 57). Compared with strontianite and ancylite, calcite appears to be more sensitive with alkaline environment, which could be explained by the fact, shown in FIG. 58, that $CaCO_3$ and $Ca(OH)_2$ precipitate on the surface of calcite to prevent the uptake of hydroxamic acid. Less than 20% recovery takes place when pH is below 7.5. Thus, it is clear to see (FIG. 59) that there is a potential methodology that could separate calcite from strontianite and ancylite. The method could be illustrated that at pH 7.5, where calcite separation (FIG. 60) could be theoretically achieved in the presence of $5 \times 10^{-4}$ M hydroxamic acid, then strontianite could be separated from ancylite in the presence of $2 \times 10^{-4}$ M hydroxamic acid at pH 9.5. However, a microflotation for a mixture of ancylite and strontianite with ratio 1:1 was conducted on the basis of the environment mentioned before. The results show that strontianite cannot successfully be separated from ancylite. And another microflotation with a mixture of calcite, ancylite and strontianite also confirms that calcite separation is not successful as single mineral flotation. The zeta potential tests, mentioned in above, also show that the isoelectric point of the each mineral is altered by the supernatant of the other mineral. The discrepancies between the single mineral and mixed minerals could result from the existence of dissolved species, since the solubility of semi-soluble minerals is drastically higher than in other systems. Amankonah J. O. et al. [80] observed that the shifts in the isoelecric point of calcite and apatite in the supernatants of each other were the result of many complex surface reactions. Somasundaran P. et al. [81] investigated that calcite might reprecipitate under certain pH conditions to convert the surface of apatite to calcite, when apatite was accommodated in the supernatant of calcite.

FT-IR Measurement

Figure 61:
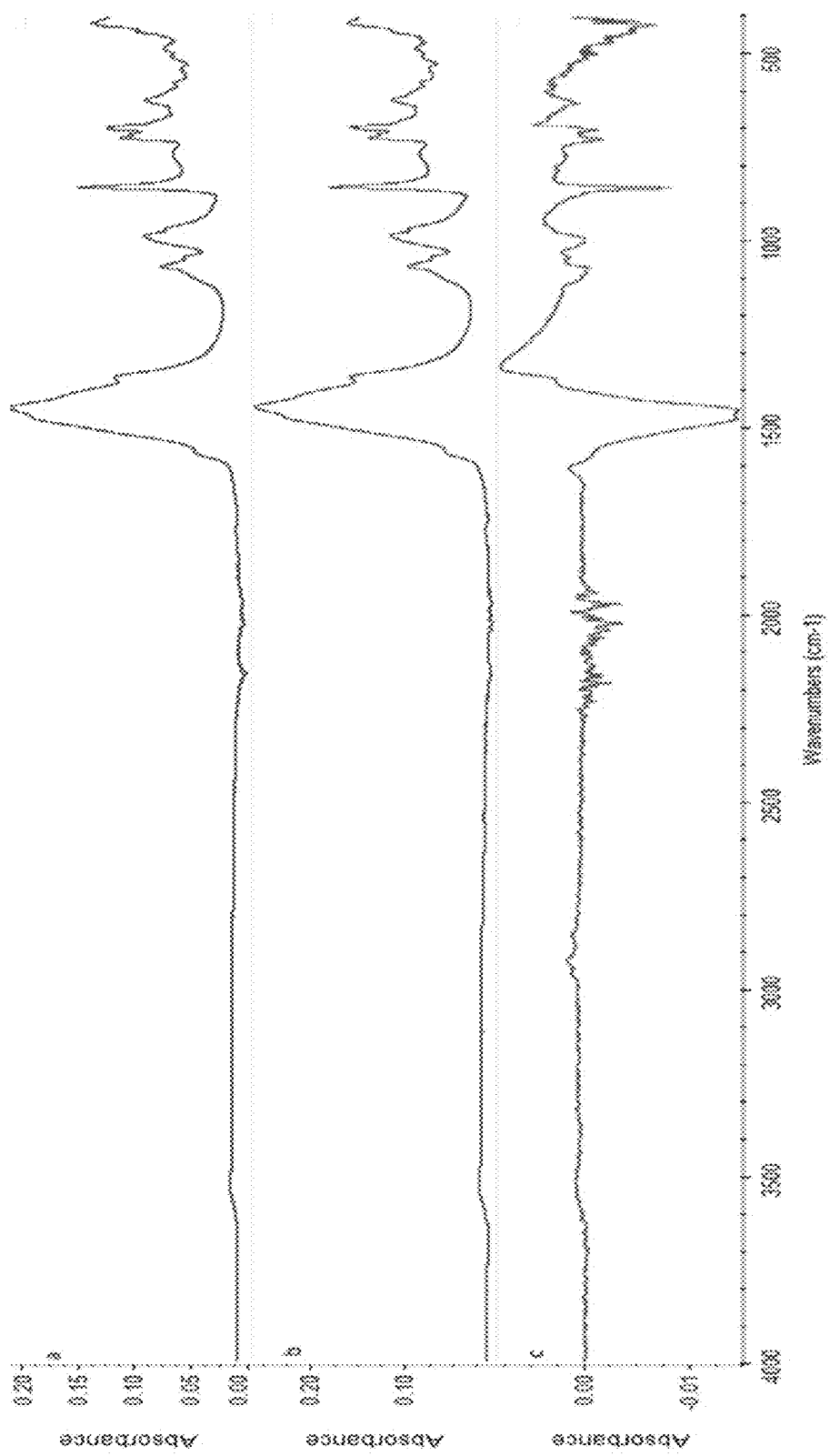
FIG. 61 is a graph showing the IR spectra of ancylite (a. ancylite before adsorption; b. ancylite after adsorption; c. difference between ancylite after and before adsorption).
Figure 62:
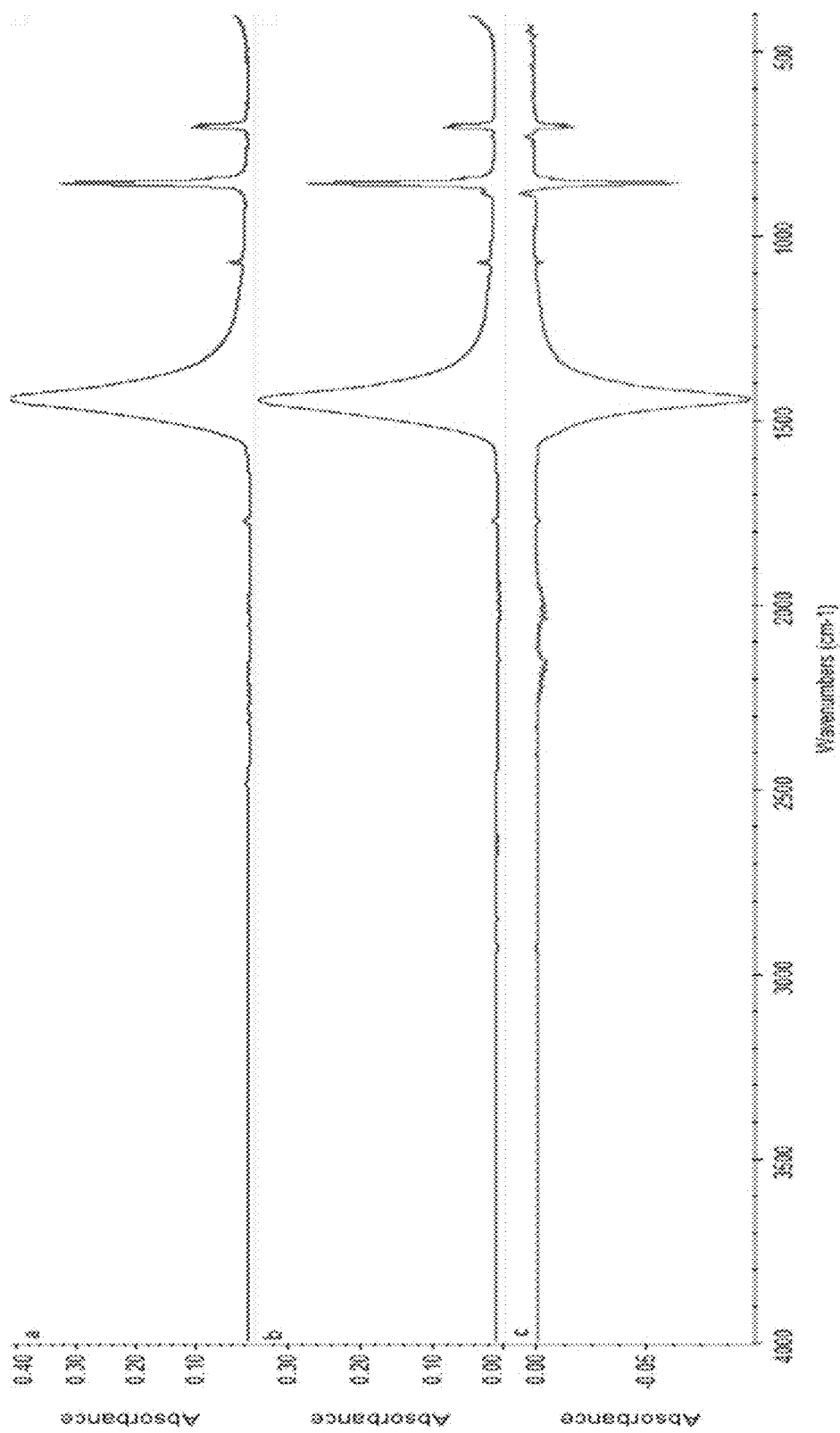
FIG. 62 is a graph showing the IR spectra of strontianite (a. strontianite before adsorption; b. strontianite after adsorption; c. difference between stronianite after and before adsorption).
Figure 63:
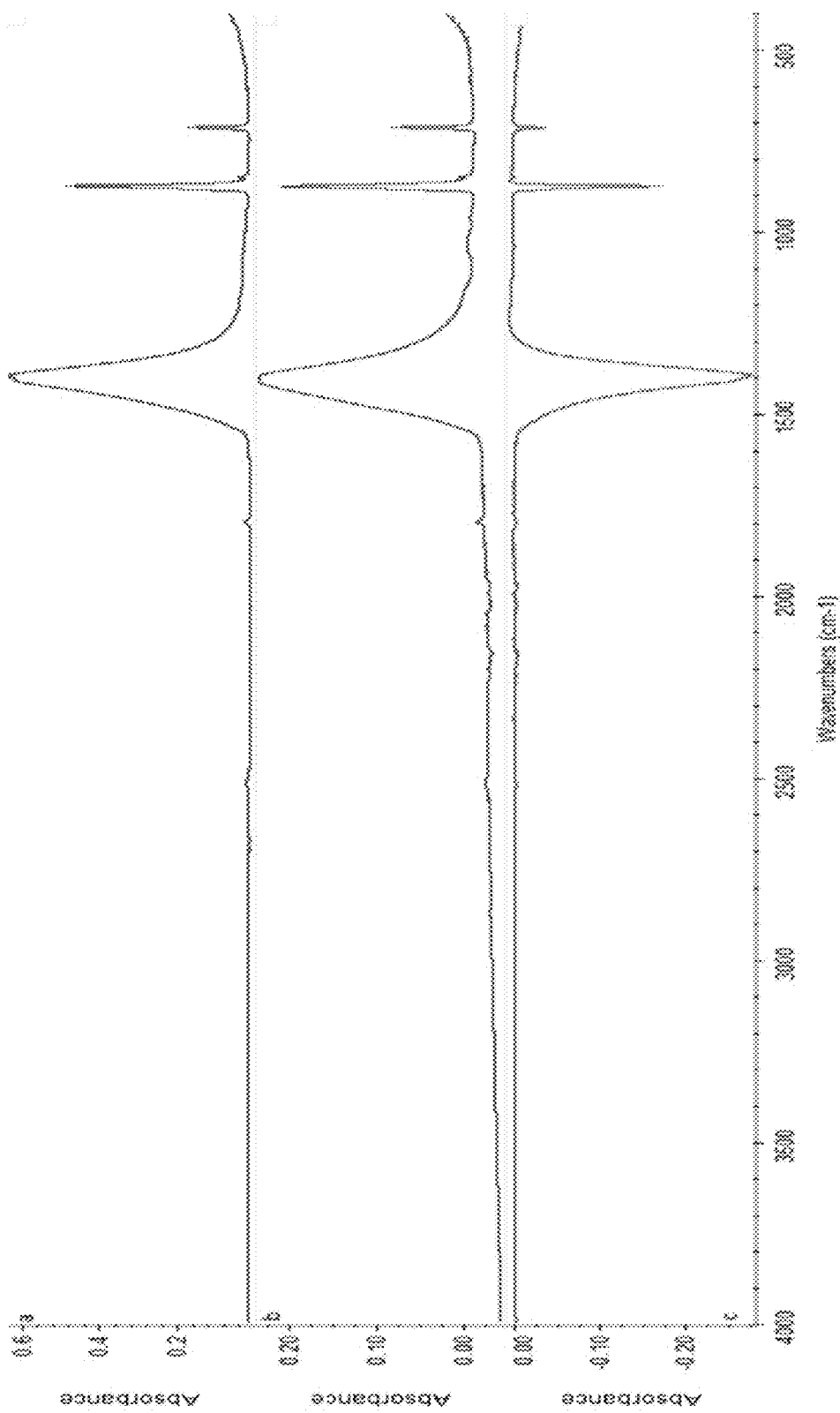
FIG. 63 is a graph showing the IR spectra of calcite (a. calcite before adsorption; b. calcite after adsorption; c. difference between calcite after and before adsorption).

IR spectra of the pure ancylite and ancylite-hydroxmate are shown in FIG. 61. There is a difference, shown in FIG. 61, between pure ancylite before and after adsorption. It is also a confirmation that chemisorption happens when hydroxamate adsorbs on the surface of ancylite particles. However, in this case, the IR spectra could not represent the true adsorbed formation of ancylite-hydroxamate complex. Chemisorption of hydroxamate on strontianite and calcite are also identified from FIGS. 62 and 63, respectively, which is in agreement with both electrokinetic measurements and adsorption experiments.

Flotation Fundamentals of Bear Lodge Ore

As mentioned above, the flotation behavior of pure minerals is different from ore, it is necessary to study the surface chemistry fundamentals of the sample from Bear Lodge Ore. Zeta potential, adsorption and thermodynamic calculations were conducted to have a better interpretation for flotation behavior and make a comparison with the flotation performance of individual pure minerals.

Figure 64:
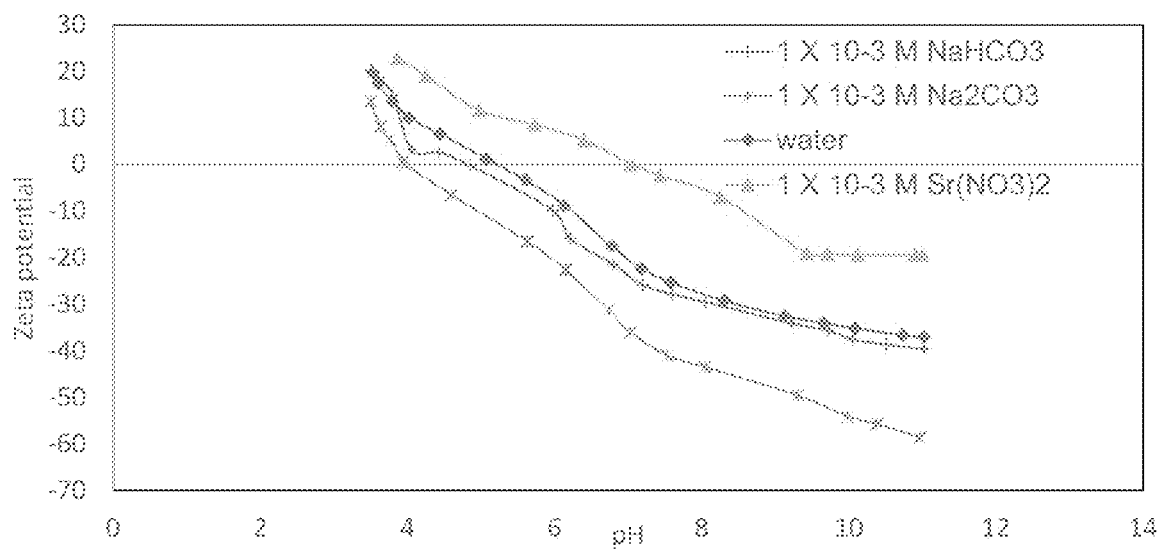
FIG. 64 is a graph showing the zeta potential of the sample in different electrolytes.

The electrokinetic response of the sample in the presence of distilled water, as a function of pH, is shown in FIG. 64. The isoelectric point is observed at around pH 5.27, which is lower than that of pure ancylite. It could be attributed to the fact that the composition of the sample is complex. Electrokinetic tests in different electrolytes are also performed and the results show that $Sr^{2+}$ and $CO_3^{2-}$ considerably affect zeta potential in the entire pH range, while $HCO_3^-$ has a minor effect on zeta potential of the sample. The effects of zeta potential in the presence of strontium and carbonate ions provide a potential guidance for batch flotation tests.

Figure 65:
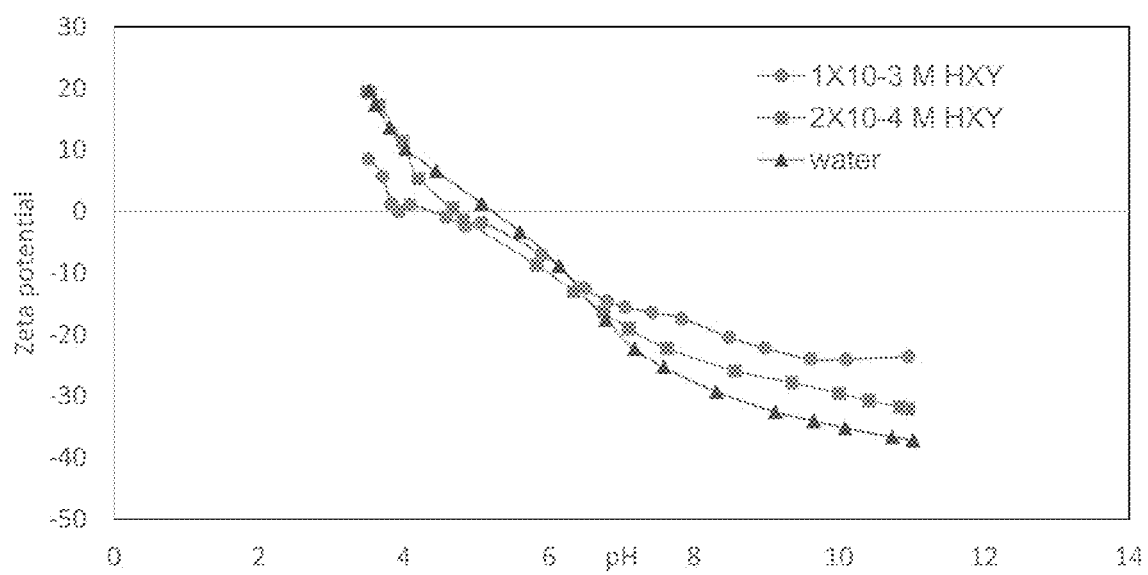
FIG. 65 is a graph showing the zeta potential of the sample in hydroxamic acid.

The effect of hydroxamic acid on the electrokinetic behavior of the sample is shown in FIG. 65. It is clearly observed that the addition of hydroxamic acid lowers the isoelectric point of the sample, and isoelectric point decreases as the concentration of hydroxamic acid increases. However, the addition of hydroxamic acid makes the range of zeta potential narrow, compared with the sample in distilled water, and the zeta potential of the sample becomes less negative as the collector concentration increases. These results clearly indicate that hydroxamic acid chemisorbs onto the sample surface, which is in accordance with individual minerals studies.

Figure 66:
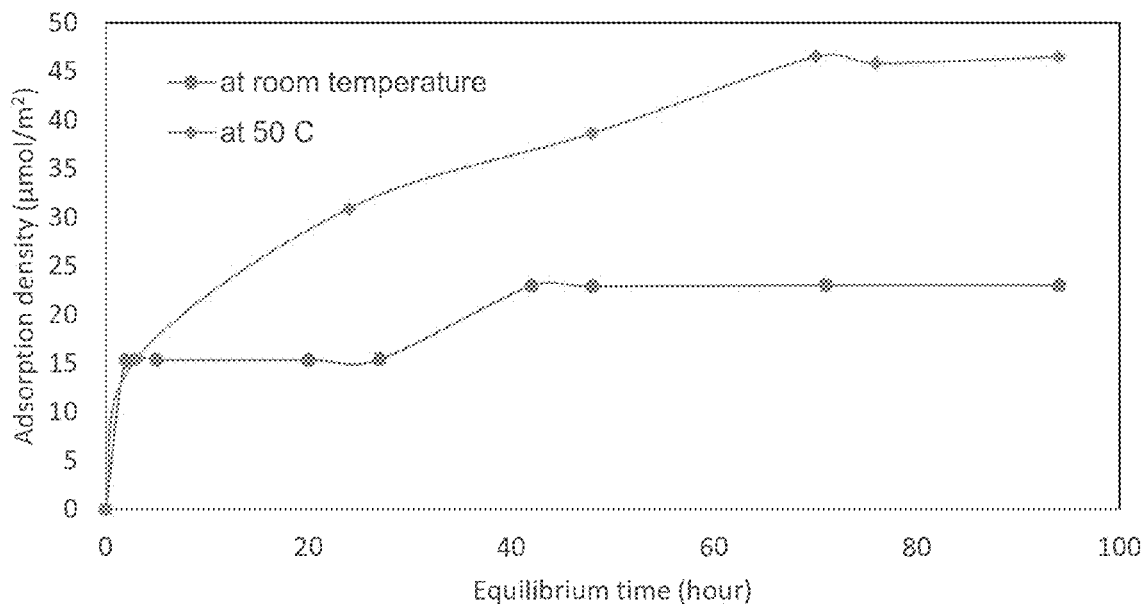
FIG. 66 is a graph showing the adsorption density of the sample as a function of time.
Figure 67:
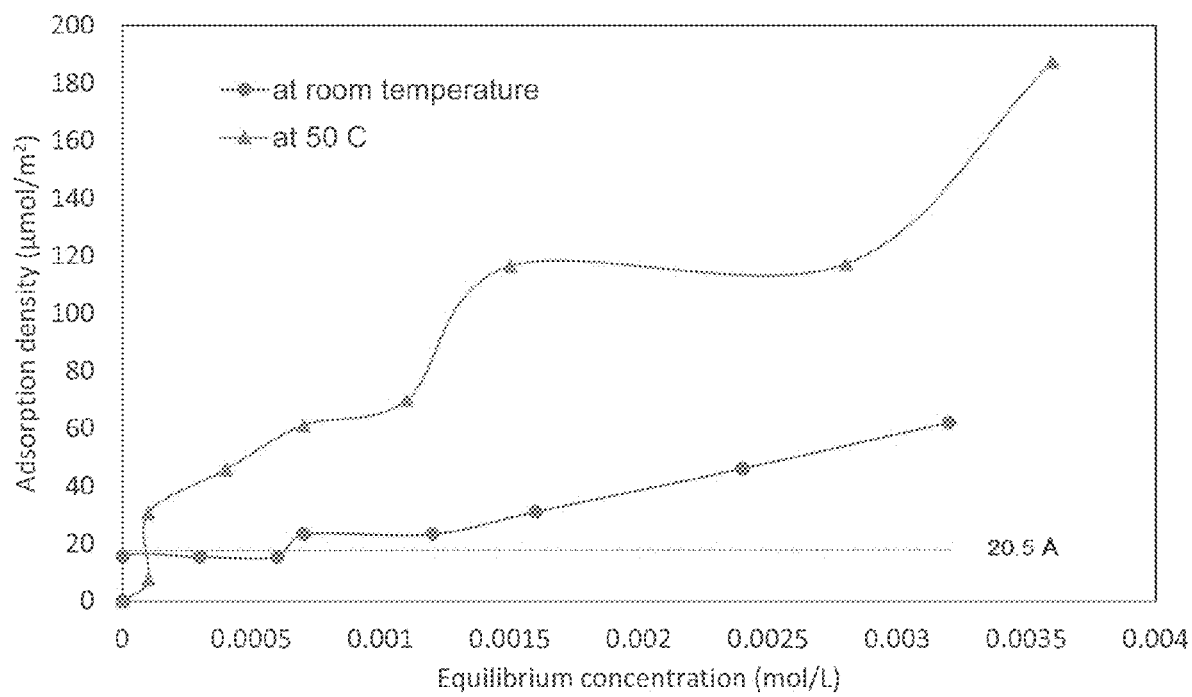
FIG. 67 is a graph showing the adsorption density of the sample as a function of concentration.
Figure 68:
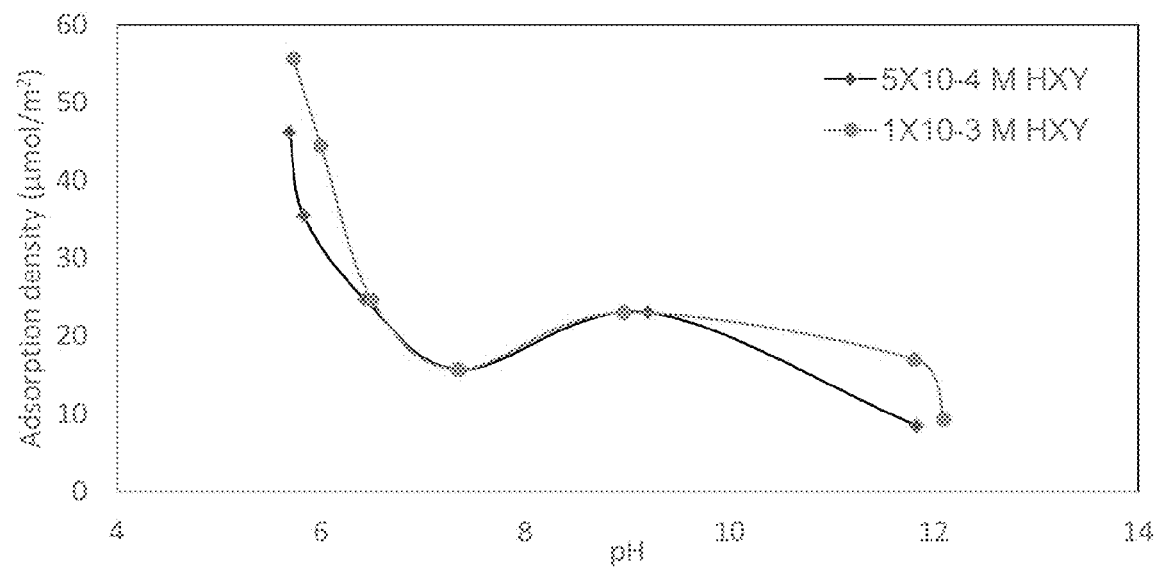
FIG. 68 is a graph showing the adsorption density of the sample as a function of pH in the presence of $5\times10^{-4}$ M and $1\times10^{-3}$ M octanohydroxamic acid at room temperature.
Figure 69:
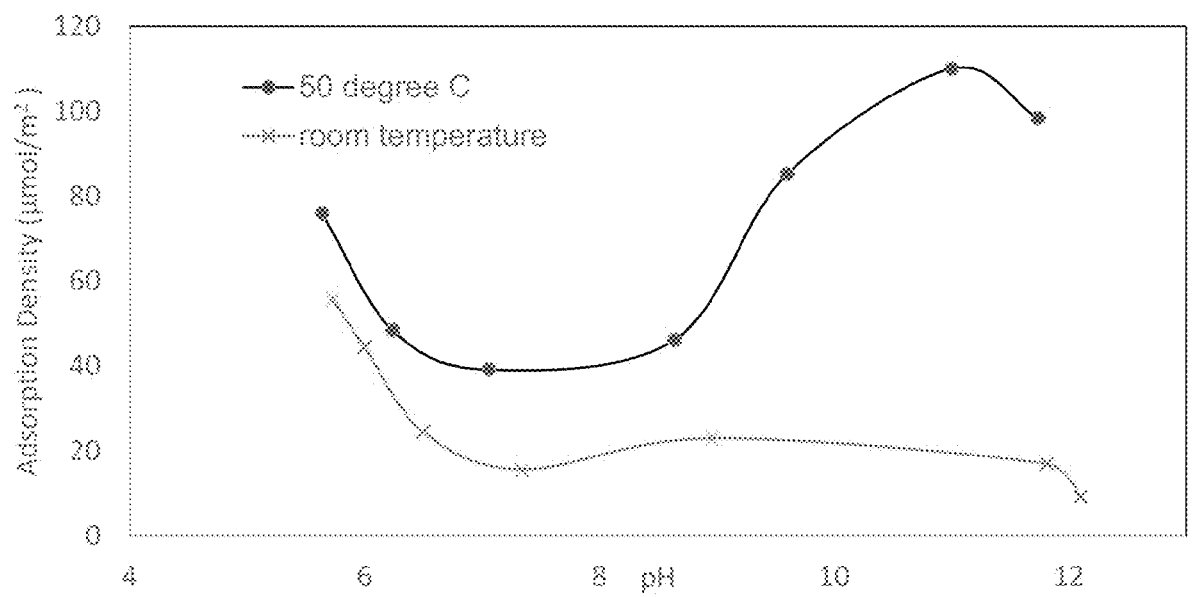
FIG. 69 is a graph showing the adsorption density of the sample at room temperature and 50° C. in the presence of $5\times10^{-4}$ M octanohydroxamic acid.

FIG. 66 shows the results on the adsorption of hydroxamic acid onto the sample as a function of time at both room temperature and 50° C. It is observed that the uptake of hydroxamic acid on the sample surface takes around 45 hours to reach the equilibrium, which is faster than that at 50° C. The adsorption density of hydroxamic acid on the sample surface as a function of the equilibrium surfactant concentration (0 to $3.6 \times 10^{-3}$ M) was determined at room temperature and 50° C. In some embodiments, the temperature was between about 15° and 65° C., for example greater than about 15°, 16°, 17°, 18°, 19°, 20°, 21°, 22°, 23°, 24°, 25°, 30°, 35°, 40°, 45°, 46°, 47°, 48°, 49°, 50°, 51°, 52°, 53°, 54°, 55°, 60°, or 65° C., and less than about 70°, 65°, 60°, 55°, 54°, 53°, 52°, 51°, 50°, 79°, 48°, 47°, 46°, 45°, 40°, 35°, 30°, 25°, 24°, 23°, 22°, 21°, 20°, 19°, 18°, 17°, or 16° C. The results obtained are presented in an adsorption isotherm plot. FIG. 67 indicates that adsorption isotherms at both temperatures behave strangely. At room temperature, a relative plateau happens at the low collector concentration, followed by a sharp increase. Then a plateau takes place, before adsorption density rises up with the increase of collector concentration. The reason that the adsorption plateau happens at low concentration of hydroxamic acid is that hydroxamic acid preferably horizontally adsorbs on the surface of iron minerals and rare earth minerals. The second adsorption density plateau obtained is designated as the formation of a close-packed monolayer where all the molecules are vertically oriented. Another increase of adsorption density could be attributed to the formation of the complex. It is also clear to show that temperature plays a significant effect on adsorption of hydroxamic acid on the surface of the sample. The change could indicate that the uptake of hydroxamic acid on the surface of the sample is an endothermic interaction.

On the basis of Eq. 6.13, the free energies of adsorption for hydroxamic acid were calculated to be −6.00 and −51.83 Kcal/mole at room temperature and 50° C., respectively. The free energy at high temperature is more negative than that at room temperature, which is in agreement with adsorption density results.

On the basis of the adsorption density results at two different temperatures, the enthalpies ($\Delta H°_{ads}$) and entropies ($\Delta S°_{ads}$) for the adsorption of the sample were estimated by Eq. 6.14 and Eq. 6.15. The thermodynamic parameters are shown in Table 6.3.

TABLE 6.3

Thermodynamic parameters for adsorption of hydroxamic acid on the sample

| Thermodynamic parameters | sample |
|---|---|
| Enthalpy (Kcal/mole) | 7.99 |
| Entropy (Cal/mole K) | 47.59 |

The effect of pH for the collector uptake on the sample surface is also studied. The same trends take place at room temperature with $1 \times 10^{-3}$ M and $5 \times 10^{-4}$ M hydroxamic acid. It could be attributed to the fact that in the range between $5 \times 10^{-4}$ to $1 \times 10^{-3}$ M, the adsorption mechanism is same. As expected, at pH below 7, adsorption density sharply increases as pH decreases, which might be explained by the presence of $CO_2$. At 50° C., however, at pH above 10, there is a peak happening at approximately pH 11. It might be attributed to the high solubility of $CaCO_3$, $SrCO_3$ and $Ce(OH)_3$ at high temperature. Since $CaCO_3$, $SrCO_3$ and $Ce(OH)_3$ could be formed in an alkaline environment, those compounds could precipitate on the surface of the sample to prevent the adsorption of hydroxamic acid at room temperature; however, as temperature increases, the solubility of these compounds increases, which contributes to the fact that no compound precipitates on the mineral surface to prevent adsorption.

Wet High Intensity Magnetic Separation (WHIMS)

As shown in Table 2.3, the stability constant of iron hydroxamate is much higher than that of rare earth hydroxamate. Thus, hydroxamate favorably adsorbs on the iron mineral surface, rather than rare earth minerals, which not only consumes a large amount of hydroxamic acid, but decreases the flotation selectivity. It is postulated that removal of iron as much as possible before the flotation process could be beneficial. Therefore, a wet high intensity magnetic separator (WHIMS) was employed to extract iron minerals from using the feed containing approximately 4.5% REO.

Table 6.4 shows the grade and recovery of iron as well as rare earth loss as a function of different magnetic field strengths when the grooved plates were used as the matrix. The recovery of iron increases as current increases. This is due to the fact that the higher the current is, the greater the magnetic force applied to the particles, which in turn are captured within the matrix. However, likely because of liberation effects, as the recovery of iron increases, the loss of the REO increases. The experimental results indicate that magnetic extraction of 42.8% of the iron minerals results in 5.6% REO loss at the current of 4 amperes.

Table 6.5, on the other hand, shows the recovery of iron and rare earth loss as a function of magnetic current in the matrix of 4,042 steel balls with the diameter of ¼". It is found that the recovery of iron and the loss of rare earth increases with increasing magnetic current. The recovery of iron when steel balls were employed as the matrix is higher than that in the grooved plate matrix. It could be attributed to the fact that the larger surface area steel balls has, the more amount of iron could be collected. Nevertheless, the loss of rare earth in the steel ball matrix is higher than that in the grooved plate matrix. A compromise has to be made between the iron extraction and rare earth loss. In an attempt to achieve the relatively high iron extraction with lower rare earth loss, 4 ampere current and the steel ball matrix were employed as the final magnetic parameters; 55.7% of iron recovery and 14.9% of REO loss were obtained. The non-magnetic product containing 6.9% REO after WHIMS processing were regarded as the feed of batch flotation tests.

TABLE 6.4

Results for WHIMS with grooved plate

| Current (ampere) | Iron assay (%) | Iron recovery (%) | REO loss (%) |
|---|---|---|---|
| 4 | 39.6 | 42.8 | 5.6 |
| 8 | 29.8 | 46.5 | 12.3 |
| 12 | 26.7 | 48.0 | 14.2 |
| 16 | 25.0 | 57.4 | 20.7 |

TABLE 6.5

Results for WHIMS rougher with steel balls

| Current | Iron assay (%) | Iron recovery (%) | REO loss (%) |
|---|---|---|---|
| 4 | 26.5 | 55.7 | 14.9 |
| 8 | 21.0 | 70.7 | 36.5 |
| 12 | 20.4 | 71.3 | 39.0 |
| 16 | 20.4 | 72.3 | 39.7 |

Bench Scale Flotation

The results of a study to determine optimum flotation conditions for the sample from Bear Lodge are described in this section. To establish a reagent scheme batch tests were performed, and a comparison with rare earth grade and recovery was applied as the assessment. Different dosages of hydroxamic acid and modifiers were tested. Meanwhile, varied pH, impeller speeds, and size fractions of the ore were also tested.

Rougher Flotation Tests

Figure 70:
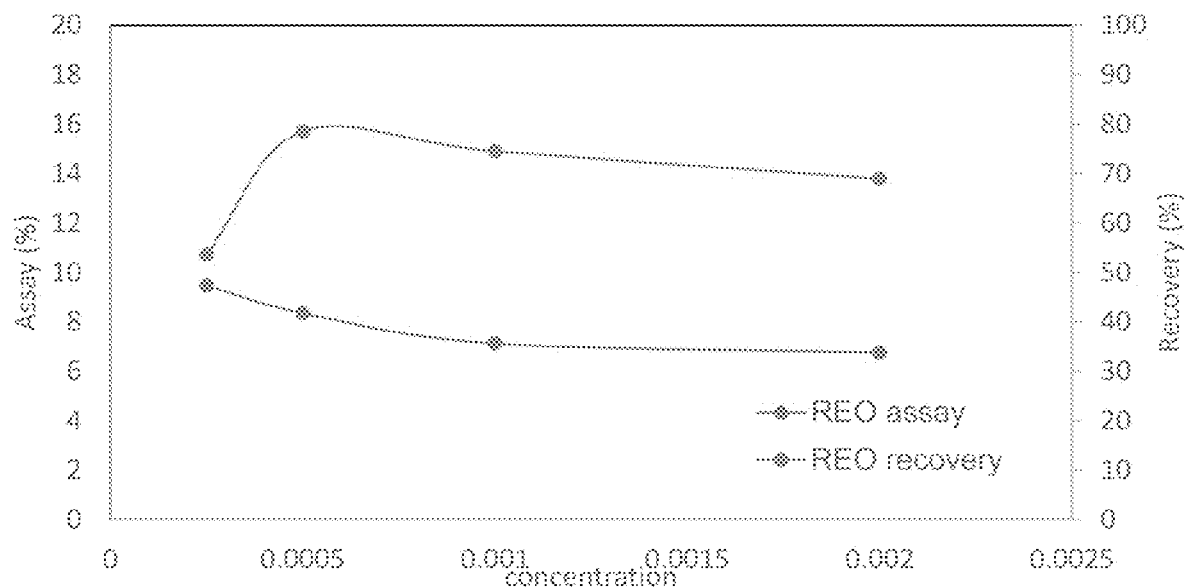
FIG. 70 is a graph showing the effect of the collector concentration on REO assay and recovery in the presence of $Na_2CO_3$.

After wet high intensity magnetic separation, a series of flotation tests as a function of collector concentration were conducted at pH 9 when HCl and $Na_2CO_3$ are pH adjustment solutions. The results (FIG. 70) clearly shows that a decreasing trend of the grade of REO takes place as the collector concentration increases. Whereas, the recovery of REO makes an increase until the concentration of hydroxamic acid is at $5 \times 10^{-4}$ M, followed by a drop. It could be due to a fact that the more usage of hydroxamic acid, the less selectivity obtained. Moreover, when the addition of octanohydroxamic acid is above $5 \times 10^{-4}$ M, the formation of micelle could happen, which contributes to the decrease of recovery.

Figure 71:
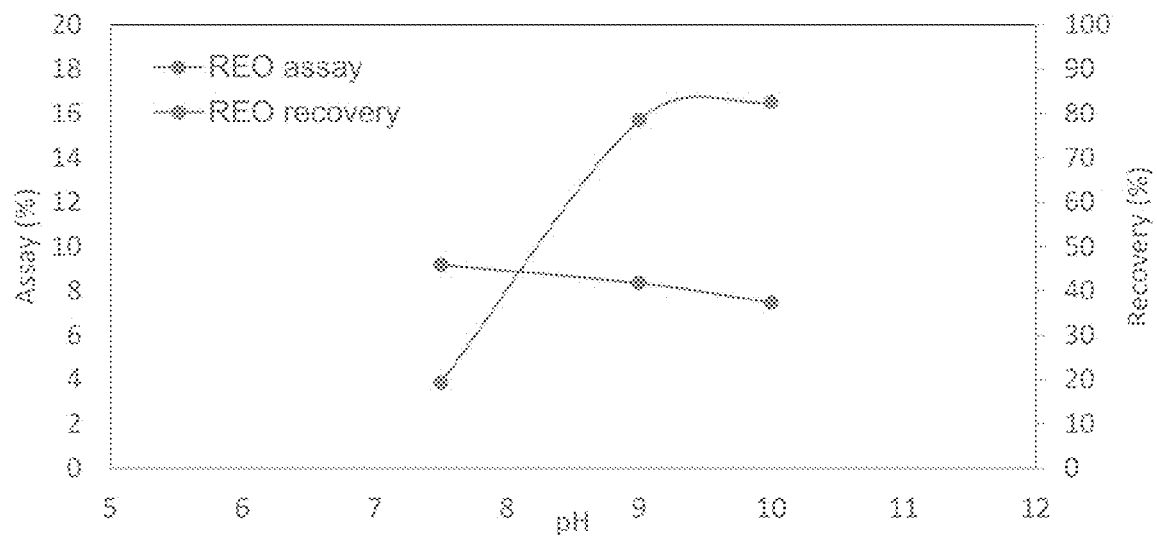
FIG. 71 is a graph showing the effect of pH on REO assay and recovery in the presence of HCl and $Na_2CO_3$ as pH adjustment solutions.
Figure 72:
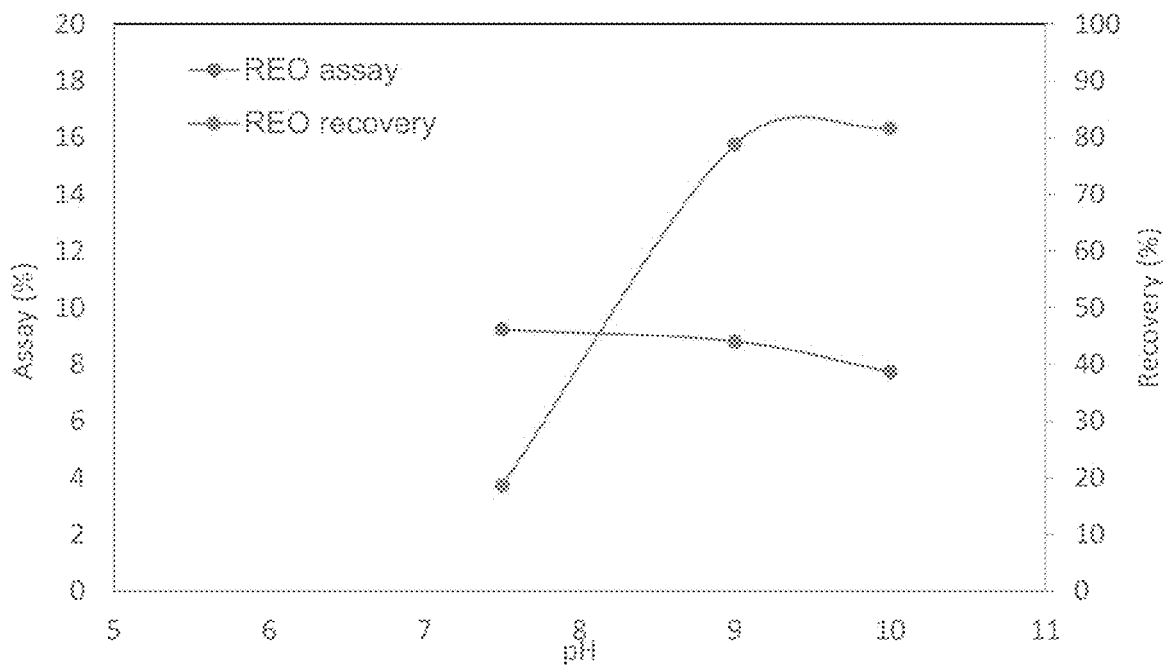
FIG. 72 is a graph showing the effect of pH on REO assay and recovery in the presence of HCl and KOH as pH adjustment solutions.

To investigate the effect of pH, rougher tests were carried out with modifications to this variable using HCl and $Na_2CO_3$ in the presence of $5 \times 10^{-4}$ M hydroxamic acid. FIG. 71 gives the effect of pH on REO recovery and grade. It shows a slight benefit for grade in favor of maintaining the pH below 7.5, which could also be expected to assist in pure ancylite microflotation; however, the REO recovery decreases sharply. Therefore, taking both grade and recovery into consideration, pH 9 is optimum. Another experiment was also conducted using HCl and KOH solutions as pH adjustment in the presence of $5 \times 10^{-4}$ M octanohydroxamic acid. The results obtained (FIG. 72) indicate that above pH 9.5, the trend in the presence KOH behaves similar with the trend of Na2CO3, the usage of KOH, however, is way less than that of $Na_2CO_3$, thus, KOH and HCl were employed as pH adjustment solutions and the results, shown in Table 6.6, obtained from the tests as a function of the collector concentration at pH 9 indicate that about $5 \times 10^{-4}$ M hydroxamic acid may be a preferred concentration for the sake of grade and recovery. In some embodiments, the concentration of collector in mol/L (M) is between about $1 \times 10^{-2}$ and $1 \times 10^{-5}$. In some embodiments the collector is a hydroxamic acid.

TABLE 6.6

The effect of various collector concentration on REO assay and recovery in the presence of HCl and KOH as the pH adjustment solutions

| Concentration mol/L | REO assay (%) | REO recovery (%) |
|---|---|---|
| $5 \times 10^{-4}$ | 8.8 | 78.8 |
| $1 \times 10^{-3}$ | 7.0 | 78.9 |

Figure 73:
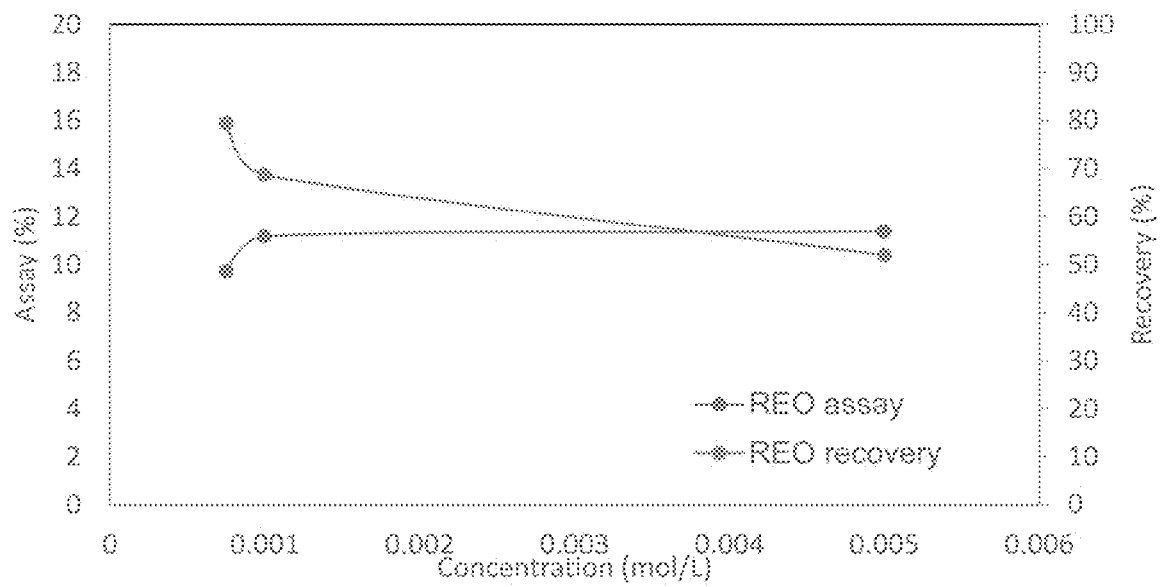
FIG. 73 is a graph showing the effect of strontium nitrate on REO assay and recovery in the presence of HCl and KOH as pH adjustment solutions.

Since strontianite and calcite, the main gangue minerals associated with ancylite, are carbonate minerals, one difference between those three minerals is that the cation ions, such as $Sr^{2+}$ and $Ca^{2+}$, are characteristic, which is also confirmed by zeta potential tests. Therefore, a series of batch tests were performed as a function of the addition of strontium ion. Strontium nitrate was added with the ore and then conditioned with the collector solution for 15 minutes. Thus, the influence of dosage is shown in FIG. 73. REO grade and recovery vary directly with the addition of strontium nitrate. The use of strontium nitrate slightly increases REO grade but at the marked expense of recovery. Thus, $7.5 \times 10^{-4}$ M may be preferred for the rougher flotation. Another test was conducted to show the influence whether the 10 minutes preconditioning with strontium nitrate and the sample was necessary before the addition of the collector. The results in Table 6.7 show that preconditioning time has an effect on the grade and recovery.

TABLE 6.7

The effect of strontium nitrate preconditioning time on REO assay and recovery

| Preconditioning time (minutes) | Assay (%) | Recovery (%) |
|---|---|---|
| 0 | 9.7 | 79.5 |

Moreover, to improve the flotation selectivity, more efforts were made on investigating other depressants. Sodium fluorosilicate, commonly used in the rare earth flotation industry, was also tested in varied concentration. Sodium fluorosilicate depresses all the carbonate minerals no matter how much the concentration is. It is probably due to the fact that the surface chemistry qualities of ancylite, calcite and strontianite are too similar to distinguish any one from the others.

In an attempt to investigate the effect of the impeller speed on the flotation performance, one test was conducted at 1300 rpm for conditioning and 1100 rpm for floating. In comparison with the results obtained at 900 rpm for both conditioning and floating, shown in Table 6.8, the increasing speed gives a slightly positive effect on the grade and a slight deduction for the REO recovery. The reason is that the increasing speed makes the solids more suspended so that there is a greater possibility that the collector can adsorb on the mineral surface.

Thus, when the flotation condition is: 20% solid density, $5 \times 10^{-4}$ M hydroxamic acid, $7.5 \times 10^{-4}$ M strontium nitrate, pH 9 adjusted by KOH and HCl solutions, a 1300 rpm conditioning impeller speed and an 1100 pm floating impeller speed, 10.7% of REO assay is obtained with 78.3% of recovery.

On the other hand, a desliming test was conducted to determine whether desliming could affect the flotation performance. The desliming test was investigated using a 400 mesh standard Tyler sieve. The feed with 400 grams sample was poured in a shaker covered by a 400 mesh standard Tyler sieve and rinsed with tap water. The sample with both minus 400 mesh and plus 400 mesh were filtrated and dried, separately. Approximately 60.5% of the feed is in the size fraction from minus 100 mesh to plus 400 mesh, which is regarded as the flotation feed to run rougher flotation under the same optimum condition. Table 6.9 indicates that after desliming, both assay and recovery are depressed, which could be attributed to two assumptions. The first assumption is that 400 mesh is not fine enough to be treated as the desliming level. The second assumption is that the size range from 100 mesh to 400 mesh is too big to get the sample well-liberated. In various embodiments, the size fraction is less than 100, 200, 300, 400, or 500 mesh. In one embodiment the size fraction is -325 mesh. In various embodiments the size fraction may be more than about 600, 500, 400, or 300 mesh.

TABLE 6.8

The effect of impeller speed on REO assay and recovery

| Condition | REO assay (%) | REO recovery (%) |
|---|---|---|
| 900 rpm for conditioning and floating | 9.7 | 79.5 |
| 1300 rpm for conditioning and 1100 rpm for floating | 10.7 | 78.3 |

TABLE 6.9

The effect of desliming on REO assay and recovery

| Condition | REO assay (%) | REO recovery (%) |
|---|---|---|
| No desliming | 10.7 | 78.3 |
| After desliming | 7.0 | 56.9 |

Cleaner Flotation Tests

In order to further optimize the assay of REO, the cleaner flotation tests were conducted as the functions of hydroxamic acid concentration and the usage of strontium nitrate. Moreover, the regrinding process also was investigated to delineate the effect of particle size for the cleaner flotation performance. The concentrate (10.7% REO) of 125 grams was employed using 1 L Denver Cell with an 1100 rpm impeller speed for conditioning and 900 rpm impeller speed for flotation. The air flow rate was 380 ccm. HCl and KOH solutions were used to keep the pH constant at 9, other acids and bases, known to the skilled artisan may be used.

Two concentrations of hydroxamic acid were employed to show that the flotation performance at $1 \times 10^{-4}$ M hydroxamic acid was better than that at $2.5 \times 10^{-4}$ M hydroxamic acid, when taking both assay and recovery into account. Table 6.11 indicates that $5 \times 10^{-4}$ M $Sr(NO_3)_2$ gives the higher assay and recovery, compared with that at $5 \times 10^{-4}$ M $Sr(NO_3)_2$. It is probably due to the depression of Sr $(NO_3)_2$. Moreover, in order to get the larger surface area, the regrinding process was conducted by grinding rougher concentrate so that all or nearly all of the concentrate passed 200 mesh. The results obtained, however, illustrate that the REO assay is almost constant while the recovery decreases, compared with the cleaner test without regrinding. It is attributed to the fact that overgrinding happens during the regrinding process so that the particle is too small to be floated up.

TABLE 6.10

The effect of hydroxamic acid on the cleaner flotation

| Collector Concentration (M) | REO Assay (%) | REO Recovery (%) |
|---|---|---|
| $2.5 \times 10^{-4}$ | 10.7 | 78.6 |
| $1 \times 10^{-4}$ | 10.9 | 76.8 |

TABLE 6.11

The effect of strontium nitrate on the cleaner flotation

| $Sr(NO_3)_2$ usage (M) | REO Assay (%) | REO Recovery (%) |
|---|---|---|
| $5 \times 10^{-4}$ | 10.5 | 63.5 |
| $4 \times 10^{-4}$ | 11.2 | 72.7 |

TABLE 6.12

The effect of regrinding on the cleaner flotation

| Condition | REO Assay (%) | REO Recovery (%) |
|---|---|---|
| No regrinding | 11.2 | 72.7 |
| Regrinding | 11.2 | 68.3 |

A conclusion could be made that a cleaner concentrate with 11.2% assay and 72.7% recovery could be obtained under the condition of $1 \times 10^{-4}$ M hydroxamic acid, $4 \times 10^{-4}$ M $Sr(NO_3)_2$, 11.11% pulp density, 0.0266 g/kg AEROFROTH 70 and an 1100 rpm impeller speed for conditioning, as well as a 900 rpm impeller speed for floating.

Flotation Simulation

On the basis of the conclusion of the previous studies, locked-cycle tests were supposed to be conducted. However, due to the limited amount of the Bear Lodge ore, the locked-cycle tests cannot be experimentally conducted. Thus, a flotation simulation was conducted based on the theory of JKSimfloat software. The flotation flowsheet proposed was illustrated that the non-magnetic minerals after magnetic separation was fed to the rougher flotation with a pulp density of 20%, then the rougher concentrate was sent to the cleaner stage with a pulp density of 11.11%. The tailing from the cleaner flotation was sent back to the rougher flotation. Thus, the cleaner concentrate and rougher tailing were regarded as the final products.

In this simulation, the first order kinetic model, shown in Eq. 6.16, was used to model the flotation behavior.

$$-dC/dt = kC \qquad (Eq.\ 6.16)$$

Where C=the concentration of the specific mineral
t=flotation time
k=first order rate constant After integrating Eq. 6.16, the recovery in laboratory batch tests at each time could be determined for minerals and the flotation rate was calculated using the following equation.

$$R = 1 - EXP(-kt) \qquad (Eq.\ 6.17)$$

Where R=overall mineral recovery
t=flotation time
k=first order rate constant

Alexander et al [83] indicated that the flotation rate was divided into several floatability components such as ore floatability, bubble surface area flux, and froth recovery factor. The flotation rate constant could be expressed as Eq. 6.18.

$$k = P\ S_b\ R_f \qquad (Eq.\ 6.18)$$

Where k=overall flotation rate constant ($min^{-1}$)
P=ore floatability
$S_b$=bubble surface area flux ($min^{-1}$)
$R_f$=froth recovery factor According to the JK floatability index, the definition of the ore floatability is the probability of a particle corresponding to the froth phase of the flotation process [84]. An assumption is used that the total amount of minerals with floatability $P_i$ in the concentrate and tailing of a flotation cell is equal to that in the feed [83].

Figure 74:
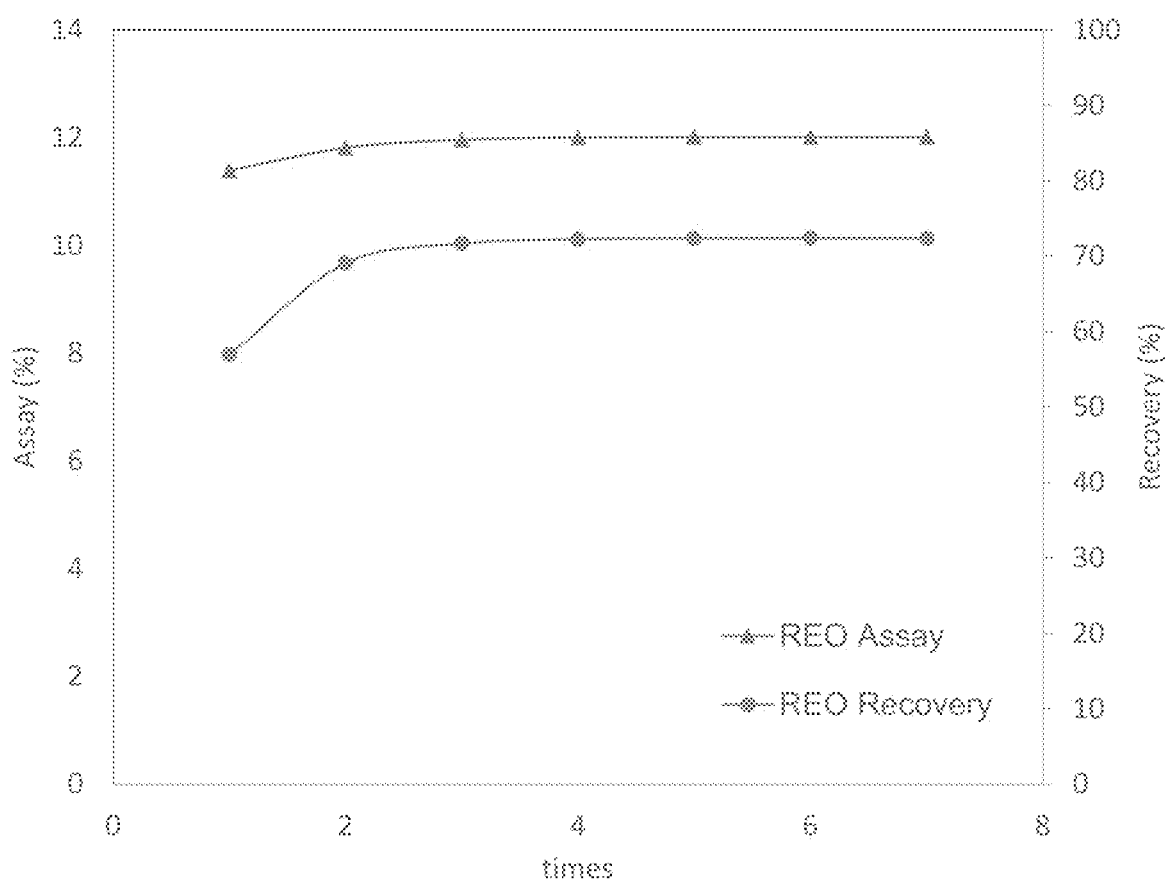
FIG. 74 is a graph showing the effect of closed-circle times on REO assay and recovery.
Figure 75:
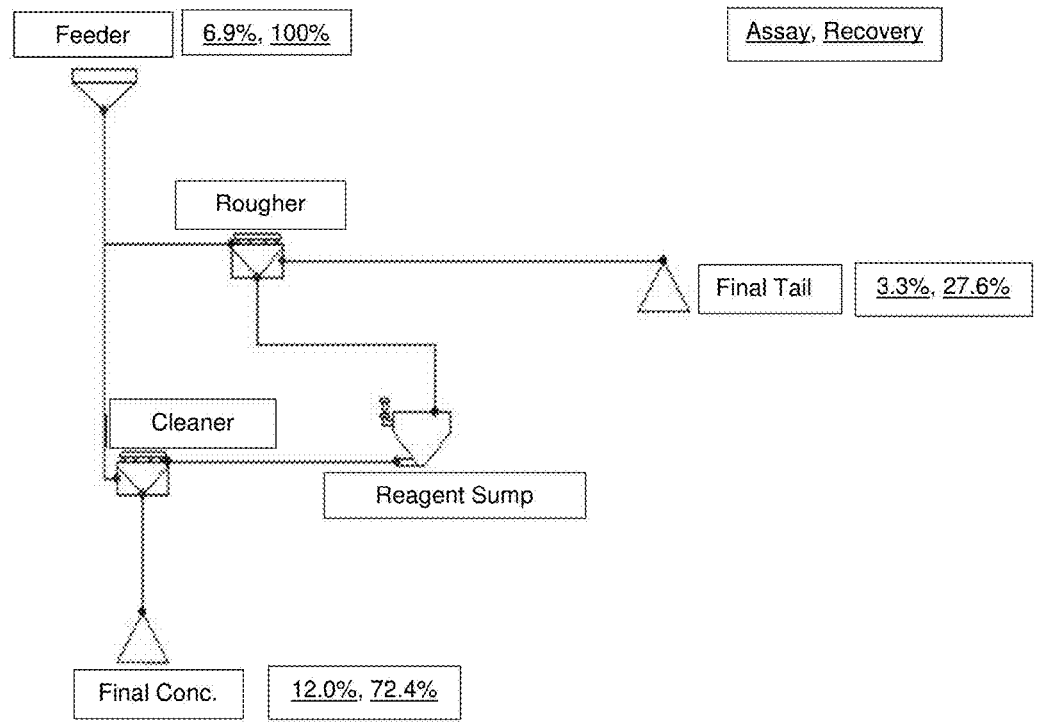
FIG. 75 is a flowsheet showing ancylite flotation
Figure 76:
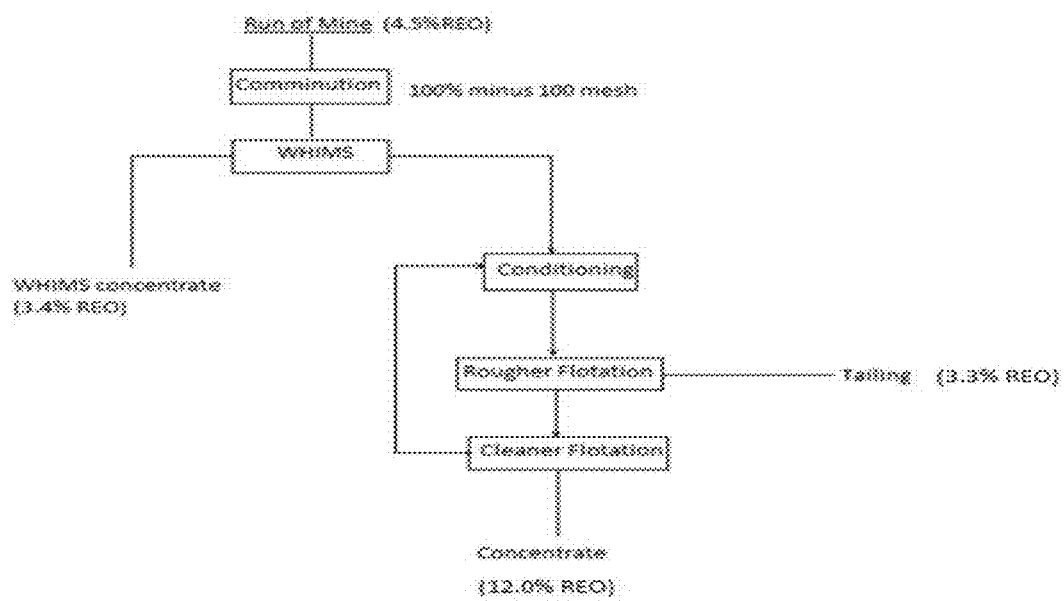
FIG. 76 is a flowsheet of the sample from Bear Lodge Ore

In this study, the floatability component distribution of ancylite and gangue are shown in Table 6.13 and Table 6.14, respectively. They were calculated by the experimental results under the flotation time of 6 and 4 minutes for the rougher and cleaner flotation tests, respectively. The floatability rate could be obtained by replacing the recovery of the cleaner flotation and 4 minutes into the Eq. 6.17. Likewise, theoretical recoveries of the ancylite and gangue for each flotation stage, shown in Table 6.15 and Table 6.16, respectively, could be calculated. Six floatability components distributions of both ancylite and gangue minerals at different flotation stages (appendix B) were conducted, and the final assay and recovery, shown in FIG. 74, were achieved to be constant where the REO assay was 12.0% and the REO recovery is 72.4%. Therefore, the flowsheet proposed with the final assay and recovery is shown in FIG. 75.

TABLE 6.13

Floatability components distribution of ancylite

|  | Floating | Non-floating |
|---|---|---|
| Floatability rate (min$^{-1}$) | 0.3246 | 0 |
| Floatability component distribution (%) | 91.31 | 8.69 |

TABLE 6.14

Floatability components distribution of gangue

|  | Floating | Non-floating |
|---|---|---|
| Floatability rate (min$^{-1}$) | 0.2724 | 0 |
| Floatability component distribution (%) | 57.12 | 42.88 |

TABLE 6.15

Calculated recovery of different stages of ancylite flotation

| Stage name | Flotation time (min) | Calculated recovery (%) Floating | Non-floating |
|---|---|---|---|
| Rougher | 6 | 85.7 | 0 |
| Cleaner | 4 | 72.7 | 0 |

TABLE 6.16

Calculated recovery of different stages of gangue flotation

| Stage name | Flotation time (min) | Calculated recovery (%) Floating | Non-floating |
|---|---|---|---|
| Rougher | 6 | 80.5 | 0 |
| Cleaner | 4 | 66.4 | 0 |

Conclusion

Based on the previous studies, a brief process, shown in FIG. 75, is developed to treat the sample from Bear Lodge. The brief process is that the run-of-mine ore with around 4.5% REO is first fed to the comminution circuit. The product, which is 100% minus 100 mesh, undergoes wet high intensity magnetic separators (WHIMS) with 8.75 amps/m$^2$ current flux. The magnetic concentrate contains around 3.4% REO. The conditioning treatment for WHIMS tailings is carried out with 1.27 lb/ton strontium nitrate, 0.64 lb/ton hydroxamic acid and 0.05 lb/ton frother. The pH at this stage is around 9. The slurry containing 20% solids is pumped to the rougher flotation circuit. The rougher concentrate, assaying approximately 10.6% REO, is then transported to the cleaner conditioning tank to be treated with 0.25 lb/ton hydroxamic acid, 1.34 lb/ton strontium nitrate as well as 0.05 lb/ton frother. The slurry with 11.11% solids is pumped to the cleaner stage at pH 9. The cleaning stage yields a final concentrate containing around 12.0% REO at an overall recovery of 61.6%. And the tailing, which is sent back to rougher flotation, is another product from the cleaner stage. The final tailing obtained contains approximately 3.3% REO.

Preliminary Evaluation

The basic purpose of the preliminary evaluation is to assess the potential feasibility of the flowsheet purposed from the economic perspective. In the attempt to make an economic evaluation, the estimates of the capital and operating costs of the processing plant were made. Capital cost estimates are generally divided into two portions: a fixed capital and a working capital. The fixed capital in this study was estimated via the O'Hara method. Working capital cost estimation was determined following the rule that the working capital cost is 12% to 15% of the fixed capital. The operating cost was estimated by the comparative cost estimate methodology. The cost estimate is likely to be within ±30% accuracy. Finally, a financial analysis was made to provide a description of discounted cash flow analysis.

Capital Cost Estimate

It is well-known that capital cost consists of fixed capital and working capital. In this study, the fixed capital was estimated by the O'Hara method, and the working capital is calculated by the method mentioned by Mular et al [85], which is that the working capital is 12% to 15% of fixed capital. Thus, the working capital being equivalent to 12% of the fixed capital was used. Several assumptions are made for the capital cost estimation.

1. The mineral plant is built in a flat site.
2. The foundation is built on the solid rock.
3. Twenty seven employees are in this mill.
4. Employee lives in bunkhouses.
5. The capacity is 1,100 tons per day.

Other than several assumptions, the 2014 technical report of Bear Lodge Project [59] is regarded as the reference to estimate the capital cost. The water pipe length of 1,500 ft is based on distance between the wells and the PUG plant. The electricity was assumed to be provided by PreCorp. Therefore, a capital estimate is listed in Table 7.1.

The total current capital cost is calculated by the reference cost multiplied by the index ratio. Thus, the total current capital cost is $62,088,000.

TABLE 7.1

Summary of the mill plant capital cost estimation

|  | Cost Item | Factor | Reference Cost (1000$) |
|---|---|---|---|
|  | Clear/excav. | 1 | 690 |
|  | Foundation | 1 | 1,374 |
|  | Crush/conv. | — | 3,092 |
|  | Mill bldg. | 1.8 | 3,711 |
|  | Grind/storage | 1.5 | 3,283 |
|  | Flotation/WHIMS | 3 | 2,052 |
|  | Thicken/filt. | 1 | 344 |
|  | Con. Storage | — | 935 |
|  | Tail pond | — | 206 |
|  | Power lines | P = 20000 | 3,724 |
| Infrastructure | Plant services | 27 | 243 |
|  | Townsite housing | 27 | 1,174 |
|  | Feasibility, plan, design | 0.07 | 99 |
|  | Supervision, camp | 0.09 | 127 |
|  | Admin, staff | 0.055 | 78 |
| Water | Pipe costs | L = 0.28 | 110 |
|  | Fresh water pumps | — | 322 |
|  | Reclaim water pumps | — | 420 |
|  | Feasibility | — | 1,858 |
|  | Supervise/camp | 0.09 | 1,824 |
|  | Admin, staff | 0.055 | 1,115 |
|  | Working capital | 0.12 | 3,213 |
|  | Total capital cost | — | 29,994 |

Operating Cost Estimate

The comparative estimate method is employed to make an estimation for the operating cost. The comparative model reference is obtained from CostMine 2013 [86]. Complementary assumptions are made and listed below:

1. The flowsheet in this study shows that the run-of-mine ore is sent to the crushing circuit. A Jaw crusher produces a product of minus 4 inches in size. A 4 in×8 in vibrating screen with 0.75 inch opening returns the oversize to a 3 ft diameter secondary standard core crusher, which has 0.25 inch discharge; meanwhile, the undersize is sent to storage bins. The product from the crushing circuit is sent to the grinding-magnetic separation-flotation (G-MS-F) plant. Grinding is carried out in a 10 ft×18 ft ball mill and produces a minus 100-mesh product for magnetic separation. The closed grinding circuit also contains a 6 inch cyclone. The overflow undergoes magnetic separation. The underflow is sent back to ball mill. The tailing and concentrate from magnetic separation are pumped to two 20 ft thickeners. The tailing undergoes conditioning and flotation treatments. The concentrate from the cleaner flotation stage is transported to a thickener, filter disk, and rotary dry. The final dry concentrate is stored in a front end loader. The tailing from cleaner stage is pumped back to the rougher stage. The final tailings from the rougher flotation combined with concentrate from the magnetic separation circuit are thickened and pumped to a tailing pond.

2. The plant schedule is shown in Table 7.2.

TABLE 7.2

The plant schedule

| Circuit | Hours/day | Days/week |
|---|---|---|
| Crushing | 16 | 5 |
| G-MS-F | 24 | 7 |

3. The density of the run of mine is 3,500 kg/m$^3$.
4. Ball mill operates at 70% solid by weight.
5. Magnetic separation operates at 20% solid by weight.
6. Seventy-five percentage solid of the feed is in the overflow.
7. The tailing from magnetic separation contains 17.1% solid by weight, while the concentrate contains 46.31% solid by weight.
8. The thickener underflow for magnetic separation tailings contains 60% solid by weight.
9. The rougher flotation operates at 20% pulp density, while the cleaner stage operates at 11% pulp density.
10. The concentrate from the cleaner stage contains 80% solid by weight.
11. The total electricity contains the electricity used by main equipment and others. Others is assumed to be 15% of the electricity used by main equipment.
12. The usage of fuel is assumed to be 300 gallon/day at the price of $2.78/gal.
13. The price of AERO 6493, which is a hydroxamic acid product developed by Cytec, is $5.60/lb. The price of MIBC and strontium nitrate are $1.5/lb and $0.60/lb, respectively.
14. Hourly personnel requirement and salaried personnel requirement, which is same as a 1,000 tonnes model from CostMine (2013) [86], are listed in Table 7.3.
15. PreCorp provides a cost of electricity of $0.068 per kWh. [59]
16. Grinding media cost is assumed to be $750/ton.

The equipment and the supplies used in this plant are listed in Table 7.4 and Table 7.5, respectively.

TABLE 7.3

Hourly personnel requirement and salaried personnel requirement

| Class | Workers/day |
|---|---|
| Hourly Personnel requirement | |
| Crusher operators | 2 |
| Grinding operators | 2 |
| Magnetic separation operators | 2 |
| Flotation operators | 3 |
| Filter operators | 2 |
| Dryer operators | 0 |
| Assayers | 1 |
| Samplers | 3 |
| Laborers | 6 |
| Mechanics | 3 |
| Electricians | 3 |
| Total Hourly Personnel | 27 |
| Salaried personnel requirement | |
| Mill superintendent | 1 |
| General foreman | 0 |
| Maintenance foreman | 1 |
| Plant foreman | 3 |
| Senior metallurgist | 0 |
| Metallurgist | 1 |
| Process technician | 1 |
| Instrument technician | 1 |
| Process foreman | 1 |
| Total salaried personnel | 9 |

Table 7.6 shows the operation cost for the plant. Supplies are the greatest cost followed by labor and administration.

Economic Analysis

Economic analysis for this study was undertaken utilizing the Discounted Cash Flow (DCF) methodology and was based on the capital and operating cost estimates. The capital and operating cost estimates are described below. The cash flow model includes the following assumptions:

1. All amounts are constant dollars, not adjusted by inflation.
2. A constant price for the final concentrate is assumed to be $500/ton.
3. The assay and production of run-of-mine keeps constant.
4. There is no fluctuation for costs of labor, power and reagents. Tailing storage and general administration costs keep constant over the 10 years.
5. Financial periods are equal to one year.
6. No capitalized equipment replacements are included after the beginning of production.
7. Severance tax rate and federal tax are 2% and 20%, respectively. The exemption for federal tax is $40,000.

TABLE 7.4

List of the main equipment

| Items | Model | HP | Number |
|---|---|---|---|
| Jaw crusher | 24 in × 36 in | 125 | 1 |
| Standard cone crusher | 3 ft diameter, ¼ ft discharge | 200 | 1 |

TABLE 7.4-continued

List of the main equipment

| Items | Model | HP | Number |
|---|---|---|---|
| Vibrating screen | 4 ft × 8 ft, double deck | 5 | 1 |
| Belt feeder | 24 in × 4 in | 3 | 2 |
| Bin | 8 ft × 8 ft | 5 | 1 |
| Ball mill | 10 ft × 18 ft | 1,000 | 1 |
| Cyclone | 6 in diameter | | 1 |
| High intensity induced roll magnetic separator | 1 start, 3 passes, 8 tph | 10 | 5 |
| Thickener | 20 ft diameter | 1.5 | 4 |
| Medium slurry pump | 500 gpm | 15 | 5 |
| | 200 gpm | 10 | 1 |
| | 100 gpm | 2.5 | 1 |
| | 50 gpm | 1.5 | 1 |
| | 20 gpm | 1 | 2 |
| Mixer | 36 in impeller diameter | 10 | 4 |
| Reagent feeder | Maximum feed rate 0.26 gpm | 0.08 | 8 |
| Flotation cell | 60 cu ft | 10 | 24 |
| Belt conveyor | 30 in belt width, 60 ft length | 15 | 1 |
| | 30 in belt width, 200 ft length | 40 | 2 |
| Filter disk | 259 sq ft | 1.5 | 1 |
| Rotary dry | 4 ft diameter, 30 ft length | 20 | 1 |

Sensitivity Analysis

Figure 77:
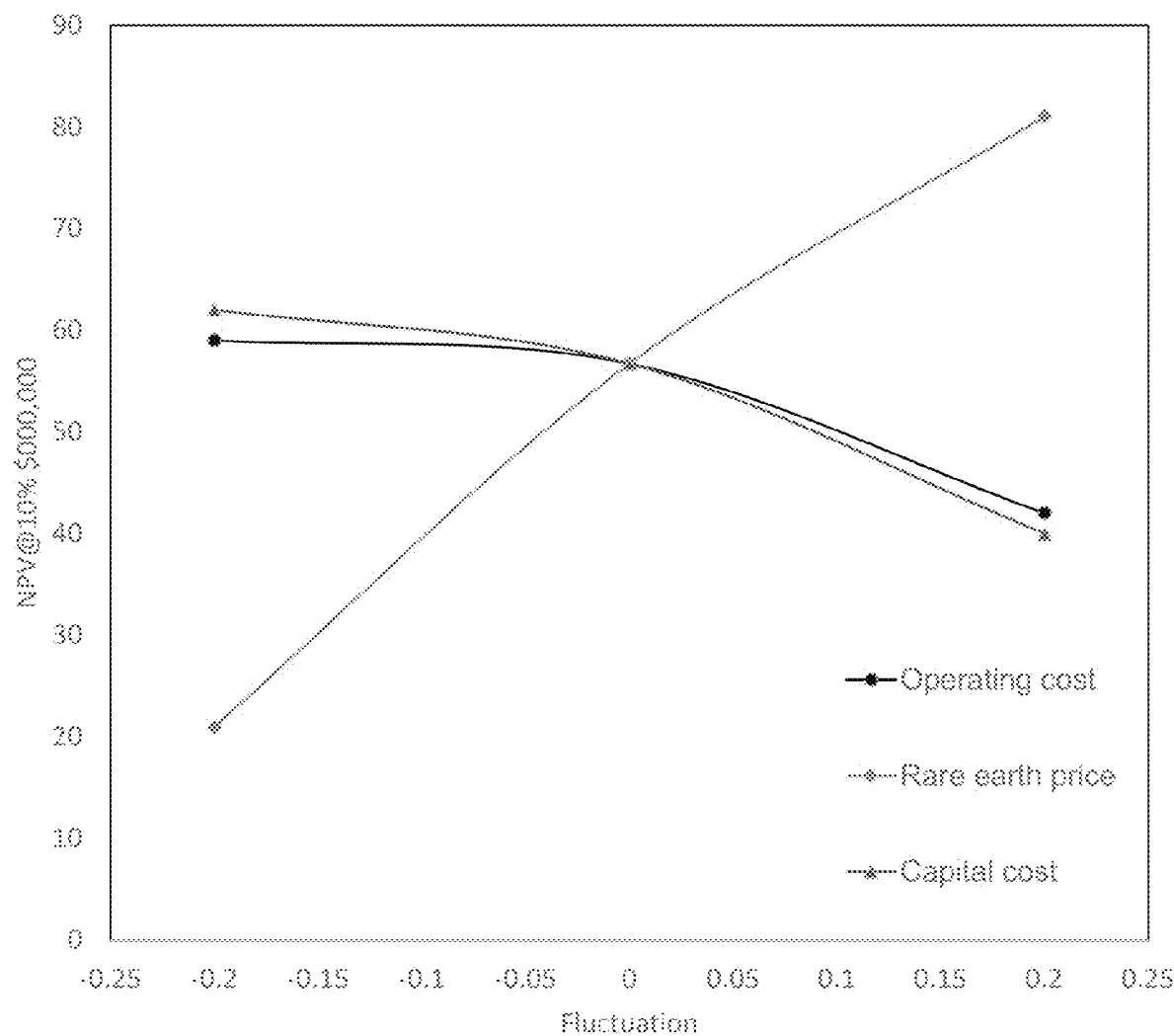
FIG. 77 is a graph showing the sensitivity analysis as functions of the capital cost, operating cost and rare earth price.

There are numerous risks to the financial viability of this study. Sensitivity analysis was performed to assess the impacts on the financial results. Several factors were employed such as rare earth concentrate price, capital cost and operating cost. Price fluctuation of ±20% for each factor was conducted. The results are presented in FIG. 77.

TABLE 7.5

List of the supplies

| Supplies | Value |
|---|---|
| Electricity (KWh/day) | 212,727 |
| Fuel (gallon/day) | 300 |
| Grinding media (lb/day) | 2,573 |
| Frother (lb/day) | 55 |
| Collector (lb/day) | 275 |
| Strontium nitrate (lb/day) | 1,474 |

TABLE 7.6

Plant operating cost summary

| Cost item | $/ton feed |
|---|---|
| Supplies | 17.07 |
| Labor | 6.09 |
| Administration | 2.28 |
| Sundry Items | 1.76 |
| Total operating cost | 27.2 |

TABLE 7.7

Cash flow forecast (thousand dollar)

| Year | −1 | 1 | 2 | 3 | 4 | 5 |
|---|---|---|---|---|---|---|
| Annual fixed capital | −55,437 | | | | | |
| Annual Working capital | | −6,651 | | | | |
| Annual operating cost | | −7,779 | −7,779 | −7,779 | −7,779 | −7,779 |
| Annual revenue | | 34,320 | 34,320 | 34,320 | 34,320 | 34,320 |
| Severance tax | | 686.4 | 686.4 | 686.4 | 686.4 | 686.4 |
| Federal tax | | 6,856 | 6,856 | 6,856 | 6,856 | 6,856 |
| Taxes | | 7,542.4 | 7,542.4 | 7,542.4 | 7,542.4 | 7,542.4 |
| After tax cash flow | | 12,348 | 18,999 | 18,999 | 18,999 | 18,999 |

| Year | 6 | 7 | 8 | 9 | 10 |
|---|---|---|---|---|---|
| Annual fixed capital | | | | | |
| Annual Working capital | | | | | |
| Annual operating cost | −7,779 | −7,779 | −7,779 | −7,779 | −7,779 |
| Annual revenue | 34,320 | 34,320 | 34,320 | 34,320 | 34,320 |
| Severance tax | 686.4 | 686.4 | 686.4 | 686.4 | 686.4 |
| Federal tax | 6,856 | 6,856 | 6,856 | 6,856 | 6,856 |
| Taxes | 7,542.4 | 7,542.4 | 7,542.4 | 7,542.4 | 7,542.4 |
| After tax cash flow | 18,999 | 18,999 | 18,999 | 18,999 | 18,999 |

NPV @
0.0% $146,901    IRR = 30%
10% $56,288
20% $17,692

Conclusions

The economic analysis conducted for this study yields an after-tax internal rate of return (IRR) of 30% and an after-tax net present value (NPV) of USD$56.3 million at a discount rate of 10%.

SUMMARY AND CONCLUSIONS

The major objective of this dissertation is to separate the rare earth minerals from the Bear Lodge. The first step in this endeavor was to complete the mineralogical characterization of the ore in order to identify its composition, mineral association and liberation. Mineral identification showed that ancylite was the main rare earth containing mineral and associated with strontianite and calcite. Thus, an investigation for the surface chemistry of ancylite, strontianite and calcite in the presence of hydroxamic acid, including their surface charges, adsorption densities and micro-scale flotation behaviors, were conducted. Particularly, the mechanisms for the uptake of hydroxamic acid on the three minerals were examined. Furthermore, bench scale flotation tests were also conducted to develop a flowsheet that can effectively extract rare earth from the sample of Bear Lodge. Finally, a preliminary economic study was carried out to estimate the economic value of the flowsheet proposed based on the lab-scale results. The following discussions summarize the accomplishments and contributions.

Mineralogical characterization found that the major phase in the sample was calcite with 60%. Minor minerals were pyrite (7.6%), ancylite (7.3%) and strontianite (5.8%), with numerous trace species. Ancylite was the dominant rare earth mineral, followed by bastnaesite and monazite. Ancylite was strongly associated with calcite and strontianite, and the grain size of ancylite ($P_{80}$) was around 50 µm, while the ground carbonatite had a $P_{80}$ of 100 µm. Because of the mineral specimen and associations, fundamentals of surface properties for ancylite, strontianite and calcite were investigated regarding the limited amount of literature on ancylite flotation.

The first approach of the fundamental studies was to investigate its surface property to understand the flotation behavior of ancylite in the presence of hydroxamic acid. The surface charge characteristics were conducted using a Stabino® distributed by Microtrac Europe GmbH. Zeta potential results indicated that the isoelectric points of ancylite, strontianite and calcite in distilled water were around 5.46, 4.5 and 5.5, respectively. The effect of lattice ions of these three minerals were investigated and it is found that $Sr^{2+}$, $CO_3^{2-}$ and $HCO_3^{-}$ were the determining ions for ancylite. The electrokinetic results of the three minerals in the presence of hydroxamic acid showed that chemisorption happened when hydroxamic acid adsorbed on the three minerals, which was in accordance with the results from both FTIR and adsorption density measurements. As the concentration of hydroxamic acid increased, isoelectric points of three minerals decreased, compared with those in distilled water. Moreover, a scenario was observed that the dissolved species affected the flotation behaviors.

The uptake of hydroxamic acid on ancylite, strontianite and calcite has been determined as a function of time, concentration and pH, as well as temperature. The results indicated a chemisorption happening on the mineral surface with hydroxamic acid. Hydroxamic acid preferably adsorbed on the surface of ancylite when compared with strontianite and calcite, which was due to the higher stability constant of rare earth hydroxamate. The standard free energies of adsorption of hydroxamic acid were calculated to be −6.15, −4.93 and −5.58 Kcal/mole for ancylite, calcite and strontianite, respectively. The experimental and thermodynamic results at 50° C. demonstrated that strontianite and calcite were more sensitive with temperature, compared with ancylite. The microflotation experiments showed that there was a difference between the floatabilities of ancylite, strontianite and calcite as functions of hydroxamic acid concentration and pH. However, due to the interference of dissolved species, the flotation behavior of the mixture of these three minerals was different from the flotation behavior of individual minerals.

The bench scale flotation experiments conducted in this research showed that it was difficult to separate ancylite from calcite and strontianite, because of their similar qualities of surface chemistry. However, the addition of strontium nitrate favorably selectively separated ancylite from the other two minerals. Since hydroxamic acid preferably adsorbs on iron surface and there is a high content of iron minerals, a wet high intensity magnetic separation (WHIMS) was used before the flotation. After the ore sample was subjected to wet high intensity magnetic separation (WHIMS), a non-magnetic product was obtained which was fed to flotation. Flotation following a rougher-cleaner process produced a concentrate containing 12.0% REO at a 61% recovery. Based on the experimental results and assumptions, a preliminary economic study was conducted as well. The assessment yielded an after-tax internal rate of return (IRR) of 30% and an after-tax net present value (NPV) of USD$56.3 million at a discount rate of 10%.

Future work regarding beneficiation of Bear Lodge ore is to develop a modifier or a scheme of modifiers to either activate or depress ancylite in order to differentiate the surface chemistry of ancylite from strontianite and calcite. Moreover, it is possible that a new collector not considered in this study may have more positive influence on the ancylite flotation. Furthermore, the effect of particle size on flotation response may also be investigated.

APPENDIX A ADSORPTION DATA

TABLE A1.1

Adsorption kinetics for hydroxamic acid for $10^{-3}$ M initial concentration

| Ancylite | | Calcite | | Strontianite | |
| --- | --- | --- | --- | --- | --- |
| Time (hours) | Adsorption density (µmol/m²) | Time (hours) | Adsorption density (µmol/m²) | Time (hours) | Adsorption density (µmol/m²) |
| 3 | 16.31 | 2 | 4.92 | 4 | 3.73 |
| 23 | 19.53 | 7 | 4.92 | 24 | 7.42 |
| 29 | 19.87 | 25 | 4.92 | 48 | 11.13 |
| 47 | 19.67 | 32 | 4.93 | 72 | 11.13 |
| 55 | 19.72 | 54 | 4.92 | 90 | 11.10 |
| 71 | 19.82 | 62 | 4.94 | 97 | 11.19 |

TABLE A1.2

Adsorption isotherm for ancylite, strontianite and calcite at 21° C. (pH 9 ± 0.3)

| Ancylite | | Calcite | | Strontianite | |
| --- | --- | --- | --- | --- | --- |
| Equilibrium concentration (mol/L) | Adsorption density (µmol/m²) | Equilibrium concentration (mol/L) | Adsorption density (µmol/m²) | Equilibrium concentration (mol/L) | Adsorption density (µmol/m²) |
| 0 | 6.57 | 0.0002 | 0 | 0.0002 | 0 |
| 0.0001 | 13.08 | 0.0004 | 2.45 | 0.0004 | 3.72 |
| 0.0002 | 19.72 | 0.0007 | 2.46 | 0.0006 | 7.40 |
| 0.0004 | 19.77 | 0.0008 | 4.92 | 0.0008 | 7.51 |
| 0.0013 | 23.13 | 0.0011 | 9.83 | 0.0013 | 7.40 |
| 0.0021 | 29.66 | | | 0.0018 | 7.40 |
| 0.0048 | 39.55 | | | 0.0036 | 14.92 |

TABLE A1.3

Effect of pH on adsorption for ancylite

| 21° C. | | | | 50° C. | |
|---|---|---|---|---|---|
| 0.0005M hydroxamic acid | | 0.001M hydroxamic acid | | 0.0005M hydroxamic acid | |
| pH | Adsorption density ($\mu mol/m^2$) | pH | Adsorption density ($\mu mol/m^2$) | pH | Adsorption density ($\mu mol/m^2$) |
|---|---|---|---|---|---|
| 5.91 | 9.76 | 5.88 | 29.22 | 5.2 | 22.94 |
| 6.75 | 13.02 | 6.88 | 22.78 | 5.74 | 26.05 |
| 7.83 | 13.05 | 7.61 | 19.63 | 6.93 | 29.29 |
| 8.76 | 13.32 | 8.24 | 19.53 | 7.73 | 29.22 |
| 9.2 | 13.08 | 9.09 | 19.82 | 8.19 | 29.81 |
| 10.07 | 13.08 | 10.11 | 19.87 | 9.1 | 29.43 |
| 11.47 | 9.94 | 11.07 | 16.56 | 10.56 | 29.69 |

TABLE A1.4

Effect of pH on adsorption for strontianite

| 21° C. | | | | 50° C. | |
|---|---|---|---|---|---|
| 0.0005M hydroxamic acid | | 0.001M hydroxamic acid | | 0.0005M hydroxamic acid | |
| pH | Adsorption density ($\mu mol/m^2$) | pH | Adsorption density ($\mu mol/m^2$) | pH | Adsorption density ($\mu mol/m^2$) |
|---|---|---|---|---|---|
| 5.96 | 9.67 | 5.84 | 20.88 | 5.74 | 18.03 |
| 6.23 | 8.91 | 6.25 | 12.95 | 6.21 | 12.28 |
| 6.76 | 4.35 | 6.71 | 12.02 | 7.33 | 11.33 |
| 7.43 | 0 | 7.57 | 7.59 | 7.9 | 14.92 |
| 8.85 | 3.72 | 8.17 | 7.53 | 9.02 | 25.98 |
| 11.22 | 11.58 | 8.95 | 7.42 | 11.04 | 30.51 |
| 11.77 | 3.95 | 9.97 | 18.77 | 11.84 | 19.96 |

TABLE A1.5

Effect of pH on adsorption for calcite

| 21° C. | | | | 50° C. | |
|---|---|---|---|---|---|
| 0.0005M hydroxamic acid | | 0.001M hydroxamic acid | | 0.0005M hydroxamic acid | |
| pH | Adsorption density ($\mu mol/m^2$) | pH | Adsorption density ($\mu mol/m^2$) | pH | Adsorption density ($\mu mol/m^2$) |
|---|---|---|---|---|---|
| 6.5 | 2.44 | 6.02 | 15.75 | 6.12 | 2.92 |
| 7 | 2.46 | 6.75 | 8.73 | 6.65 | 2.55 |
| 7.76 | 0 | 7.22 | 5.28 | 7.12 | 2.92 |
| 8.7 | 2.44 | 8.1 | 5.04 | 8 | 2.48 |
| 9.62 | 4.45 | 8.51 | 4.97 | 9.25 | 7.33 |
| 10.9 | 2.49 | 9.16 | 4.92 | 10.31 | 12.46 |
| 11.5 | 0 | 10.06 | 18.77 | 11.81 | 19.19 |

TABLE A1.6

Adsorption kinetics for hydroxamic acid for $10^{-3}$ M initial concentration (50° C.)

| Ancylite | | Calcite | | Strontianite | |
|---|---|---|---|---|---|
| Time (hours) | Adsorption density ($\mu mol/m^2$) | Time (hours) | Adsorption density ($\mu mol/m^2$) | Time (hours) | Adsorption density ($\mu mol/m^2$) |
|---|---|---|---|---|---|
| 24 | 22.78 | 4 | 4.90 | 3 | 3.69 |
| 48 | 25.91 | 21 | 7.31 | 24 | 11.08 |
| 72 | 26.30 | 28 | 7.38 | 48 | 14.73 |
| 76 | 29.59 | 45 | 7.38 | 70 | 18.46 |
| 96 | 29.44 | 51 | 7.31 | 76 | 22.43 |
|  |  | 68 | 7.31 | 94 | 22.21 |

TABLE A1.7

Adsorption isotherm for ancylite, strontianite and calcite at 50° C. (pH 9 ± 0.3)

| Ancylite | | Calcite | | Strontianite | |
|---|---|---|---|---|---|
| Equilibrium concentration (mol/L) | Adsorption density ($\mu mol/m^2$) | Equilibrium concentration (mol/L) | Adsorption density ($\mu mol/m^2$) | Equilibrium concentration (mol/L) | Adsorption density ($\mu mol/m^2$) |
|---|---|---|---|---|---|
| 0 | 5.25 | 0.0002 | 0 | 0.0001 | 3.68 |
| 0.0001 | 10.49 | 0.0004 | 2.45 | 0.0004 | 22.49 |
| 0.0002 | 20.99 | 0.0005 | 7.31 | 0.0006 | 33.31 |
| 0.0004 | 23.61 | 0.0007 | 7.42 | 0.0009 | 40.92 |
| 0.0007 | 34.45 | 0.0009 | 14.76 | 0.0015 | 55.52 |
| 0.0015 | 39.06 | 0.0024 | 14.73 | 0.0024 | 59.52 |
| 0.0024 | 42.18 | 0.0032 | 19.78 | 0.0042 | 67.47 |
| 0.0036 | 62.80 | 0.0036 | 58.91 |  |  |

APPENDIX B FLOTATION SIMULATION

TABLE B1

Seven floatability components distributions of both ancylite and gangue minerals at different flotation stages

| | | Ancylite | | | Gangue | | |
|---|---|---|---|---|---|---|---|
| Time | Flotation stage | Floating (g) | Non-floating (g) | Total (g) | Floating (g) | Non-floating (g) | Total (g) |
|---|---|---|---|---|---|---|---|
| 1 | Feed | 37.1 | 3.53 | 40.63 | 119.59 | 89.78 | 209.37 |
|  | Rougher Conc. | 31.81 | 0 | 31.81 | 96.26 | 0 | 96.26 |
|  | Rougher tail | 5.29 | 3.53 | 8.82 | 23.33 | 89.78 | 113.11 |
|  | Cleaner Conc. | 23.13 | 0 | 23.13 | 63.89 | 0 | 63.89 |
|  | Cleaner tail | 8.68 | 0 | 8.68 | 32.37 | 0 | 32.37 |
| 2 | Feed | 45.02 | 4.29 | 49.31 | 138.08 | 103.66 | 241.74 |
|  | Rougher Conc. | 38.6 | 0 | 38.6 | 111.14 | 0 | 111.14 |
|  | Rougher tail | 3.11 | 7.6 | 10.71 | 14.17 | 116.42 | 130.59 |
|  | Cleaner Conc. | 28.06 | 0 | 28.06 | 73.77 | 0 | 73.77 |
|  | Cleaner tail | 10.54 | 0 | 10.54 | 37.37 | 0 | 37.37 |
| 3 | Feed | 46.72 | 4.45 | 51.17 | 140.94 | 105.8 | 246.74 |
|  | Rougher Conc. | 40.06 | 0 | 40.06 | 113.44 | 0 | 113.44 |
|  | Rougher tail | 6.66 | 4.45 | 11.11 | 27.5 | 105.8 | 133.3 |
|  | Cleaner Conc. | 29.12 | 0 | 29.12 | 75.29 | 0 | 75.29 |

TABLE B1-continued

Seven floatability components distributions of both ancylite and gangue minerals at different flotation stages

| Time | Flotation stage | Ancylite | | | Gangue | | |
|---|---|---|---|---|---|---|---|
| | | Floating (g) | Non-floating (g) | Total (g) | Floating (g) | Non-floating (g) | Total (g) |
| | Cleaner tail | 10.94 | 0 | 10.94 | 38.15 | 0 | 38.15 |
| 4 | Feed | 47.09 | 4.48 | 51.57 | 141.38 | 106.14 | 247.52 |
| | Rougher Conc. | 40.37 | 0 | 40.37 | 113.8 | 0 | 113.8 |
| | Rougher tail | 6.72 | 4.48 | 11.2 | 27.58 | 106.14 | 133.72 |
| | Cleaner Conc. | 29.35 | 0 | 29.35 | 75.53 | 0 | 75.53 |
| | Cleaner tail | 11.02 | 0 | 11.02 | 38.27 | 0 | 38.27 |
| 5 | Feed | 47.16 | 4.49 | 51.65 | 141.45 | 106.19 | 247.64 |
| | Rougher Conc, | 40.44 | 0 | 40.44 | 113.86 | 0 | 113.86 |
| | Rougher tail | 6.72 | 4.49 | 11.21 | 27.59 | 106.19 | 133.78 |
| | Cleaner Conc. | 29.4 | 0 | 29.4 | 75.57 | 0 | 75.57 |
| | Cleaner tail | 11.04 | 0 | 11.04 | 38.29 | 0 | 38.29 |
| 6 | Feed | 47.18 | 4.49 | 51.67 | 141.46 | 106.2 | 247.66 |
| | Rougher Conc. | 40.45 | 0 | 40.45 | 113.86 | 0 | 113.86 |
| | Rougher tail | 6.73 | 4.49 | 11.22 | 27.60 | 106.20 | 133.80 |
| | Cleaner Conc. | 29.41 | 0 | 29.41 | 75.57 | 0 | 75.57 |
| | Cleaner tail | 11.04 | 0 | 11.04 | 38.29 | 0 | 38.29 |
| 7 | Feed | 47.18 | 4.49 | 51.67 | 141.46 | 106.20 | 247.66 |
| | Rougher Conc. | 40.45 | 0 | 40.45 | 113.86 | 0 | 113.86 |
| | Rougher tail | 6.73 | 4.49 | 11.22 | 27.60 | 106.20 | 133.80 |
| | Cleaner Conc. | 29.41 | 0 | 29.41 | 75.57 | 0 | 75.57 |
| | Cleaner tail | 11.04 | 0 | 11.04 | 38.29 | 0 | 38.29 |

APPENDIX C XRD DATAS

TABLE C1

Figure 19:
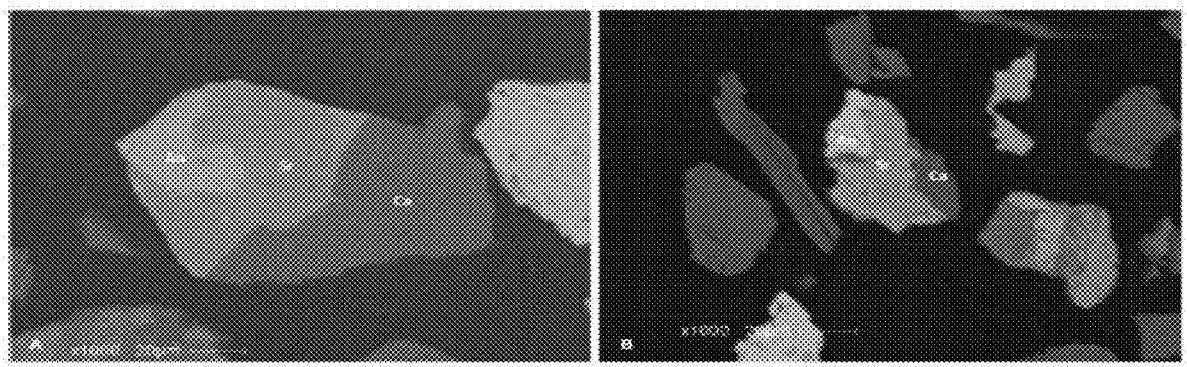
FIG. 19 is an image showing the association of ancylite, strontianite, and calcite.
Figure 20:
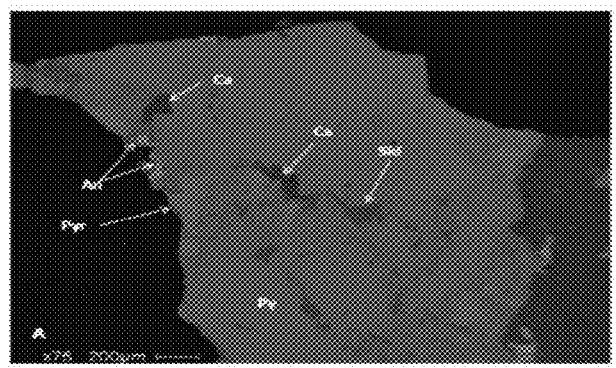
FIG. 20 is an image showing the association of pyrite, pyrrhotite, ancylite, calcite and siderite.

Mineral names corresponding to reference codes in FIG. 19, 20 and 21.

| Ref. code | Compound name |
|---|---|
| 01-073-1922 | Villiaumite |
| 01-075-1381 | Coesite |
| 01-086-2340 | Calcite |
| 01-082-2427 | Perovskite |
| 01-070-1774 | Ancylite |
| 01-073-2041 | Gehlenite |
| 01-084-1778 | Strontianite |
| 01-076-0670 | Serendibite |
| 00-021-1258 | Ferroan |

TABLE D1

Cited References
REFERENCES

[1] C. K. Gupta, N. Krishnamurthy, "Extractive Metallurgy of Rare Earth", CRC Press. Boca Raton, Florida, 2005.
[2] Y. Kanazawa, M. Kamitani, "Rare earth minerals and resources in the world", Journal of Alloys and Compounds, 408-412, 1339-1343, 2006.
[3] S. R. Taylor, "Abundance of chemical elements in the continental crust: a new table", Geochimica et Cosmochimica Acta, 28, 1273-1285, 1964.
[4] K. H. Wedepohl, "The composition of the continental crust", Geochimica et Cosmochimica Acta, 59, 1217-1232, 1995.
[5] C. J. Hawkesworth, A. I. S. Kemp, "Evolution of the continental crust", Nature, 443, 811-817, October, 2006.
[6] G. Özbayoğlu, M. Ü. Atalay, "Beneficiation of bastnaesite by a multi-gravity separator", Journal of Alloys and Compounds, 303-304, 520-523, 2000.
[7] A. Jordans, Y. P. Cheng, K. E. Waters, "A review of the beneficiation of rare earth element bearing minerals", Mineral Engineering, 41, 97-114, 2013.
[8] Ancylite-(Ce), Handbook of Mineralogy, (Online), Available: www.handbookofmineralogy.org/pdfs/ancylite-(Ce).pdf
[9] A. D. Negro, G. Rossi, V. Tazzou, "The crystal of ancylite, $(RE)_x(Ca, Sr)_{2-x}(CO_3)_2(OH)_x(2-x)H_2O$", American Mineralogist, Vol. 60, 280-284, 1975.
[10] J. Gambogi, "Rare earths", USGS, 2014.
[11] K. R. Long, B. S. Van Gosen, N. K. Foley, D. Cordier, "The principal rare earth elements deposits of the United States: A summary of domestic deposits and a global perspective", USGS, 2010, (Online), Available: pubs.usgs.gov/sir/2010/5220/
[12] K. R. Long, B. S. Van Gosen, N. K. Foley, D. Cordier, "The principal rare earth elements deposits of the United States: A summary of domestic deposits and a global perspective", Non-Renewable Resource Issues, Springer Science + Business Media B.V., 2012.
[13] "Rare earth elements", British Geological Survey, 2011, (Online), Available: www.bgs.ac.uk/research/highlights/2010/rare_earth_elements.html
[14] J. Gambogi. "Rare earths", USGS, 2013.
[15] Z. H. Chen, "Global rare earth resources and scenarios of future rare earth industry", Journal of Rare Earth, Vol. 29, No. 1, 1-6, 2011.
[16] J. B. Hedrick, "Rare earths", USGS, 1996.

TABLE D1-continued

Cited References
REFERENCES

[17] J. B. Hedrick, "Rare earths", *USGS*, 1998.
[18] J. B. Hedrick, "Rare earths", *USGS*, 2000.
[19] J. B. Hedrick, "Rare earths", *USGS*, 2002.
[20] J. B. Hedrick, "Rare earths", *USGS*, 2004.
[21] J. B. Hedrick, "Rare earths", *USGS*, 2006.
[22] J. B. Hedrick, "Rare earths", *USGS*, 2008.
[23] J. B. Hedrick, "Rare earths", *USGS*, 2010.
[24] D. J. Cordier, "Rare earths", *USGS*, 2012.
[25] "Situation and policies of China's rare earth industry", *Information Office of the State Council*, The People's Republic of China, 2012.
[26] P. Tse, "China's rare earth industry", USGS, 2011. (Online), Available: pubs.usgs.gov/of/2011/1042/
[27] A. Jordans, R. S. Sheridan, N. A. Rowson, K. E. Waters, "Processing a rare earth mineral deposit using gravity and magnetic separation", *Minerals Engineering*, 62, 9-18, 2014.
[28] C. J. Perron, S. M. Bulatovic, R. S. Salter, "Beneficiation of rare earth oxide minerals", *Materials Science Forum*, Vol. 70-72, 251-270, 1991.
[29] L. Z. Li, X. S. Yang, "China's rare earth ore deposits and beneficiation techniques", *ERES2014: 1$^{st}$ European Rare Earth Resources Conference*, Milos, 2014. (Online), Available: www.eurare.eu/docs/eres2014/firstSession/XiaoshengYang.pdf
[30] J. Ren, "Flotation behavior and mechanism of bastnaesite with N-hydroxyl phthalicimide", *Acta Matallugica Sinica*, 26, 241-245, 1993.
[31] "Concentration plant," (Online). Available: www.slideshare.net/Lynas_Malaysia/7187-lynas-flyersv8bfa61112-cp
[32] J. Ren, S. X. Song, A. Lopez-Valdivieso, S. C. Lu, "Selective flotation of bastnaesite from monazite in rare earth concentrates using potassium alum as depressant", *International Journal of Mineral Processing*, 59, 237-245, 2000.
[33] E. Morrice, M. W. Wong, "Flotation of rare earths from bastnaesite ore", *Bureau of Mines Report of Investigations*. United States Department of the Interior, 1982.
[34] A. M. Abeidu, "The separation of monazite from zircon by flotation", *Journal of the Less-Common Metals*, 29, 113-119, 1972.
[35] T. W. Cheng, P. N. Holtham, T. Tran, "Froth flotation of monazite and xenotime", *Minerals Engineering*, Vol. 6, Issue 4, 341-351, 1993.
[36] S. Raghavan, D. W. Fuerstenau, "The adsorption of aqueous octylhydroxamate on ferric oxide", *Journal of Colloid and Interface Science*, Vol. 50, No. 2, 319-330, February, 1975
[37] D. K. Kong, J. Q. Chen, W. Z. Zhou, "Application of hydroxamic acid and hydroxamic-xanthate collector system in metal ore flotation", *Reagents in the Minerals Industry*, edited by Jones M. J. et al. The institution of Mining and Metallurgy, London, England, 1984.
[38] Pradip, D. W. Fuerstenau, "The adsorption of hydroxamate on semi-soluble minerals. Part 1: adsorption on barite, calcite and bastnaesite", *Colloids and Surfaces*, 8, 103-119, 1983.
[39] Y. K. Agrawal, "Hydroxamic acids and their metal complexes", *Russian Chemical Reviews*, Translated from Uspekhi Khimii, 48, 1773-1803, 1979.
[40] D. R. Nagaraj, "The chemistry and application of chelating or complexing agents in mineral separations", *Reagents in Mineral Technology*, edited by P. Somasundaran and B. M. Moudgil, Marcel Dekker, Inc. New York, New York, 1988.
[41] S. M. Asis, L. C. M. Montenegro, A. E. C. Peres, "Utilization of hydroxamates in minerals froth flotation", *Mineral Engineering*, Vol. 9, No. 1, 103-114, 1996.
[42] M. C. Fuerstenau, "Chelating agents as flotation collectors", *Innovations in Natural Resource Processing: Proceedings of the Jan. D. Miller symposium*. Edited by C. A. Young, J. J. Kellar, M. L. Free, J. Drelich, and R. P. King, Society for Mining, Metallurgy, and Exploration, Inc., Littleton, Colorado, USA 80127, 2005.
[43] S. Chander, D. W. Fuerstenau, "Electrochemical reaction control of contact angles on copper and synthetic chalcocite in aqueous potassium diethydithiophosphate solutions", *International Journal of Mineral Processing*, 2, 333-352, 1975.
[44] K. Lee, D. Archibald, J. McLean, M. A. Reuter, "Flotation of mixed copper oxide and sulfide minerals with xanthate and hydroxamate collectors", *Minerals Engineering*, 22, 395-401, 2009.
[45] J. D. Miller, X. Wang, M. Li, "Bench scale flotation of sedimentary phosphate rock with hydroxamic acid collectors", *Proceedings of the Engineering Foundation Conference, Beneficiation of Phosphates III: Fundamentals and Technology*, 93-101, 2002.
[46] Pradip, D. W. Fuerstenau, "Adsorption of hydroxamate collectors on semi-soluble minerals. Part 2: effect pf temperature on adsorption", *Colloids and Surfaces*, 15, 137-146, 1985.
[47] M. C. Fuerstenau, R. W. Harper, J. D. Miller, "Hydroxamate vs. fatty acid flotation of iron oxide", *Society of Mining Engineers, AIME*, Transactions, Vol. 247, 69-73, March, 1970.

TABLE D1-continued

Cited References
REFERENCES

[48] G. X. Liang, R. A. Chi, G. C. Zhu, "A comparison of properties of carboxyl and hydroxyl-oxime flotation agent in floating bastnaesite", *Engineering Chemistry & Metallurgy*, 19, 25-30, 1998. (In Chinese)

[49] J. Ren, S. Lu, S, Song, J, Niu, "A new collector for rare earth mineral flotation", *Minerals Engineering*, Vol. 10, No. 12, 1395-1404, 1997.

[50] J. Q. Xu, X. J. Xu, J. W. Wang, "Synthesis of 1-hydroxy-2-naphthylhydroximic acid and application to collecting rare earth minerals", *Nonferrous Metals*, Issue 3, 72-73, 2002. (In Chinese)

[51] O. Pavez, P. R. C. Brandao, A. E. C. Peres, "Adsorption of oleate and octyl-hydroxamate on to rare-earths minerals", *Minerals Engineering*, Vol. 9, N0. 3, 357-366, 1996.

[52] C. A. Pereira, A. E. C. Peres, "Technical note: Flotation concentration of a xenotime pre-concentrate", *Minerals Engineering*, Vol. 10, No. 11, 1291-1295, 1997.

[53] S. K. Mishra, "Electrokinetic properties and flotation behavior of apatite and calcite in the presence of sodium oleate and sodium metasilicate", *International Journal of Mineral Processing*, Vol. 5, Issue 1, 59-73, 1982.

[54] R. Pugh, P. Stenius, "Solution chemistry studies and flotation behavior of apatite, calcite and fluorite minerals with sodium oleate collector", *International Journal of Mineral Processing*, 15, 193-218, 1985.

[55] M. C. Fuerstenau, G. Gutierrez, D. A. Elgillani, "The influence of sodium silicate in nonmetallic flotation system". *Annual Meeting of the AIME*, New York, New York, February, 1968.

[56] P. Somasundaran, G. E. Agar, "The zero point of charge of calcite", *Journal of Colloid and Interface Science*, 24, 433-440, 1967.

[57] F. Hernáinz, M. Calero, "Influence of quebracho and sodium silicate on flotation of celestite and calcite with sodium oleate", *International Journal of Mineral Processing*, 37, 283-298, 1993.

[58] A. Martinez L., A. Uribe S., "Interfacial properties of celestite and strontianite in aqueous solutions", *Minerals Engineering*, Vol. 8, No. 9, 1009-1022, 1995.

[59] "Pre-feasibility Study Report: Technical Report on the Mineral Reserves and Development of Bull Hill Mine, Wyoming", *Roche Engineering, Inc.* Sandy, Utah, 2014.

[60] "An investigation into the recovery of rare earth oxides from the Bear Lodge Ore samples", *SGS Lakefield Research Limited*, Lakefield, Ontario, Canada, November, 2006.

[61] M. C. Fuerstenau, K. N. Han, *Principles of Mineral Processing*. Society for mining, Metallurgical, and Exploration, Inc., Littleton, Colorado, USA 80127, 2003.

[62] N. L. Weiss, *SME Mineral Processing Handbook*. Society of Mining Engineers, AIME Inc. New York, New York, 1985.

[63] B. A. Wills, T.J. Napier-Munn, *Wills' Mineral processing Technology*. Elsevier Ltd. 2006.

[64] M. C. Fuerstenau, G. Jameson, R, Yoon, *Froth Flotation: A Century of Innovation*, Society for mining, Metallurgical, and Exploration, Inc., Littleton, Colorado, USA 80127, 2007.

[65] "Mineral Liberation Analyzer", (Online). Available: www.technoinfo.ru/technoinfo/products/87/186/files/128134493031.pdf

[66] Y. Gu, "Automated scanning electron microscope based mineral liberation analysis", Journal pf Minerals & Materials Characterization & Engineering, Vol. 2, No. 1, 33-41, 2003

[67] R. Fandrich, Y. Gu, D. Burrons, K. Moeller, "Modern SEM-based mineral liberation analysis", International Journal of Mineral Processing, 84, 310-320, 2007.

[68] P. Gottlieb, G. Wilkie, D. Sutherland, E. Ho-Tun, S. Suthers, K. Perera, B. Jenkins, S. Spencer, A. Butcher, J. Rayner, "Using quantitative electron microscopy for process mineralogy applications", JOM, April 2000.

[69] J. W. Olesik, "Elemental analysis using an evaluation and assessment of remaining problems", Analitical Chemistry, Vol. 63, No. 1, 12-21, 1991.

[70] D. J. Broton, "Lithium based borate fusion of gypsum/high sulfate samples: A new approach", JCPDS-lnternational Center for Diffraction Data, 1999.

[71] P. Brouwer, "Theory of XRF", PANalytical BV, The Nevertherlands, 2010. (Online) Available: www.panalytical.com

[72] "Stabino operation instruction", (Online). Available: www.microtrac.com/stabino-particle-charge-titration-analyzer/#.VkAfdhFVhBd

[73] Pradip, "The surface properties and flotation of rare-earth minerals", PhD dissertation, University of California, Berkeley, Berkeley, CA, 1981.

[74]" BELSORP-MINI II", (Online). Available: www.microtrac.com/belsorp-mini-ii

[75] K. Nakai, J. Sonoda, H. legami, H. Naono, "High precision volumetric gas adsorption apparatus", Adsorption, 11, 227-230, 2005.

[76] J. D. Miller, K. Fa, J. V. Calara, V. K. Paruchuri, "The surface charge of fluorite in the absence of surface carbonation", *Colloids and Surfaces A; Physicochem. Eng. Aspects*, 238, 91-97, 2004.

[77] D. W. Thompson, P. G. Pownall, "Surface electrical properties of calcite", Journal of Colloid & Interface Science, Vol. 131, No. 1, 74-82, August, 1989.

[78] D. W. Fuerstenau, Pradip, R. Herrera-Urbina, "The surface chemistry of bastnaesite, barite and calcite in aqueous carbonate solutions", Colloids and Surfaces, 68, 95-102, 1992.

[79] M. S. Smani, P. Blazy, J. M. Cases, "Beneficiation of sedimentary Moroccan Phosphate Ores", Society of Mining Engineers, AIME, Transactions, Vol. 258, 168-182, June, 1975.

[80] J. O. Amankonah, P. Somasundaran, "Effects of dissolved mineral species on the electrokinetic behavior of calcite and apatite", *Colloids and Surfaces*, 15, 335-353, 1985.

[81] P. Somasundaran, J. O. Amankonah, K. P. Ananthapadmabnan, "Mineral-solution equilibria in sparingly soluble mineral systems", *Colloids and Surfaces*, 15, 309-333, 1985.

[82] V. Y. Sampat Kumar, N. Mohan, A. K. Biswas, "Fundamental studies on the role of carbon dioxide in a calcite flotation system", *Society of Mining Engineers, AIME*, Transactions 250, 182-186, September, 1971.

[83] D. J. Alexander, K. C. Runge, J-P Franzidis, E. V. Manlapig, "The application of multi-component floatability models to full-scale flotation circuits", *Seventh Mill Operators' Conference*, Kalgoorlie, WA, October 2000.

TABLE D1-continued

Cited References
REFERENCES

[84] D. A. Collins, S. Schwarz, D. J. Alexander, "Designing modern flotation circuits using JKFIT and JKSIMFLOAT". *Recent Advances in Mineral Processing Plant Design*, edited by D. Malhotra, P. R. Taylor, E. Spiller, and M. LeVier, Society for mining, Metallurgical, and Exploration, Inc., Littleton, Colorado, USA 80127, 2009.

[85] A. L. Mular, "Major mineral processing equipment costs and preliminary capital cost estimations", *Mineral Processing Plant Design, Practice and Control*, edited by A. L. Mular, D. N. Halbe, and D. J. Barratt, Society for Mining, Metallurgy, and Exploration, Inc. Littleton, Colorado, USA 80127, 2002.

[86] 2013 CostMine, InfoMine Inc., 2014.

We claim:

1. A method of increasing the concentration of a ancylite in an ore sample, the method comprising:
   combining the ancylite containing ore sample and a collector comprising a hydroxamic acid;
   agitating the ancylite/collector combination;
   subjecting the agitated ancylite/collector combination to flotation and floating the ancylite/collector combination to obtain a tailing sink fraction and a concentrated ancylite float fraction;
   separating the tailing fraction from the ancylite fraction, and thereby obtaining an ore sample with increased concentration of ancylite.

2. The method of claim 1, wherein the ore sample has a mesh size less than about 100 mesh.

3. The method of claim 1, wherein the flotation is performed by passing a gas through the combination.

4. The method of claim 1, wherein the hydroxamic acid is octanohydroxamic acid.

5. The method of claim 4, wherein the collector comprises octanohydroxamic acid and potassium ethyl xanthate.

6. The method of claim 1, wherein the collector concentration is between about 0.003 and 0.0001 mol/liter.

7. The method of claim 1, wherein the pH of the ancylite/collector combination is between about 6 and 11.

8. The method of claim 1, wherein strontium nitrate is added to the ancylite/collector combination.

9. The method of claim 1, wherein flotation is performed with solids at between 10% and 40%.

10. The method of claim 1, wherein the ore sample is subjected to crushing and grinding prior to the combining step.

11. The method of claim 1, wherein, prior to the combining step, separating the ore sample with a wet high intensity magnetic separator into two groups—a predominantly iron-containing ore and a predominantly ancylite-containing ore; wherein the separator has a grooved plate matrix and applies a magnetic field with a current of between 0.1 and 16 amperes.

12. The method of claim 11, wherein the separating step is a wet high intensity magnetic separation.

13. A method of increasing the concentration of rare ancylite in an ore sample, the method comprising:
   reducing the size of an ancylite containing ore to a particle size of less than about 100 mesh;
   passing the particles through a magnetic separator to produce an iron rich sample and an iron reduced sample;
   combining the iron reduced sample with a hydroxamic acid collector and one or more additives selected from an ionic compound, a collector, and a frother, wherein the collector includes said hydroxamic acid, to create a slurry;
   agitating the slurry;
   separating the agitated slurry by flotation into a tailing fraction and a concentrated ancylite float fraction;
   collecting the concentrate ancylite fraction to obtain a product ore sample increased concentration of ancylite.

14. The method of claim 13, wherein the tailing fraction is re-combined with the one or more additives, agitated, and separated to obtain a second concentrated ancylite fraction.

15. The method of claim 13, wherein the hydroxamic acid is octanohydroxamic acid.

16. The method of claim 15, wherein the one or more additives include the ionic compound and the ionic compound is strontium nitrate and the frother is AEROFROTH 70.

17. The method of claim 13, wherein the ancylite concentration of the concentrated ancylite fraction is between about 3% and about 15%.

* * * * *